US010309985B2

(12) United States Patent
Allis et al.

(10) Patent No.: US 10,309,985 B2
(45) Date of Patent: *Jun. 4, 2019

(54) BUILD SEQUENCES FOR MECHANOSYNTHESIS

(71) Applicant: CBN Nano Technologies Inc., Ottawa (CA)

(72) Inventors: Damian G. Allis, Fairport, NY (US); Jeremy Barton, Folsom, CA (US); Michael Drew, Union City, CA (US); Robert A. Freitas, Jr., Pilot Hill, CA (US); Aru Hill, San Jose, CA (US); Robert Matthew Kennedy, Tucker, GA (US); Ralph C. Merkle, Cupertino, CA (US); Tait Takatani, Sparks, NV (US); Michael Marshall, Lilburn, GA (US)

(73) Assignee: CBN Nano Technologies Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,201

(22) Filed: Nov. 7, 2017

(65) Prior Publication Data

US 2018/0120346 A1    May 3, 2018

Related U.S. Application Data

(63) Continuation of application No. 15/588,494, filed on May 5, 2017, which is a continuation-in-part of (Continued)

(51) Int. Cl.
*G01Q 80/00*    (2010.01)
*C01B 32/28*    (2017.01)
(Continued)

(52) U.S. Cl.
CPC ........... *G01Q 80/00* (2013.01); *B82B 3/0019* (2013.01); *C01B 32/26* (2017.08); *C01B 32/28* (2017.08); *G01Q 20/02* (2013.01)

(58) Field of Classification Search
CPC ...................................................... G01Q 80/00
(Continued)

(56) References Cited

U.S. PATENT DOCUMENTS 3,859,352 A    1/1975 Szinai et al.
4,952,749 A    8/1990 Alexander et al.
(Continued)

OTHER PUBLICATIONS

Jingping Peng, Robert A. Freitas Jr., Ralph C. Merkle, James R. Von Ehr, John N. Randall, George D. Skidmore, "Theoretical Analysis of Diamond Mechanosynthesis. Part III. Positional C2 Deposition of Diamond C(110) Surface using Si/Ge/Sn-based Dimer Placement Tools," J. Comput. Theor. Nanosci. 3 (Feb. 2006):28-41.
(Continued)

*Primary Examiner* — Phillip A Johnston

(57) ABSTRACT

Methods for creating build sequences which are determined using computational chemistry algorithms to simulate mechanosynthetic reactions, and which may use the mechanosynthesis process conditions or equipment limitations in these simulations, and which facilitate determining a set of mechanosynthetic reactions that will build an atomically-precise workpiece with a desired degree of reliability. Included are methods for error correction of pathological reactions or avoidance of pathological reactions. Libraries of reactions may be used to reduce simulation requirements.

16 Claims, 42 Drawing Sheets

Related U.S. Application Data application No. 14/712,506, filed on May 14, 2015, now Pat. No. 9,676,677, which is a continuation-in-part of application No. PCT/US2013/028419, filed on Feb. 28, 2013.

(51) Int. Cl.
*B82B 3/00* (2006.01)
*C01B 32/26* (2017.01)
*G01Q 20/02* (2010.01)

(58) Field of Classification Search
USPC .......................................................... 850/62
See application file for complete search history.

(56) References Cited

U.S. PATENT DOCUMENTS

| | | | |
|---|---|---|---|
| 4,987,312 A | 1/1991 | Eigler | |
| 5,144,148 A | 9/1992 | Eigler | |
| 5,372,659 A | 12/1994 | Lamaze et al. | |
| 5,411,797 A | 5/1995 | Davenloo et al. | |
| 5,824,470 A | 10/1998 | Baldeschwieler et al. | |
| 6,017,504 A | 1/2000 | Kaliaguine et al. | |
| 6,242,470 B1 | 6/2001 | Baxter et al. | |
| 6,339,227 B1 | 1/2002 | Ellenbogen | |
| 6,348,700 B1 | 2/2002 | Ellenbogen et al. | |
| 6,422,077 B1 | 7/2002 | Krauss et al. | |
| 6,531,107 B1 | 3/2003 | Spencer et al. | |
| 6,716,409 B2 | 4/2004 | Hafner et al. | |
| 6,783,589 B2 | 8/2004 | Dahl | |
| 6,827,979 B2 | 12/2004 | Mirkin et al. | |
| 6,835,534 B2 | 12/2004 | Weiss et al. | |
| 6,864,481 B2 | 5/2005 | Kaito et al. | |
| 6,886,395 B2 | 5/2005 | Minne | |
| 6,987,277 B2 | 1/2006 | Baur et al. | |
| 7,049,374 B2 | 5/2006 | Liu et al. | |
| 7,189,455 B2 | 3/2007 | Wong et al. | |
| 7,211,795 B2 | 5/2007 | Collier et al. | |
| 7,282,710 B1 | 10/2007 | Black et al. | |
| 7,291,284 B2 | 11/2007 | Mirkin et al. | |
| 7,309,476 B2 | 12/2007 | Carlson et al. | |
| 7,312,562 B2 | 12/2007 | Dahl et al. | |
| 7,326,293 B2 | 2/2008 | Randall et al. | |
| 7,326,923 B2 | 2/2008 | Berstis | |
| 7,381,625 B2 | 6/2008 | Xi et al. | |
| 7,431,856 B2 | 10/2008 | Rezeq et al. | |
| 7,687,146 B1 | 3/2010 | Freitas | |
| 8,171,568 B2 * | 5/2012 | Freitas | C07C 2/00 850/61 |
| 9,244,097 B1 * | 1/2016 | Freitas, Jr. | G01Q 70/18 |
| 10,197,597 B2 * | 2/2019 | Allis | C01B 32/26 |
| 2003/0215877 A1 | 11/2003 | Love et al. | |
| 2004/0014168 A1 | 1/2004 | Schreiber et al. | |
| 2005/0077468 A1 | 4/2005 | Bauer et al. | |
| 2005/0085626 A1 * | 4/2005 | Leung | C07K 14/47 530/350 |
| 2009/0056802 A1 | 3/2009 | Rabani | |
| 2009/0093659 A1 | 4/2009 | Freitas et al. | |
| 2014/0231379 A1 | 8/2014 | Pitters et al. | |

OTHER PUBLICATIONS

Berhane Temelso, C. David Sherrill, Ralph C. Merkle, Robert A. Freitas Jr., "High-level Ab Initio Studies of Hydrogen Abstraction from Prototype Hydrocarbon Systems," J. Phys. Chem. A 110 (Sep. 28, 2006):11160-11173.

Berhane Temelso, C. David Sherrill, Ralph C. Merkle, Robert A. Freitas Jr., "Ab Initio Thermochemistry of the Hydrogenation of Hydrocarbon Radicals Using Silicon, Germanium, Tin and Lead Substituted Methane and Isobutane," J. Phys. Chem. A 111(Aug. 15, 2007):8677-8688.

K. Eric Drexler, Nanosystems: Molecular Machinery, Manufacturing, and Computation, John Wiley & Sons, New York, 1992, Chapter 8.

D.M. Eigler, E.K. Schweizer, "Positioning Single Atoms with a Scanning Tunnelling Microscope," Nature 344(Apr. 5, 1990):524-526.

Noriaki Oyabu, Oscar Custance, Insook Yi, Yasuhiro Sugawara, Seizo Morita, "Mechanical vertical manipulation of selected single atoms by soft nanoindentation using near contact atomic force microscopy," Phys. Rev Lett. 90(May 2, 2003):176102.

Ralph C. Merkle, "A proposed 'metabolism' for a hydrocarbon assembler," Nanotechnology 8(1997):149-162.

M.C. Hersam, G.C. Abeln, J.W. Lyding, "An approach for efficiently locating and electrically contacting nanostructures fabricated via UHV-STM lithography on Si(100)," Microelectronic Engineering 47(Jun. 1999):235-237.

D.H. Huang, Y. Yamamoto, "Physical mechanism of hydrogen deposition from a scanning tunneling microscopy tip," Appl. Phys. A 64(Apr. 1997):R419-R422.

J. Murota, M. Sakuraba, "Atomically controlled processing for high-performance Si-based devices," Tohoku-Cambridge Forum (Hall in Peterhouse, University of Cambridge, Organizers: M. Koyanagi, W. I. Milne), International Workshop on Nano-Technology, Nano-Materials, Nano-Devices, and Nano-Systems, Jun. 11, 2004.

J. Franks, "Preparation and properties of diamondlike carbon films," J. Vac. Sci. & Technol. A 7(May 1989):2307-2310.

C. A. Rego, P.W. May, E.C. Williamson, M.N.R. Ashfold, Q.S. Chia, K.N. Rosser, N.M. Everitt, "CVD diamond growth on germanium for infra-red window applications," Diam. Rel. Mater. 3(1994):939.

D.S. Patil, K. Ramachandran, N. Venkatramani, M. Pandey, R. D'Cunha, "Microwave plasma deposition of diamond-like carbon coatings," Pramana J. Phys. 55(Nov./Dec. 2000):933-939.

Y. Fukuda, M. Shimomura, G. Kaneda, N. Sanada, V.G. Zavodinsky, I.A. Kuyanov, E.N. Chukurov, "Scanning tunneling microscopy, high-resolution electron energy loss spectroscopy, and theoretical studies of trimethylphosphine (TMP) on a Si(111)-(7x7) surface," Surf. Sci. 442(1999):507-516.

M.J. Bronikowski, R.J. Hamers, "The chemistry of gallium deposition on Si(001) from trimethylgallium: an atomically resolved STM study," Surf. Sci. 348(Mar. 10, 1996):311-324.

D.M. Gruen, S. Liu, A. R. Krauss, X.Pan, "Buckyball microwave plasmas: Fragmentation and diamond-film growth," J. Appl. Phys. 75(1994):1758-1763.

Ansoon Kim, Jae Yeol Maeng, Jun Young Lee, Sehun Kim, "Adsorption configuration and thermal chemistry of acetylene on the Ge(100) surface," J. Chem. Phys. 117(Dec. 8, 2002):10215-10222.

Guangquan Lu, John E. Crowell, "The adsorption and thermal decomposition of digermane on Ge(111)," J. Chem. Phys. 98(Feb. 15, 1993):3415-3421.

N. Oyabu, O. Custance, M. Abe, S. Moritabe, "Mechanical Vertical Manipulation of Single Atoms on the Ge (111)-c(2x8) Surface by Noncontact Atomic Force Microscopy," Abstracts of Seventh International Conference on Non-Contact Atomic Force Microscopy, Seattle, Washington, USA, Sep. 12-15, 2004.

P.D. Nellist, M.F. Chisholm, N. Dellby, O.L. Krivanek, M.F. Murfitt, Z.S. Szilagyi, A.R. Lupini, A. Borisevich, W.H. Sides, Jr., S.J. Pennycock, "Direct Sub-Angstrom Imaging of a Crystal Lattice," Science 305 (Sep. 17, 2004):1741.

G. Basile, P. Becker, A. Bergamin, G. Cavagnero, A. Franks, K. Jackson, U. Kuetgens, G. Mana, E. W. Palmer, C.J. Robbie, M. Stedman, J. Stumpel, A. Yacoot, G. Zosi, "Combined optical and X-ray interferometry for high-precision dimensional metrology", Proc. R. Soc. Lond. A (2000) 456, 701-729.

Y. Sugimoto, P. Pou, O. Custance, P. Jelinek, M. Abe, R. Perez, S. Morita, "Complex Patterning by Vertical Interchange Atom Manipulation Using Atomic Force Microscopy", Science 322, 413 (2008).

Artyukhov, V. I., "A six degree of freedom nanomanipulator design based on carbon nanotube bundles." Nanotechnology 21(38): 9 (2010).

Duwez, A., Cuenot, S., et al., "Mechanochemistry: targeted delivery of single molecules." Nature Nanotechnology 1 (2): 122-125 (2010).

Ho, W. and Lee, H., "Single bond formation and characterization with a scanning tunneling microscope." Science (286): 1719-1722 (2010).

(56) References Cited

OTHER PUBLICATIONS

Tarasov, D., Akberova, N., et al. (2010). "Optimal Tooltip Trajectories in a Hydrogen Abstraction Tool Recharge Reaction Sequence for Positionally Controlled Diamond Mechanosynthesis." J. Comput. Theor. Nanosci. 7(2): 325-353.
Yang, S. H., Kim, Y.S., et al. (2012). "Microelectromechanical systems based Stewart platform with sub-nano resolution." Appl. Phys. Lett. 101(6): 5.
Johannes, M. S. (2006). "Automated CAD/CAM-based nanolithography using a custom atomic force microscope." IEEE Transactions on Automation Science and Engineering 3(3): 236-239.
Ramachandran, T., Baur, C., et al. (1998). "Direct and Controlled Manipulation of Nanometer-Sized Particles Using the Non-Contact Atomic Force Microscope." Nanotechnology(9): 237-245.
Tay, A. B. H. and Thong, J. T. L. (2004). "Fabrication of super-sharp nanowire atomic force microscope using a field emission induced growth technique." Review of Scientific Instruments 75(10).
Wong, S., Woolley, A., et al. (1999). "Functionalization of carbon nanotube AFM probes using tip-activated gases." Chemical Physics Letters(306): 219-225.
Hafner, J., Cheung, C., et al. (2001). "Structural and Functional Imaging with Carbon Nanotube AFM Probes." Progress in Biophysics & Molecular Biology 1(77): 73-110.
Chen, H. (2006). "CAD-guided automated nanoassembly using atomic force microscopy-based nonrobotics." IEEE Transactions on Automation Science and Engineering 3(3): 208-217.
Grandbois, M., Dettmann, W., et al. (2000). "Affinity Imaging of Red Blood Cells Using an Atomic Force Microscope." Journal of Histochemistry & Cytochemistry(48): 719-724.
Morita, S., Sugimoto, Y., et al. (2004). "Atom-selective imaging and mechanical atom manipulation using the noncontact atomic force microscope." J. Electron Microsc. 53(2): 163-168.
Meyer, G., Neu, B., et al (1995), Building Nanostructures by Controlled Manipulation of Single Atoms and Molecules with the Scanning Tunneling Microscope, Phys Stat Sol.
Bartels, L., Meyer, G., et al. (1997) "Controlled vertical manipulation of single CO molecules with the scanning tunneling microscope: A route to chemical contrast", Applied Physics Letters.
Bartels, L., Meyer, G., et al. (1997) "Basic Steps of Lateral Manipulation of Single Atoms and Diatomic Clusters with a Scanning Tunneling Microscope Tip", Physical Review Letters.
Hla, S., Bartels, L., et al. (2000), "Inducing All Steps of a Chemical Reaction with the Scanning Tunneling Microscope Tip: Towards Single Molecule Engineering", Physical Review Letters.
Balasubramanian, K. and Burghard, M. (2005), "Chemically functionalized carbon nanotubes", Small 2005, 1, No. 2, 180-192.
Herman, A. (2012), "Toward Mechanosynthesis of Diamondoid Structures: IX Commercial Capped CNT Scanning Probe Microscopy Tip as Nowadays Available Tool for Silylene Molecule and Silicon Atom Transfer", Journal of Computational and Theoretical Nanoscience.
Herman, A. (2013), "Toward Mechanosynthesis of Diamondoid Structures: X. Commercial Capped CNT SPM Tip as Nowadays Available C2 Dimer Placement Tool for Tip-Based Nanofabrication", Journal of Computational and Theoretical Nanoscience.
Lagoute, J., Liu, X., et al. (2006), "Electronic properties of straight, kinked, and branched Cu/Cu(111)quantum wires: A low-temperature scanning tunneling microscopy and spectroscopy study", Physical Review B.
Murota, J., Sakuraba, M., et al. (2006), "Atomically Controlled Processing for Group IV Semiconductors by Chemical Vapor Deposition", Japanese Journal of Applied Physics.
Zhang, B., Wepf, R., et al. (2011), "The Largest Synthetic Structure with Molecular Precision: Towards a Molecular Object", Angewandte Chemie International Edition.
Freitas, R. and Merkle, R. (2008), "A Minimal Toolset for Positional Diamond Mechanosynthesis", Journal of Computational and Theoretical Nanoscience.
Mann, D., Peng, J., et al. (2004), "Theoretical Analysis of Diamond Mechanosynthesis. Part II. C2 Mediated Growth of Diamond C(110) Surface via Si/Ge-Triadamantane Dimer Placement Tools", Journal of Computational and Theoretical Nanoscience.
Peng, J., Freitas, R., et al. (2004), "Theoretical Analysis of Diamond Mechanosynthesis. Part I. Stability of C2 Mediated Growth of Nanocrystalline Diamond C(110) Surface", Journal of Computational and Theoretical Nanoscience.

\* cited by examiner

M = Si, Ge
R = -H, -CH$_3$

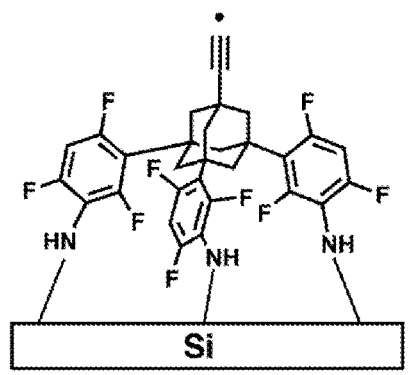 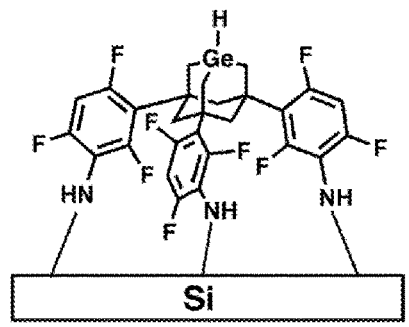
FIG. 8  FIG. 9
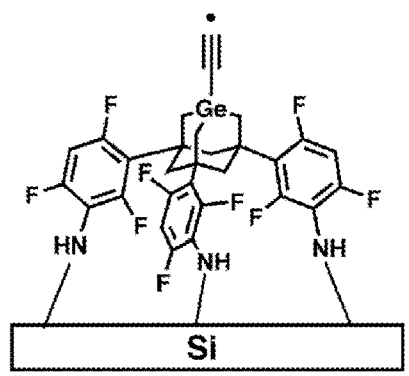 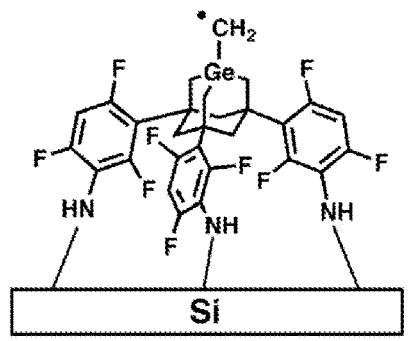
FIG. 10  FIG. 11
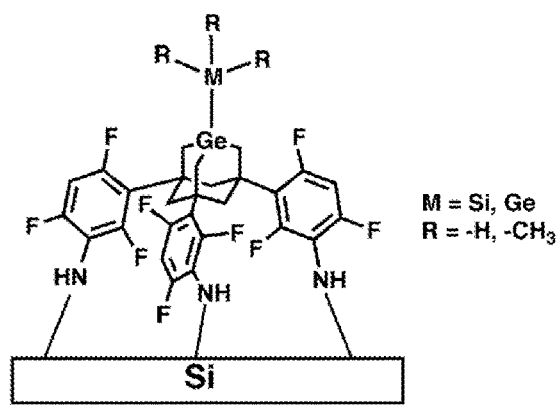
FIG. 12

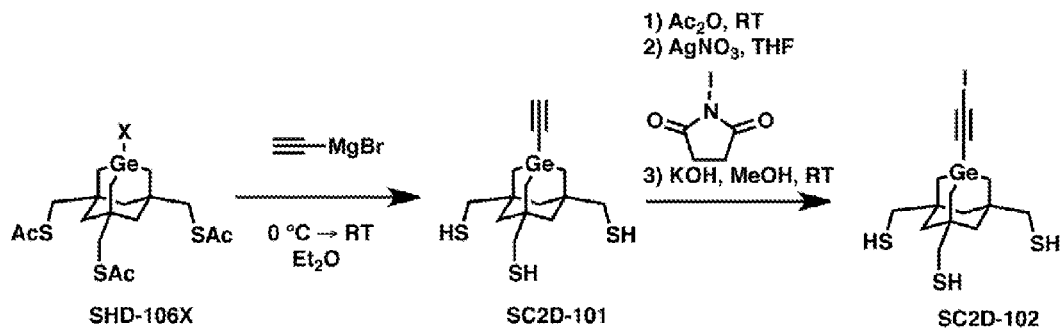
FIG. 36
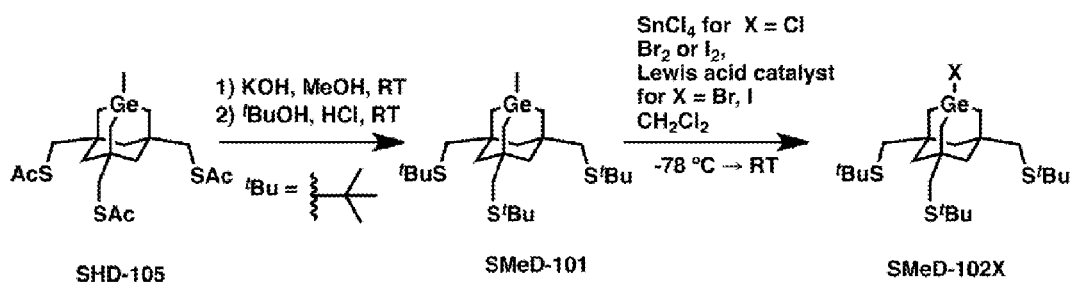
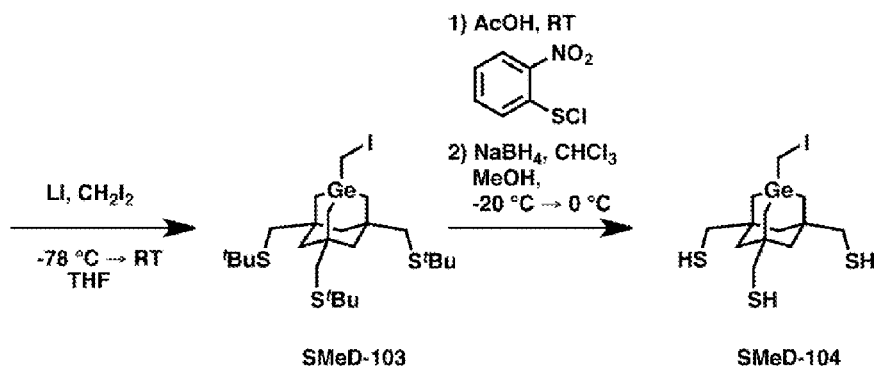
FIG. 37

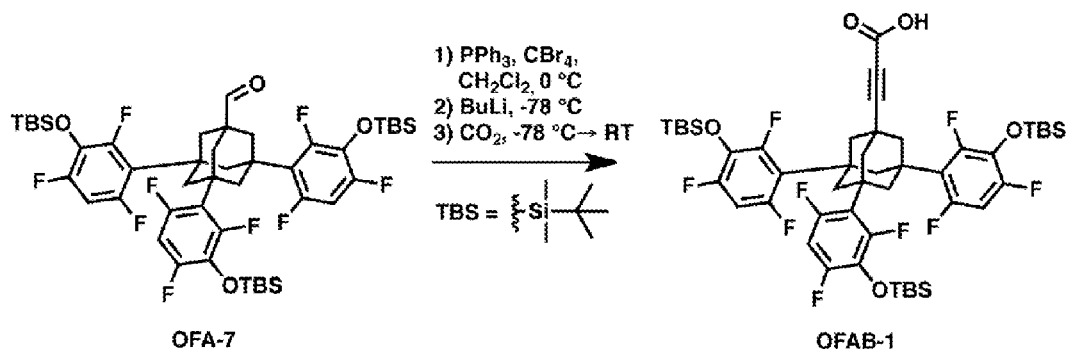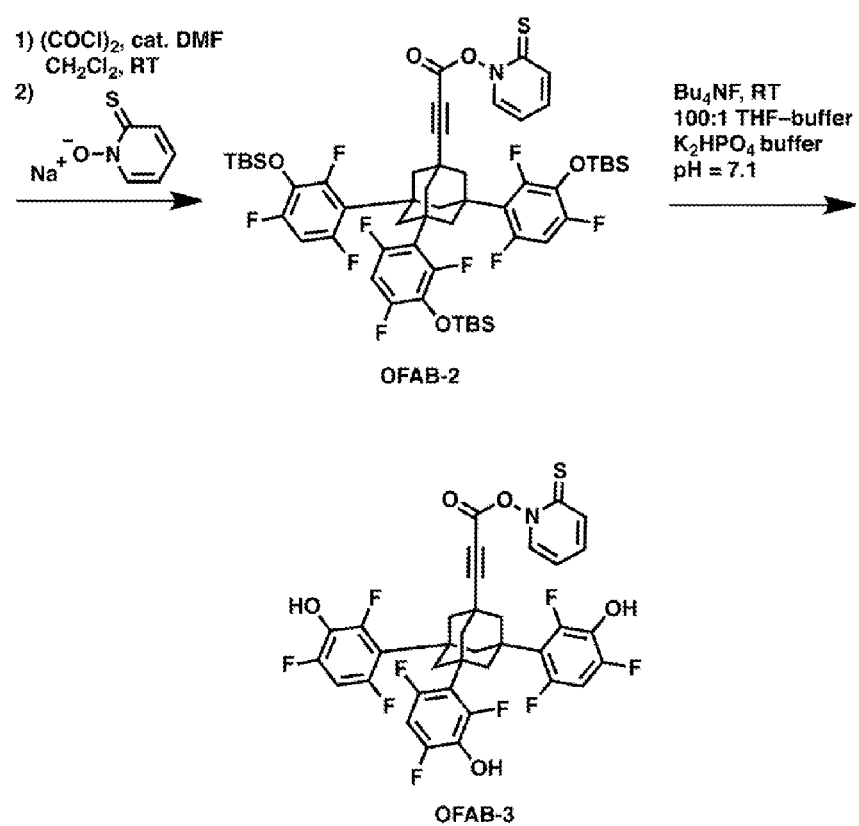
FIG. 46

BUILD SEQUENCES FOR MECHANOSYNTHESIS

CROSS-REFERENCE TO RELATED APPLICATIONS

This application is a continuation, and claims priority to, pending application Ser. No. 15/588,494, filed 5 May 2017 and which is a continuation-in-part of, and claims priority to, application Ser. No. 14/712,506, filed 14 May 2015, which has matured into U.S. Pat. No. 9,676,677, and which is a continuation-in-part, and claims priority to, PCT/US13/28419, filed 28 Feb. 2013. Application Ser. Nos. 15/588,494, 14/712,506 and PCT/US13/28419 are hereby incorporated by reference.

FEDERALLY SPONSORED RESEARCH

Not applicable.

SEQUENCE LISTING OR PROGRAM

Not applicable.

TECHNICAL FIELD

The present application relates to mechanosynthesis, the fabrication of atomically precise tools and materials using individual atoms or small groups of atoms as the fundamental building blocks, and more particularly, to devices, methods and systems for performing ordered sequences of site-specific positionally controlled chemical reactions that are induced by use of mechanical force.

BACKGROUND OF THE INVENTION

Mechanosynthesis and Related Techniques

Scanning Probe Microscopy (SPM, in which we include all related techniques such as AFM, STM and others) laboratories have been manipulating individual atoms and molecules for decades. (Eigler and Schweizer, "Positioning Single Atoms with a Scanning Tunnelling Microscope," Nature. 1990. 344:524-526; Eigler, Lutz et al., "An atomic switch realized with the scanning tunneling microscope," Nature. 1991. 352:600-603; Stroscio and Eigler, "Atomic and Molecular Manipulation with the Scanning Tunneling Microscope," Science. 1991. 254:1319-1326; Meyer, Neu et al., "Controlled lateral manipulation of single molecules with the scanning tunneling microscope," Applied Physics A. 1995. 60:343-345; MEYER, NEU et al., "Building Nanostructures by Controlled Manipulation of Single Atoms and Molecules with the Scanning Tunneling Microscope," phys Stat Sol (b). 1995. 192:313-324; Bartels, Meyer et al., "Basic Steps of Lateral Manipulation of Single Atoms and Diatomic Clusters with a Scanning Tunneling Microscope Tip," PHYSICAL REVIEW LETTERS. 1997. 79:697-700; Bartels, Meyer et al., "Controlled vertical manipulation of single CO molecules with the scanning tunneling microscope: A route to chemical contrast," Applied Physics Letters. 1997. 71:213; Huang and Yamamoto, "Physical mechanism of hydrogen deposition from a scanning tunneling microscopy tip," Appl. Phys. A. 1997. 64:R419-R422; Bartels, Meyer et al., "Dynamics of Electron-Induced Manipulation of Individual CO Molecules on Cu(111)," PHYSICAL REVIEW LETTERS. 1998. 80; Ho and Lee, "Single bond formation and characterization with a scanning tunneling microscope," Science 1999.1719-1722; Hersam, Guisinger et al., "Silicon-based molecular nanotechnology," Nanotechnology. 2000; Hersam, Guisinger et al., "Silicon-based molecular nanotechnology," Nanotechnology. 2000. 11:70; Hla, Bartels et al., "Inducing All Steps of a Chemical Reaction with the Scanning Tunneling Microscope Tip—Towards Single Molecule Engineering," PHYSICAL REVIEW LETTERS. 2000. 85:2777-2780; Lauhon and Ho, "Control and Characterization of a Multistep Unimolecular Reaction," PHYSICAL REVIEW LETTERS. 2000. 84:1527-1530; Oyabu, Custance et al., "Mechanical vertical manipulation of selected single atoms by soft nanoindentation using near contact atomic force microscopy," Phys. Rev. Lett. 2003. 90; Basu, Guisinger et al., "Room temperature nanofabrication of atomically registered heteromolecular organosilicon nanostructures using multistep feedback controlled lithography," Applied Physics Letters. 2004. 85:2619; Morita, Sugimoto et al., "Atom-selective imaging and mechanical atom manipulation using the non-contact atomic force microscope," J. Electron Microsc. 2004. 53:163-168; Ruess, Oberbeck et al., "Toward Atomic-Scale Device Fabrication in Silicon Using Scanning Probe Microscopy," Nano Letters. 2004. 4; Stroscio and Celotta, "Controlling the Dynamics of a Single Atom in Lateral Atom Manipulation," Science. 2004. 306:242-247; Duwez, Cuenot et al., "Mechanochemistry: targeted delivery of single molecules," Nature Nanotechnology. 2006. 1:122-125; Iancu and Hla, "Realization of a four-step molecular switch in scanning tunneling microscope manipulation of single chlorophyll-a molecules," Proc Natl Acad Sci USA. 2006. 103:13718-21; Ruess, Pok et al., "Realization of atomically controlled dopant devices in silicon," Small. 2007. 3:563-7; Sugimoto, Pou et al., "Complex Patterning by Vertical Interchange Atom Manipulation Using Atomic Force Microscopy," Science. 2008. 322:413-417; Randall, Lyding et al., "Atomic precision lithography on Si," J. Vac. Sci. Technol. B. 2009; Owen, Ballard et al., "Patterned atomic layer epitaxy of Si/Si(001):H," Journal of Vacuum Science & Technology B: Microelectronics and Nanometer Structures. 2011. 29:06F201; Wang and Hersam, "Nanofabrication of heteromolecular organic nanostructures on epitaxial graphene via room temperature feedback-controlled lithography," Nano Lett. 2011. 11:589-93; Kawai, Foster et al., "Atom manipulation on an insulating surface at room temperature," Nat Commun. 2014. 5:4403) These efforts have generally been limited to simple one- or two-dimensional structures, but the techniques are powerful enough to have already demonstrated basic molecular-scale logic (Heinrich, Lutz et al., "Molecule Cascades," Science. 2002. 298:1381-1387) and to have inspired commercial efforts to build atomically-precise structures, including work towards quantum computers. (Ruess, Oberbeck et al., "Toward Atomic-Scale Device Fabrication in Silicon Using Scanning Probe Microscopy," Nano Letters. 2004. 4; Ruess, Pok et al., "Realization of atomically controlled dopant devices in silicon," Small. 2007. 3:563-7; Randall, Lyding et al., "Atomic precision lithography on Si," J. Vac. Sci. Technol. B. 2009.)

Previously, atom manipulation was performed using one of three techniques: Feedback Controlled Lithography (FCL), horizontal atom manipulation, or vertical atom manipulation. FCL uses a scanning probe tip to remove atoms (e.g., passivating hydrogens) from a surface, creating chemically-reactive radical patterns on that surface, followed by bulk chemical reactions that take advantage of the new radical sites to create a surface modified at specific atomic locations. Horizontal atom manipulation relies upon dragging atoms across flat surfaces to place them at specific locations, in effect decorating a surface with atomically-precise designs. Vertical atom manipulation, often referred to as mechanosynthesis, includes the deposition of single atoms or molecules, such as CO, as well as vertical atom interchange, which allows a surface and tip atom to be swapped. (Oyabu, Custance et al., "Mechanical vertical manipulation of selected single atoms by soft nanoindentation using near contact atomic force microscopy," Phys. Rev. Lett. 2003. 90; Morita, Sugimoto et al., "Atom-selective imaging and mechanical atom manipulation using the non-contact atomic force microscope," J. Electron Microsc. 2004. 53:163-168; Oyabu, Custance et al., "Mechanical Vertical Manipulation of Single Atoms on the Ge(111)-c(2× 8) Surface by Noncontact Atomic Force Microscopy," Seventh International Conference on non-contact Atomic Force Microscopy. Seattle, Wash. 2004.34; Sugimoto, Pou et al., "Complex Patterning by Vertical Interchange Atom Manipulation Using Atomic Force Microscopy," Science. 2008. 322:413-417; Tarasov, Akberova et al., "Optimal Tooltip Trajectories in a Hydrogen Abstraction Tool Recharge Reaction Sequence for Positionally Controlled Diamond Mechanosynthesis," J. Comput. Theor. Nanosci. 2010. 7:325-353; Herman, "Toward Mechanosynthesis of Diamondoid Structures: IX Commercial Capped CNT Scanning Probe Microscopy Tip as Nowadays Available Tool for Silylene Molecule and Silicon Atom Transfer," Journal of Computational and Theoretical Nanoscience. 2012. 9:2240-2244; Herman, "Toward Mechanosynthesis of Diamondoid Structures: X. Commercial Capped CNT SPM Tip as Nowadays Available C2 Dimer Placement Tool for Tip-Based Nanofabrication," Journal of Computational and Theoretical Nanoscience. 2013. 10:2113-2122; Kawai, Foster et al., "Atom manipulation on an insulating surface at room temperature," Nat Commun. 2014. 5:4403)

As previously implemented, each of these atom manipulation techniques modifies a single atomic layer on a surface, does so using a very limited palette of reactions and reactants, and cannot manufacture complex, three-dimensional products.

Previous work by the current inventors, including U.S. Pat. Nos. 8,171,568, 8,276,211, 9,244,097, US Patent Application 20150355228, US Patent Application 20160167970 and PCT Application WO/2014/133529 sought to address some of the shortcomings of prior atom manipulation techniques via improved implementations of mechanosynthesis. These references describe various aspects of mechanosynthesis, including a bootstrap process for preparing atomically-precise tips from non-atomically-precise tips, reactions that can be used to build three-dimensional workpieces, methods for ordering such reactions into build sequences, provisioning of feedstock, and disposal of waste atoms.

Nonetheless, room for improvement still exists. Accordingly, it is an object of the invention to improve the manufacturing of three-dimensional workpieces via mechanosynthesis.

BRIEF SUMMARY OF THE INVENTION

The present invention is directed to processes for creating build sequences which are determined using computational chemistry algorithms to simulate mechanosynthetic reactions, and which may use the mechanosynthesis process conditions or equipment limitations in these simulations, and which facilitate determining a set of mechanosynthetic reactions that will build an atomically-precise workpiece with a desired degree of reliability. Included are methods for error correction of pathological reactions or avoidance of pathological reactions. Libraries of reactions may be used to reduce simulation requirements.

BRIEF DESCRIPTION OF DRAWINGS

For a more complete understanding of the present invention, reference is now made to the following descriptions taken in conjunction with the accompanying drawings, in which:

FIG. 8 depicts the AbstractionNH tip surface-mounted on Silicon.

FIG. 9 depicts the HDonationNH tip surface-mounted on Silicon.

FIG. 10 depicts the C2DonationNH tip surface-mounted on Silicon.

FIG. 11 depicts the MeDonationNH tip surface-mounted on Silicon.

FIG. 12 depicts a tip surface-mounted on Silicon which can be SiH3DonationNH, GeH3DonationNH, SiMe3DonationNH or GeMe3DonationNH.

FIG. 36 depicts a synthetic route for the C2DonationS tip.

FIG. 37 depicts a synthetic route for the MeDonationS tip.

FIG. 46 depicts an exemplary synthesis of a tip with Barton ester cap.

DETAILED DESCRIPTION OF THE INVENTION

Definitions

Figure 1:
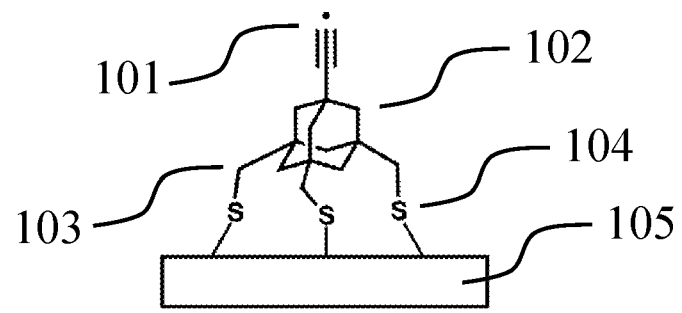
FIG. 1 depicts the modular parts of an exemplary tip.

The following definitions are used herein:

An "adamantane" molecule comprises a 3D cage structure of ten carbon atoms, each terminated with one or two hydrogen atoms, having the chemical formula $C_{10}H_{16}$ in its fully hydrogen-terminated form. Adamantane is the smallest possible unit cage of crystalline diamond.

An "adamantane-like" structure includes one or more adamantanes, one or more adamantanes where one or more atoms have been substituted with atoms or molecular fragments of like or similar valence, including e.g., Nitrogen, Oxygen, and Sulfur-substituted variations, and similar molecules comprising polycyclic or cage-like structures. By way of example, and not of limitation, adamantane-like structures would include adamantane, heteroadamantanes, polymantanes, lonsdaleite, crystalline silicon or germanium, and versions of each of the foregoing where, for example, Fluorine or another halogen is used for termination instead of Hydrogen, or where termination is incomplete.

An "aperiodic" workpiece is one where the overall shape or atomic constituents do not result directly from the crystal structure or lattice of the workpiece. For example, diamond crystals tend to form an octahedral shape due to the bond angles of the underlying atoms. An octahedral diamond crystal, or variations thereof, could be said to be periodic because both the internal structure and the external shape is determined by the periodic structure of the crystal. On the other hand, a diamond shaped like a car cannot be said to be periodic because, internal structure aside, there is no way the lattice cell of diamond could have specified the shape of a car. Another example of aperiodic diamond would be a crystal composed largely of diamond, but with irregular (with respect to the crystal matrix) substitutions made within its matrix, such as the replacement of some carbon atoms with silicon or germanium. Almost any complex shape or part is going to be aperiodic because of its shape, its atomic constituents, or both. Note that aperiodic does not necessarily mean irregular. Take, for example, a conventional gear made of diamond. The round, symmetrical shape of a gear and its teeth are radially symmetric and have a kind of periodicity. However, this periodicity is not derived from the underlying crystal structure. For a structure to be periodic, it is not enough that it be regular; it must be regular in a manner that is derived from its crystal structure. While this definition may seem pedantic, it is useful when discussing the differences between an engineered, atomically-precise material versus a naturally-occurring or bulk-synthesized crystal. Naturally-occurring or bulk-synthesized crystals are generally, impurities or bonding errors notwithstanding, periodic structures. There is no way know to the authors to make them both atomically-precise and aperiodic since their method of manufacture inherently relies upon the periodic crystal structure given elements form under a particular set of conditions, rather than controlling the structure atom by atom as can be done with a positionally-controlled technology like mechanosynthesis.

An "atom" includes the standard use of the term, including a radical, which, for example, may be just a proton in the case of $H^+$.

"Atomically-precise" in the context of a reaction means where the position and identity of each atom is known to a precision adequate to enable the reaction to be directed to a particular atomic site ("site-specific"). In the context of a workpiece, atomically-precise refers to the actual molecular structure being identical to the specified structure (e.g., as specified by a molecular model or build sequence).

The "bridgehead" position in an adamantane-like molecular structure refers to a structural atom that is bonded to three other structural atoms and may be terminated by one or more nonstructural atoms. This is contrasted with a "sidewall" position which refers to a structural atom that is bonded to two other structural atoms and is terminated by one or more nonstructural atoms.

A "build sequence" is one or more mechanosynthetic reactions arranged in an ordered sequence that permits the assembly, disassembly, or modification of a workpiece.

A "chemical bond" is an interatomic covalent bond, an interatomic ionic bond, or interatomic coordination bond, as these terms are commonly understood by practitioners skilled in the art.

A "chemical reaction" is said to occur when chemical bonds are formed, broken, or altered.

"Conventional mode" is where one or more tips are affixed to a positional means/device (e.g., an SPM probe) to facilitate mechanosynthetic reactions between the tips and a workpiece. This contrasts with "inverted mode" where a workpiece is affixed to a positional means and the workpiece moves to the tips. Although uncommon in practice, since in theory both tips and workpiece could be affixed to a positional means, another way to distinguish between the modes would be to say that if the workpiece is connected to apparatus which indicates that the workpiece is being used as a probe (e.g., if STM is being done through the workpiece), the system is operating in inverted mode. Otherwise, the system is operating in conventional mode. Conventional mode tips are generally affixed to a positional means singly or in small numbers, while in inverted mode, a larger, generally stationary, presentation surface allows the provisioning of large numbers of surface-mounted tips. Note that although inverted mode and surface mounted tips may be used together, inverted mode should not be conflated with surface-mounted tips. As is described herein (the sequential tip method), surface-mounted tips can be used in a system which is operating in conventional mode.

A "conventional mode tip" is a tip affixed to a positional means or otherwise being employed in conventional mode as described in that definition, just as an "inverted mode tip" is a tip affixed to a presentation surface or otherwise being employed in "inverted mode" as described in that definition.

"Diamond" is a crystal of repeating adamantane cage units arranged in various well-known crystallographic lattice geometries.

"Diamondoid" materials include any stiff covalent solid that is similar to diamond in strength, chemical inertness, or other important material properties, and possesses a three-dimensional network of bonds. Examples of such materials include but are not limited to (1) diamond, including cubic and hexagonal lattices and all primary and vicinal crystallographic surfaces thereof, (2) carbon nanotubes, fullerenes, and other graphene structures, (3) several strong covalent ceramics of which silicon carbide, silicon nitride, and boron nitride are representative, (4) a few very stiff ionic ceramics of which sapphire (monocrystalline aluminum oxide) is representative, and (5) partially substituted variants of the above that are well-known to those skilled in the art.

"Feedstock" is the supply of atoms used to perform mechanosynthetic reactions. Feedstock may take the form of one or more atoms, including radicals (e.g., .GeH2, .CH2). Feedstock includes atoms removed from a workpiece. For example, a hydrogen atom from a workpiece may be the feedstock for a hydrogen abstraction tip. In such cases, since frequently nothing is subsequently to be done with atoms removed from a workpiece, such feedstock may be referred to as "waste atoms." Feedstock must be atomically-precise.

A "handle structure" comprises a plurality of atoms whose bonding pattern is not altered during a site-specific mechanosynthetic chemical reaction and whose primary function is to hold a tip(s) or workpiece(s) to facilitate a mechanosynthetic chemical reaction when the handle structure is manipulated by a positional device. Handle structure may include the null case (e.g., a tip or workpiece bound directly to a positional means).

An "inert environment" includes, but is not limited to, ultra-high vacuum (UHV), argon, nitrogen, helium, neon, or other gases or liquids, either individually or in combination, that do not react with the tip(s), feedstock, or workpiece(s) during mechanosynthetic operations.

"Inverted mode": see definition within "Conventional Mode" definition.

"Mechanical force" may include applied mechanical forces having positive, negative, or zero magnitude. Chemical reactions driven by the application of mechanical force include reactions that are (1) driven through its reaction barrier by mechanically forcing reactants or products through the transition state, or (2) driven away from an undesired reaction by mechanically restraining potentially reactive sites from attaining closer physical proximity, or (3) allowed to occur by bringing potentially reactive sites into closer physical proximity when zero mechanical force is required to do so, as for example when no reaction barrier exists, or when thermal energy alone is sufficient to surmount the reaction barrier.

"Mechanosynthesis" is the use of positional control and mechanical force to facilitate site-specific chemical reactions involved in the building, alteration, or disassembly of a workpiece. Mechanosynthesis does not require voltage biases, but neither does it exclude their use.

A "mechanosynthetic reaction" (sometimes referred to as a "reaction" when context makes it clear that the reaction is mechanosynthetic) is a chemical reaction carried out using mechanosynthesis.

A "meta-tip" is a handle to which multiple tips are attached. For example, a meta-tip could be prepared using a conventional SPM probe with a flat surface on the end, which is then functionalized with multiple tips.

A "modular tip" is a tip with a modular design. Modules include an active site, a body, feedstock, legs, and linkers. Some of these modules may be considered to be modular themselves. For example, a body contains an active site, and the active site may be said to include feedstock. Similarly, linkers can be thought of as part of the leg module. A modular tip may be referred to as simply a "tip" when context makes the type of tip clear.

A "positional device" is a device capable of exerting atomically-precise positional control on a mechanosynthetic tip, tool, or workpiece, and may include, but is not limited to, scanning probe microscopes (SPM) and atomic force microscopes (AFM) and related devices, a miniaturized or MEMS-scale SPM or AFM, a robotic arm mechanism of any size scale, or other appropriate manipulation system capable of atomically-precise positional control and appropriate force application. Many types of such positional devices are known to those skilled in the art, but for example, actuators can be based upon piezo elements or electrostatics. Metrology based upon piezo elements, or optical (e.g., interferometry), capacitive, or inductive techniques, or other technology, can be used for positional feedback if required.

A "presentation surface" is a surface which can be used to bind feedstock or tips for use in mechanosynthesis, and as a base on which to build a workpiece. Although generally monolithic, a presentation surface can be composed of more than one material (e.g., gold and silicon could both be used where each has advantageous aspects), or composed of multiple non-adjacent surfaces. A presentation surface may be referred to simply as a "surface" when context makes the meaning clear. Presentation surfaces include the appropriate area(s) on handle structures and meta-tips. Presentation surfaces are preferably as close as possible to atomically-flat, but this is largely a convenience having to do with standard equipment design, and to facilitate higher speeds and reduced scanning (e.g., to create topological maps of non-flat surfaces), rather than an absolute requirement.

"Site-specific" refers to a mechanosynthetic reaction taking place at a location precise enough that the reaction takes place between specific atoms (e.g., as specified in a build sequence). The positional accuracy required to facilitate site-specific reactions with high reliability is generally sub-angstrom. With some reactions that involve large atoms, or those with wide trajectory margins, positional uncertainty of about 0.3 to 1 angstrom can suffice. More commonly, a positional uncertainty of no more than about 0.2 angstroms is needed for high reliability. Some reactions, for example, due to steric issues, can require higher accuracy, such as 0.1 angstroms. These are not hard cutoffs; rather, the greater the positional uncertainty, the less reliable a reaction will be.

A "structural atom" in an adamantane-like molecular structure refers to an atom comprising the cage framework, for example a carbon atom in an adamantane molecule. More generally, a structural atom is an atom that comprises part of the backbone or overall structure in a highly-bonded molecule.

A "synthetic tip" is an atomically-precise tip manufactured via a bulk method, such as gas or solution-phase chemistry, rather than via mechanosynthesis. A synthetic tip be referred to as simply a "tip" when context makes the type of tip clear.

A "terminating atom" refers to an atom that does not serve as a structural atom but absorbs unused valences of a structural atom. For example, a hydrogen atom in an adamantane molecule.

A "three-dimensional" workpiece means a workpiece including a lattice of atoms whose covalent structure occupies more than a single plane, discounting bond angles. Under this definition, for example, most proteins (discounting e.g., disulfide inter- or intra-molecular bonds) and other polymers would be two dimensional, as would a plane of graphene. A covalent network solid or a carbon nanotube would be three-dimensional.

A "tip" is a device for facilitating mechanosynthetic reactions which includes one or more "active" atoms or sites whose bonding pattern or electronic state is altered during a mechanosynthetic operation, and one or more "support" atoms whose bonding pattern or electronic state is not altered during a mechanosynthetic operation. The support atoms hold the active atoms in position, and may also modify the chemical behavior of the one or more active atoms. Unless otherwise specified, a tip is atomically-precise.

"Tip swapping" is the process of connecting a new tip and handle structure to a positional means. In conventional SPM, this may be done by, for example, manually changing the probe, or using equipment with probe magazines which hold multiple probes and can automate tip swapping.

A "tool" comprises a tip, potentially bonded to a handle, controlled by a positional device or means.

A "workpiece" is an apparatus, article of manufacture, or composition of matter, built via mechanosynthesis. A system may have more than one workpiece. A workpiece may be connected to, but does not include, non-atomically-precise structures such as a support substrates or pre-existing structures onto which a workpiece is built.

Chemical Structure and Scientific Notation

A dot (".") is may be used in chemical structures herein to represent an electron, as in the radical group ".CH2". For ease of typesetting, the notation herein generally omits subscript or non-standard characters. Superscript may be written using the "^" character when required for clarity.

Synthetic Tips

Previous literature described (see, e.g., U.S. Pat. No. 9,244,097 or WO2014/133529) a bootstrap process to facilitate the creation of atomically-precise tips from atomically-imprecise tips using mechanosynthesis. This is a potentially complex process, requiring the characterization of atomically-imprecise tips, to then perform mechanosynthetic reactions with those tips, to build atomically-precise tips. Being able to skip this step is therefore quite useful. As an alternate method of preparing atomically-precise tips, we describe the bulk synthetic chemical preparation (and if appropriate, passivation, and depassivation or activation) of various atomically-precise tips.

Bulk synthetic preparation of tips allow the avoidance of a bootstrapping process. As will also been seen, bulk presentation of such tips on a surface allows a fundamentally different way of dealing with feedstock provisioning, waste atom disposal, and access to multiple tips.

With respect to feedstock provisioning, previous work such as WO2014/133529 describes the use of feedstock depots and trash depots. Feedstock depots are presentation surfaces to which feedstock has been directly bound. Trash depots are surfaces which provide for waste disposal by allowing a tip to transfer unwanted atoms from the tip to the surface. One drawback to this method is the lack of chemical diversity available on the surface(s). On a uniform surface, different feedstock will have different affinity, potentially higher or lower than optimal. Herein we describe a way to completely avoid needing to bind feedstock or waste atoms directly to a surface by using "tips on a surface." In addition to using presentation surfaces directly as feedstock and trash depots, previous proposals describe rechargeable tips, employing strategies that use a relatively small number of tips over and over again during a build sequence. Herein we describe methods for partially or completely avoiding tip reuse, and hence we are able to omit tip recharge steps (e.g., as described in WO2014/133529), streamlining the entire process.

Synthetic tips, because they can be made via bulk chemistry techniques, are available in very large numbers after synthesis (like the molecules in most bulk chemical reactions, "very large numbers" can mean up to millions, billions, or even far more, ranging into numbers that require scientific notation to easily express). Therefore, a large number of synthetic tips could be affixed to a presentation surface. The synthetic tips can be pre-charged (meaning, the tips are already in the chemical state desired to carry out the intended reactions, such as already being bonded to feedstock), and they can include large numbers of every type of tip required for a given build sequence. In this way, the presentation surface can serve purposes including being a feedstock depot (the synthetic tips already being charged with their feedstock), a trash depot (e.g., radical tips could be used to bind waste atoms), and a varied collection of tips that can carry out all necessary reactions (for example, almost any number of tips, including all the tips described herein, or in previous work such as WO2014/133529, could be present on a presentation surface, and all in large numbers). Using a large number of synthetic tips also allows each tip to be disposable, rather than requiring recharge for subsequent use, avoiding the need to design and perform recharge operations.

The availability of large numbers of tips on a surface raises the idea that a workpiece could be connected to a positional means, allowing the workpiece to move to the tips ("inverted mode"), rather than tips moving to the workpiece ("conventional mode"). Conceptually, if the workpiece moves and the presentation surface is stationary, one could think of a build sequence as a workpiece moving around a presentation surface, aligning itself with a desired tip, and then being brought into contact with that tip with sufficient force to trigger a mechanosynthetic reaction. The tip that was used is then spent, but the presentation surface can easily provide large numbers of tips. The build sequence proceeds by then aligning the workpiece with the next appropriate unspent tip and bringing them together. This process repeats until the entire workpiece is built.

Note that, as is discussed elsewhere herein, in some embodiments, the process of mechanosynthesis may involve scanning the presentation surface to establish a topological map and the positions of the tips to be used. If the tips have been mapped, software can be used to keep track of which locations have been used and which have not. An alternative implementation would be to simple scan for unused tips as they are needed, since a used tip and an unused tip would have markedly different characteristics when evaluated via, e.g., STM.

Other variations on this concept are also possible, including a tool which holds multiple tips (a "meta-tip"). Such designs may be more efficient than a tool holding a single tip because multiple reactions could be performed without requiring tip swapping or tip recharge. Whether the tips reside on a presentation surface, or on a tool, and whether the presentation surface, the tool, the workpiece, or some combination thereof are coupled to positional means, the overarching point is a design which has at least some of the following characteristics and advantages, among others.

First, a plurality of tips can be made available. These tips could be all the same, or could include many different types of tips. If multiple tip types are present, they could be randomly intermingled, segregated by sector or position, or the tips could be laid out in an order which maximizes the efficiency of a build sequence (for example, by arranging different tip sectors in a manner that minimizes the movement required to perform the mechanosynthetic operations to build a particular workpiece, or considering a more general design, locating tips that are apt to be used more frequently closer to the workpiece, or locating tip sectors concentrically around a workpiece to minimize total tip to workpiece distance regardless of the order of reactions).

Second, due to the large number of tips that are accessible to the system, tip recharge may be reduced or eliminated during a build sequence. Each tip can be used once, and then ignored once it is spent. By eliminating recharge reactions, shorter, faster build sequences are facilitated. If additional tips were still required, e.g., for a workpiece requiring a number of tips beyond that which are available, the strategy of mounting a large number of tips, preferably in their ready-to-use state, on a surface, allows the bulk replacement of tips by swapping in a new surface. In this scenario, tip recharge is not completely eliminated, but it is greatly reduced.

Third, tips do not have to be swapped for chemical diversity because every type of tip needed for a given build sequence can be present somewhere on the presentation surface. This reduces or eliminates the need for multiple positional means or tip swapping.

Fourth, large numbers of atomically-precise tips can be prepared and affixed via bulk chemical reactions (and bulk activated, if required). This eliminates the need for a bootstrap process that uses non-atomically-precise tips to create atomically-precise tips. It also reduces or eliminates the need to build tips using mechanosynthesis, which can be useful where mechanosynthetic operations are the rate limiting step of a manufacturing process. Exemplary synthetic pathways for multiple synthetic tips are described herein.

Fifth, system complexity is kept relatively low, and the number of tips and feedstock moieties available can be relatively high, as compared to other proposals for providing feedstock via, for example, methods which require cartridges or conveyor belts (Rabani, "Practical method and means for mechanosynthesis and assembly of precise nanostructures and materials including diamond, programmable systems for performing same; devices and systems produced thereby, and applications thereof." United States. 2009. Ser. No. 12/070,489.).

With respect to the number of tips that may be available under some of these scenarios, this can vary greatly. For example, on a very small surface, such as a small flat at the end of a probe tip (which would traditionally hold one tip and could do so in some embodiments of the present invention), small numbers of tips could be provided for chemical diversity. For example, two to ten tips could be placed on the end of a probe, requiring no more than a few square nanometers of space. This would provide convenient access to tips of varying chemical nature without needing to swap probes. Assuming a build sequence requiring more reactions than a small batch of tips like this can provide, such tips would still have to be recharged, but the advantage is that this could be done chemically (e.g., by touching the tip to appropriate surfaces to abstract or donate feedstock) rather than requiring physical swapping of an entire tip and handle.

On larger surfaces, much larger numbers of tips could be presented. For example, a presentation surface on the order of square nanometers could provide dozens, hundreds, or thousands of tips. A presentation surface on the order of square microns could provide room for millions or billions of tips. And, if even larger numbers or greater space are desired, long-distance metrology can allow presentation surfaces on the order of square millimeters or centimeters while still maintaining the requisite positional accuracy. (Lawall, "Fabry-Perot metrology for displacements up to 50 mm," J. Opt. Soc. Am. A. OSA. 2005. 22:2786-2798)

When using a plurality of tips, the tips could all be the same (helping to reduce recharge reactions, as described herein), but as chemical diversity is also useful, there could also be almost any number of different types, from two different types, to the at least eight main tip/feedstock combinations described in, e.g., FIGS. 3-7 (or nine including the later-described AdamRad-Br tip), or even substantially more given the different types of linkers, feedstock, other tip designs that could be used, and the potential desire for tips to facilitate new reactions or that would work under different conditions.

Surface-Mounted Tips

Synthetic tips, if properly designed, can be chemically bound to a presentation surface, or "surface-mounted." In addition to being amenable to synthesis using traditional chemistry, and carrying out one or more mechanosynthetic reactions, surface-mounted tips are designed to allow efficient bonding to a presentation surface (often in large quantity).

Surface-mounted tips differ from the tips normally used in SPM work in that they are not simply integral to a handle structure (e.g., commercially available tips often have a tip where the crystal structure of the tip is contiguous with the handle structure; essentially the tip is just the end of the handle structure), nor are they a handle structure to which only a trivial functionalization has been added (e.g., bonding a single CO molecule to the end of an existing tip is a common technique to increase resolution). Surface-mounted tips differ from previously-proposed mechanosynthetically-created tips in that they do not require mechanosynthesis to manufacture (which has not only process implications, but structural and chemical implications since this requires that surface-mounted tips be able to bind to the desired surface without the aid of mechanosynthesis). Given this, while surface-mounted tips may appear superficially similar to other tips described in the literature, the requirements for the design of tips which are to be surface-mounted are substantially different.

Binding orientation is one issue that must be addressed when designing surface-mounted tips. It would be preferable that the tips only affix themselves to a surface in a manner that renders them properly oriented for use in mechanosynthetic reactions (although multiple possible orientations could be acceptable given the number of redundant tips that could be present—the system could scan to identify and use only tips in the desired orientation, but this reduces efficiency).

Active sites and legs are discussed in more detail herein, but are major factors in ensuring that correct binding orientation is obtained. For example, tips with radical active sites will be highly reactive in their active form. Due to this high reactivity, the active site may bind to the presentation surface instead of the legs. If this happens, the tip would end up bound to the presentation surface upside down or at least improperly oriented. Reactive sites may also form bonds to other parts of the same tip, or may form bonds to other tips, such as two tips dimerizing. This problem may be avoided in the case of reactive active sites by binding the tip to the presentation surface while the active sites are neutralized. The active sites can then be activated after leg binding. A similar issue presents itself with respect to the legs. The legs (or leg linkers) need to be reactive enough that they will bind to the presentation surface, but they must resist pathological reactions with themselves or other tips (e.g., forming a leg-leg bond instead of a leg-surface bond, or undergoing any other undesired reactions).

Of course, there are other design consideration for tips, including that they perform the desired reactions reliably during a build sequence, but the above concerns are unique to bulk-synthesized, surface-mounted tips. Tips created using mechanosynthesis can largely avoid the problems described above via the positional specificity of the reactions used in their synthesis.

Modular Tip Design

As will be seen in subsequent examples, surface-mounted tips can be thought of as being modular. Each tip can be thought of as having an active site (one or more atoms that bind a desired atom or group of atoms, which could be, e.g., feedstock for a donation reaction, or some moiety to be removed from a workpiece for an abstraction reaction), a body (adamantane or an adamantane derivative in our examples, but other structures could be used given the teachings herein), and one or more legs that serve to attach the tip to a surface. The feedstock of a tip could also be considered a module, as could the surface, which, although not technically part of the tip, can be important to tip design and function.

To aid in understanding how tips function, and how they can be rationally designed, considerations pertinent to each module are described below. Note that the specific examples presented use adamantane, or adamantane-like bodies. Many reactions for functionalizing adamantanes are known, and their stiffness, small size, computational tractability and other favorable characteristics lead us to use these structures as exemplary tips, although many different molecules, including other adamantane-like structures, could serve the same purpose.

The active site's main characteristic is that it reliably facilitate the desired reaction on a workpiece. However, how to efficiently synthesize and deliver tips to a surface, and prepare them for use, must be considered in their design. Particularly when a tip's ready-to-use form includes a radical, a tip may incorporate a protective cap (what in solution-phase chemistry is commonly referred to as a "protecting group"). This cap reduces the active site's reactivity prior to use to avoid, for example, tip-tip dimerization, binding of the active site to the surface, or other undesired reactions. However, the cap must be removable so that the tip can be activated for use. One way to do this is to make the cap photo-cleavable, but other methods are possible and well-known in the field of chemistry.

The body may contain, or serve as a point of attachment for, the active site. The body also serves as a point of attachment for one or more legs. The body can also serve to tune the active site, and to isolate it from other chemical influences. With respect to tuning the active site, for example, substitutions which alter bond lengths, angles, or electronegativity may be used to increase or decrease the affinity of the active site for its feedstock. With respect to isolation, the body provides chemical isolation from, for example, the legs. Such isolation is one of the aspects of this modular design paradigm that eases the design of new tips by allowing modules to be put together combinatorially. For example, if an active site and body combination that accomplish the desired reaction are already known, but one desires to use a different surface which necessitates different legs, it is likely that the new legs can be swapped in without redesign of the body and active site. If the legs were connected directly to the active site, their chemical nature would tend to have more of an effect on the active site, potentially requiring redesign of the body, or unnecessarily constraining the choice of legs. Another characteristic of the body is that it is preferably rigid. A rigid body will tend to be more versatile because a rigid body will better resist deformation when forces are applied to it during mechanosynthetic reactions.

The legs serve to attach the body to the surface. The legs preferably have a geometry that permits them to bind the body to a surface without excessive strain, including surfaces that are functionalized prior to leg attachment. Functionalized surfaces, such as chlorinated Si, may make longer legs preferable because the, e.g., Cl atoms, can be directly under the tip body, making some clearance between the body of the tip and Si surface preferable. Legs are also preferably fairly rigid, and strong enough so that reactions require the application of force proceed reliably rather than the tip tilting, otherwise moving, or breaking a leg bond. While legs that are too short may be unable to bond to the surface reliably, legs that are too long may be too flexible, adding to the positional uncertainty of the tip atoms during a mechanosynthetic operation. Where issues such as surface functionalization and lattice mismatches between the surface and body are not issues, legs can be very short (e.g., a single oxygen atom could serve as each leg).

With respect to the number of legs, the examples provided depict tips with three legs. Three legs helps provide stability against forces acting upon the active site or feedstock at varied angles, and can reduce the force on any given leg by spreading it amongst all legs. However, tips with one or two legs could be used, as could tips with four, or more, legs. Note that tips with more than one leg may be usable when not all of their legs have bound to the presentation surface, as long as the required stability is provided. On a tip with multiple legs, each leg does not need to be identical.

Legs may incorporate linkers (if not, the leg may be considered to also be the linker, or vice versa), which serve to provide a bridge between the rest of the leg and the body or surface. The advantage of linkers is in providing an appropriate chemistry with which to bind a surface. For example, if the rest of the leg does not have the necessary reactivity or bond strength with a surface, a linker may address the issue. This is demonstrated with the exemplary tips described herein, wherein each tip may have, e.g., a trifluorobenzene leg, and to that leg may be attached a linker which is, e.g., NH, O, or S. This modular swapping of linkers allows otherwise-identical tips to be adapted to various surfaces without compromising the characteristics of the active site. Linkers may also be used to adjust the geometry of the legs, for example, helping them to fit the surface lattice spacing better, adjusting their length, or altering their rigidity.

Feedstock serves as a source of atoms which can be added to a workpiece and is generally attached to the "top" (with respect to the orientation depicted in, e.g., FIG. 1-17, although the real-world orientation may differ) of the tip to provide access to the feedstock without steric interference from other parts of the tip or the surface. Feedstock is chosen not only by what atom or atoms it contains, but by how it binds to a tip's active site and the desired location on a workpiece. There are many ways, for example, to donate carbon atoms to a workpiece, and examples using C2, CH2, and CH3 are all presented herein. Context will determine which is most appropriate, though often more than one could be used to build a given workpiece, assuming appropriate alterations in the build sequence.

The surface to which a tip is being attached has a variety of important characteristics, including chemical reactivity, surface smoothness, lattice spacing, linker-surface bond strength, and internal bond strength. In terms of chemical reactivity, the surface must bind to the linkers during the tip binding process, but preferably not to other parts of the tip. The surface's lattice spacing must allow linker binding without excessive strain. The linker-surface bond strength must suffice so that the bonds do not rupture if pulling forces are required. And, the internal (surface-surface) bonds must be of sufficient strength that, if pulling forces are required, the entire tip, along with one or more surface atoms, is not ripped from the surface.

With surface-mounted tips being broken down into the described modules, and the important functional characteristics of each module described, and realizing that this modular design at least to an extent isolates various modules from one another, facilitating module re-use and combinatorial creational of new tips, along with the examples presented herein, this provides a design paradigm for the design and synthesis of new tips that can be generalized well beyond the specific examples provided.

FIG. 1 depicts one version of an abstraction tip that may be used to remove hydrogen, among other moieties, from a workpiece. Radical 101 is used to bind the moiety to be abstracted, and serves as the tip's active site. The active site is connected to body 102, which in this example is adamantane. The body is connected to three methyl group legs, exemplified by leg 103. Each leg contains a sulfur linker, exemplified by linker 104. Each linker is bound to surface 105. As an abstraction tip being depicted in its ready-to-use state, no feedstock is present.

Figure 2:
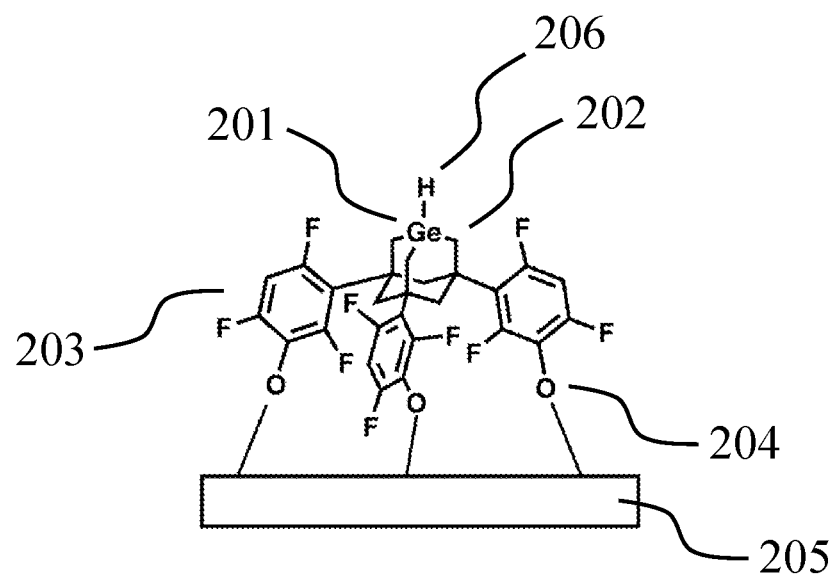
FIG. 2 depicts the modular parts of another exemplary tip.

As a different example, with feedstock, FIG. 2 depicts one version of a tip capable of donating hydrogen to many atom types. Active site 201 is a Ge atom, which in this case is part of a substituted adamantane body 202. Trifluorobenzene (which could be viewed as trifluorophenol if considered together with the linkers) legs are used, exemplified by leg 203, and each leg is connected to an oxygen linker 204, which connects to surface 205. Feedstock 206 is connected to active site 201.

Exemplary Tips

Surface-mounted tips, along with their routes of synthesis, have been devised which carry out mechanosynthetic reactions while minimizing or eliminating issues such as tip dimerization and improper tip orientation during surface mounting, and allow for proper leg length, flexibility and linker chemistry to bind to the exemplary surfaces. These synthetic routes allow for the bulk manufacture of many diverse tip types, thereby facilitating many different mechanosynthetic reactions while having the benefits described for surface-mounted tips and the processes for using such tips.

The set of tips described includes an abstraction tip with a C2-based active site (capable of extracting many atoms from many different types of workpieces, including, e.g., hydrogen from diamond), a hydrogen donation tip, a C2 donation tip, a Methyl donation tip, and a donation tip which can donate SiH3, GeH3, Si(CH3)3, or Ge(CH3)3, depending on the feedstock attached to the Ge active atom in its substituted adamantane body.

To demonstrate the modular design described herein, various versions of each tip are depicted. Specially, each tip is shown with three trifluorobenzene legs which can be linked to either a chlorinated silicon surface, or a partially-hydrogenated partially-chlorinated silicon surface, via an oxygen linker or an NH linker. A version of each tip is also depicted where the legs are methyl groups, using sulfur linkers to connect to an Au surface. These various versions provide for a variety of surface properties and surface attachment chemistries and demonstrate how a body can be used to isolate an active site from other changes in the tip, as the tips continue to function as desired after changing the legs, linkers, and surface.

Note that a silicon surface has stronger intra-surface bonds than a gold surface. When placing tips on a gold surface, reactions that require substantial pulling forces (exceeding a few nN) may pull the tip from the surface (taking one or more gold atoms with it), or cause the tip to slide sideways across the surface. Nonetheless, the thiol linker chemistry is very accessible, making gold a useful surface (along with lead and other similar materials) if reactions with substantial pulling forces are not required.

Figure 3:
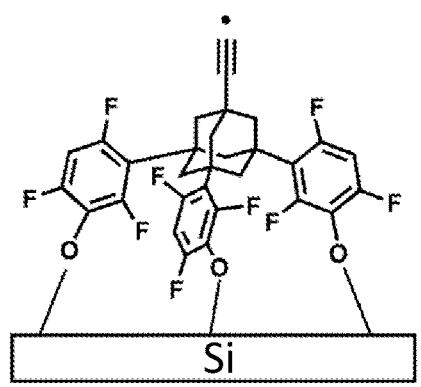
FIG. 3 depicts the AbstractionO tip surface-mounted on Silicon.
Figure 4:
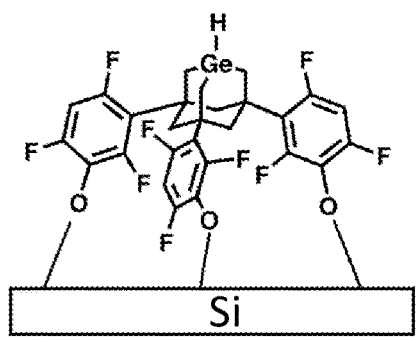
FIG. 4 depicts the HDonationO tip surface-mounted on Silicon.
Figure 5:
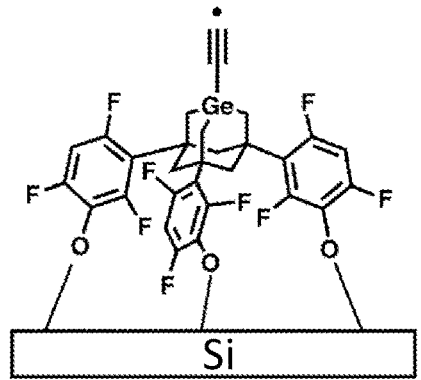
FIG. 5 depicts the C2DonationO tip surface-mounted on Silicon.
Figure 6:
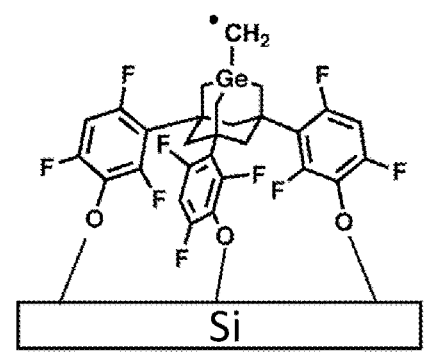
FIG. 6 depicts the MeDonationO tip surface-mounted on Silicon.
Figure 7:
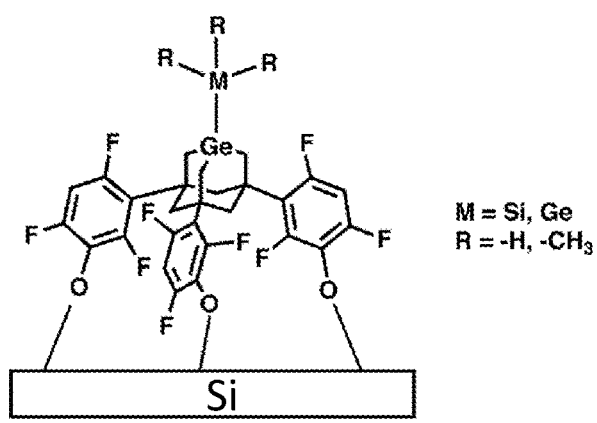
FIG. 7 depicts a tip surface-mounted on Silicon which can be SiH3DonationO, GeH3DonationO, SiMe3DonationO or GeMe3DonationO.
Figure 13:
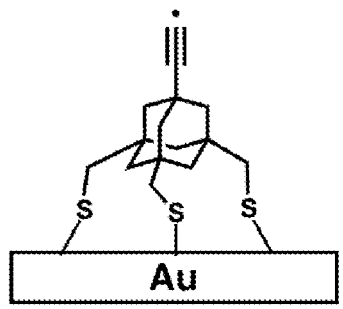
FIG. 13 depicts the AbstractionS tip surface-mounted on Gold.
Figure 14:
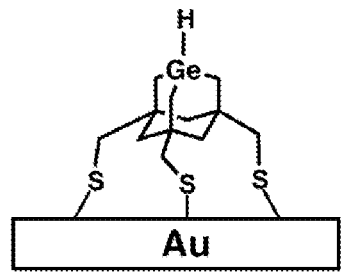
FIG. 14 depicts the HDonationS tip surface-mounted on Gold.
Figure 15:
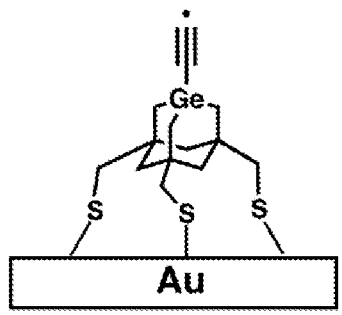
FIG. 15 depicts the C2DonationS tip surface-mounted on Gold.
Figure 16:
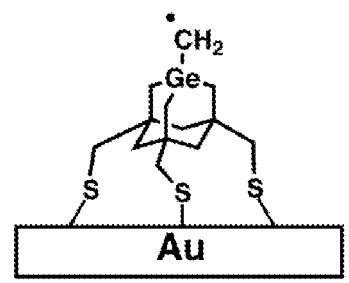
FIG. 16 depicts the MeDonationS tip surface-mounted on Gold.
Figure 17:
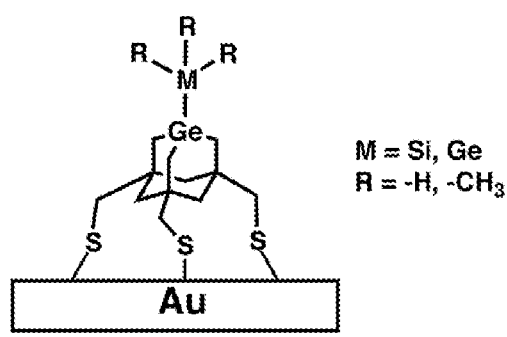
FIG. 17 depicts a tip surface-mounted on Silicon which can be SiH3DonationS, GeH3DonationS, SiMe3DonationS or GeMe3DonationS.

Each exemplary tip is shown in detail, bonded to an appropriate surface for the linker chemistry depicted, in FIGS. 3-17. FIGS. 3-7 all depict tips that use trifluorobenezene legs and oxygen linkers on a silicon surface. Specifically: FIG. 3 depicts an abstraction tip having a C2-radical-based active site, an adamantane body, trifluorobenzene legs, and oxygen linkers, on a silicon surface (all Si surfaces include, e.g., chlorinated, partially-chlorinated, and partially-hydrogenated, partially-chlorinated Si). This tip will be referred to as AbstractionO. FIG. 4 depicts a hydrogen donation tip with hydrogen feedstock, a Ge-based active site incorporated into a substituted adamantane body, trifluorobenzene legs, and oxygen linkers, on a silicon surface. This tip will be referred to as HDonationO (or "HDonation," omitting the specific linker group, to denote any of the variants, a conventional which can apply to any of the tip names). FIG. 5 depicts a C2 donation tip with .C2 feedstock, and otherwise the same structure as FIG. 4. This tip will be referred to as C2DonationO. FIG. 6 depicts a methyl donation tip with .CH2 feedstock, and otherwise the same structure as FIG. 4. This tip will be referred to as MeDonationO. FIG. 7 depicts a donation tip that can be used to donate a variety of feedstock moieties depending on the identity of the M and R groups. M can be Si or Ge, and R can be H or CH3, allowing the tip to donate SiH3, GeH3, Si(CH3)3 or Ge(CH3)3. These tips will be referred to, respectively, as SiH3DonationO, GeH3DonationO, SiMe3DonationO, and GeMe3DonationO. FIG. 7 has otherwise the same structure as FIG. 4.

FIGS. 8-12 depict tips with the same feedstock (if present), active site, bodies, and legs as FIGS. 3-7, respectively, but each tip in FIGS. 8-12 uses NH linkers instead of oxygen linkers to connect to a silicon surface. These tips will be referred to, respectively, as AbstractionNH, HDonationNH, C2DonationNH, MeDonationNH, and for the various versions of FIG. 12, SiH3DonationNH, GeH3DonationNH, SiMe3DonationNH, and GeMe3DonationNH.

FIGS. 13-17 depict tips with the same feedstock (if present), active site, and bodies as FIGS. 3-7, respectively, but each tip in FIGS. 13-17 uses methyl legs and a sulfur linker to connect the tip to a gold surface. These tips will be referred to, respectively, as AbstractionS, HDonationS, C2DonationS, MeDonationS, and for the various versions of FIG. 17, SiH3DonationS, GeH3DonationS, SiMe3DonationS, and GeMe3DonationS.

In addition to the use of these tips in their charged state, some tips could be used in their uncharged state. For example, several of the tips, such as the hydrogen donation tip, have a Ge radical active site in their discharged state. This can be a useful form of these tips, for example, to break into a C=C bond, or as a trash depot for unwanted atoms (assuming appropriate affinity).

With respect to naming conventions, note that sometimes tips are described in terms of what reaction they perform, and sometimes in terms of their structure and payload. For example "MeDonation" (regardless of whether the tip's legs are based on NH, O, S, phenylpropargyl alcohol, or something else) stands for "methyl donation" since that is what the tip does. With respect to naming via structure and payload, for example, many of the donation tips described herein have Ge-substituted adamantane bodies. With no feedstock, the Ge atom would be a radical, and so may be referred to as "GeRad." Similarly, "AdamRad" is an adamantane molecule without the C to Ge substitution, but rather having a radical carbon at the active site. An adamantane can also be substituted with a silicon atom at its active site, which may be called SiRad. Obviously, these are just examples used to describe naming conventions, not a list of all possible structures or substitutions, which are numerous. To convey what feedstock is attached, the names may be written as, for example, GeRad-CH2 (which is one implementation of an MeDonation tip), GeRad-H (one implementation of an HDonation tip). Understanding these conventions, the tip name normally makes its structure and/or function obvious.

Tip Synthesis

Exemplary synthetic pathways for each tip are depicted in FIGS. 18-41. Note that multiple synthetic pathways for the tip depicted in FIGS. 7, 12 and 17 due to the various possible combinations of M and R. Tips with radicals in their active form are synthesized with a protective cap. Procedures for cap removal are described herein.

Figure 18:
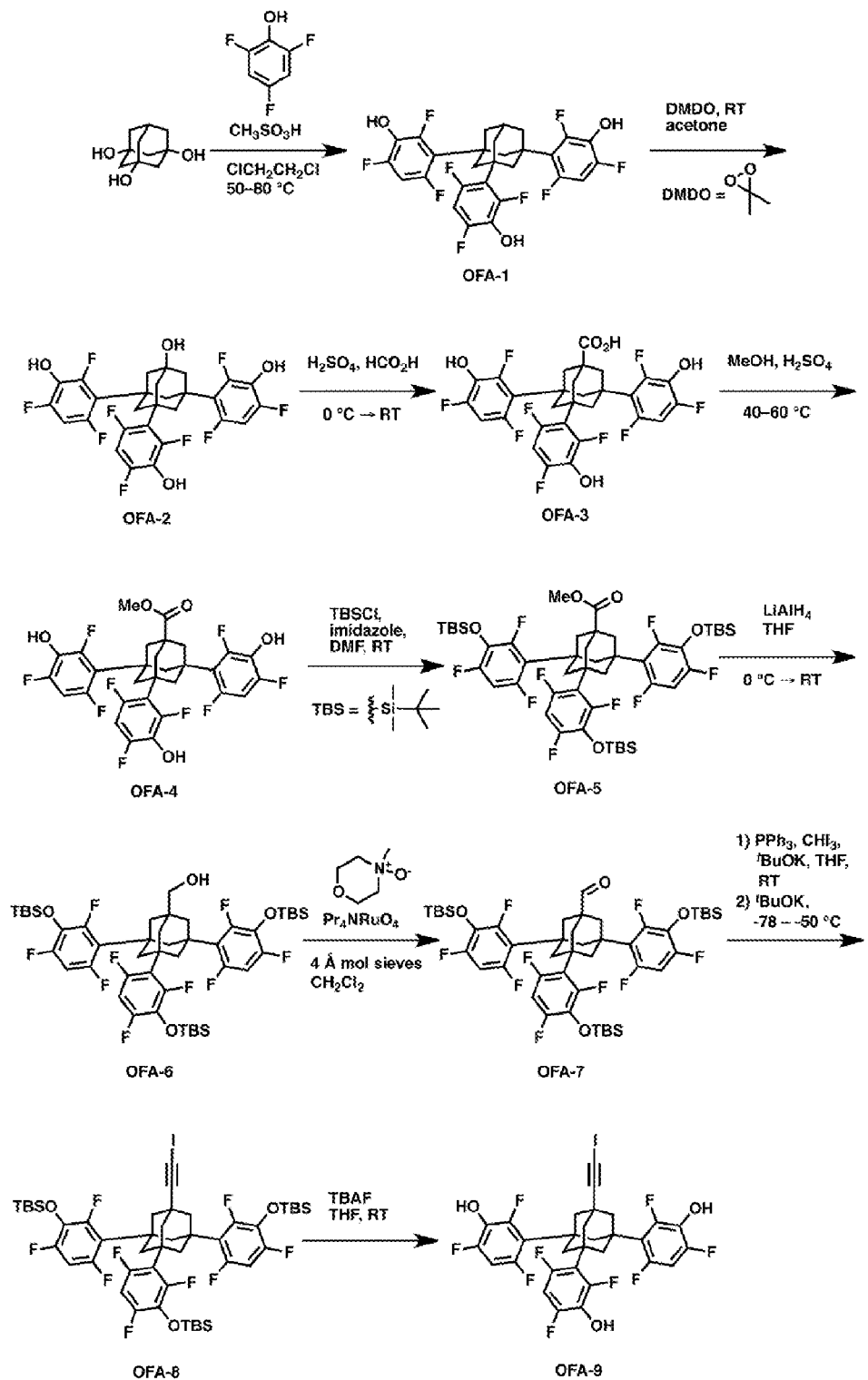
FIG. 18 depicts a synthetic route for the AbstractionO tip.

FIG. 18 depicts a synthetic pathway for AbstractionO. The synthesis steps are as follows: Commercially available 1,3,5-trihydroxyadamantane reacts with 2,4,6-trifluorophenol while heated between 50-80° C. under acidic conditions to give OFA-1. Treating OFA-1 with an excess dimethyldioxirane (DMDO) in acetone at room temperature selectively oxidizes the tertiary C—H bond to give alcohol OFA-2. Using Koch-Haaf conditions (Stetter, H., Schwarz, M., Hirschhorn, A. Chem. Ber. 1959, 92, 1629-1635), CO is formed from the dehydration of formic acid by concentrated sulfuric acid between −5-0° C. The CO forms a bond with the tertiary carbocation formed from the dehydration of the bridgehead alcohol at room temperature. Upon aqueous workup the carboxylic acid OFA-3 is obtained. Esterification of the carboxylic acid OFA-3 with dry methanol and catalytic sulfuric acid between 40-60° C. yields the methyl ester OFA-4. The phenolic —OH groups in OFA-4 are protected with tert-butyldimethylsilyl chloride (TBSCl) in the presence of imidazole at room temperature to give the TBS-silyl ether OFA-5. Reduction of the methyl ester with LiAlH4 in tetrahydrofuran (THF) between 0° C. and room temperature gives the methyl alcohol OFA-6. Oxidation of the methyl alcohol to the aldehyde OFA-7 proceeds with catalytic tetrapropylammonium perruthenate ((Pr4N)RuO4, TPAP) and stoichiometric N-methylmorpholine-N-oxide (NMO). The presence of 4 Å powdered molecular sieves in the reaction mixture adsorbs any water present and decreases the probability of over-oxidation to the carboxylic acid (Ley, S. V., Norman, J., Griffith, W. P., Marsden, S. P., Synthesis, 1994, 639-666). Using a modified Corey-Fuchs procedure (Michel, P., Rassat, A. Tetrahedron Lett. 1999, 40, 8570-8581), the aldehyde in THF is added to a premixed solution of iodoform (CHI3), triphenylphosphine, and potassium tert-butoxide at room temperature in THF to undergo a carbon-carbon bond forming reaction to give the 1,1-diiodoalkene. Single elimination of the vinyl iodide with excess potassium tert-butoxide and careful temperature control (−78° C.--−50° C.) yields the iodoalkyne OFA-8. It is possible to form the terminal alkyne from this reaction if temperature is not carefully controlled, however, the terminal alkyne can be iodinated with N-iodosuccinimide/AgNO3 or, alternatively, with I2 in basic methanol. The final global deprotection of the TBS-silyl ether groups is performed with tetra-n-butylammonium fluoride (TBAF). Upon aqueous workup, the AbstractionO tip with free phenol linkers OFA-9 is obtained.

Figure 19:
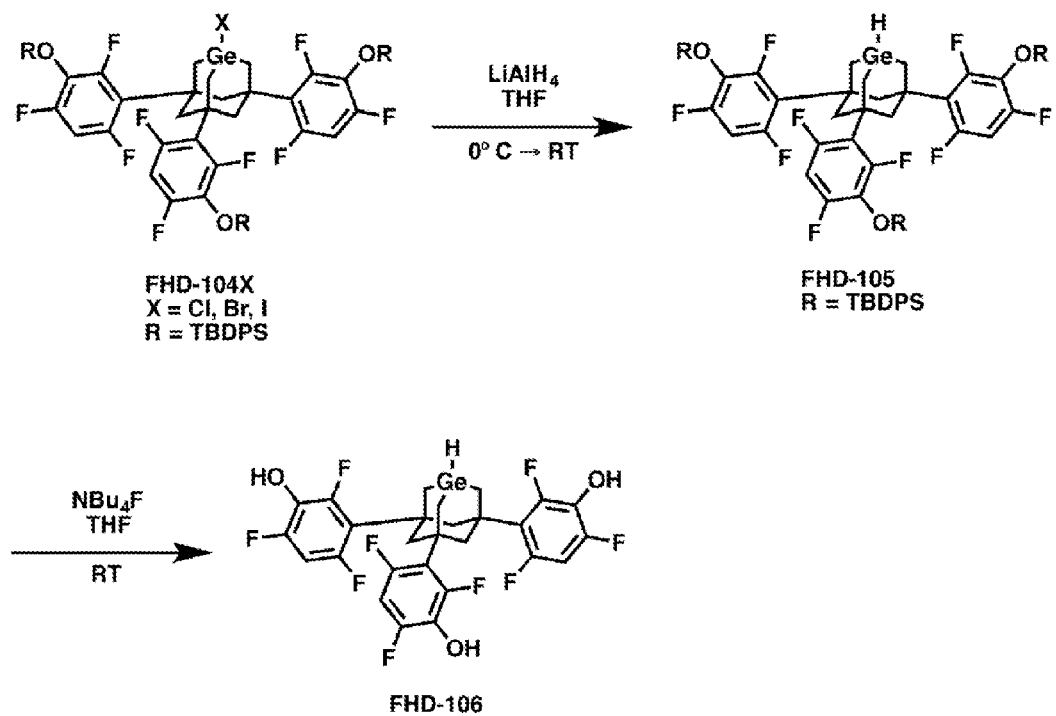
FIG. 19 depicts a synthetic route for the HDonationO tip.

FIG. 19 depicts a synthetic pathway for HDonationO. The synthesis steps are as follows: FHD-104X is reduced by excess lithium aluminum hydride in THF solvent at 0° C., converting the germanium halide to the germanium hydride FHD-105. Tetra-n-butylammonium fluoride is used to deprotect the tert-butyldimethylsilyl protecting groups from FHD-105 in THF to yield the triphenol FHD-106, the HdonationOHtip.

Figure 20:
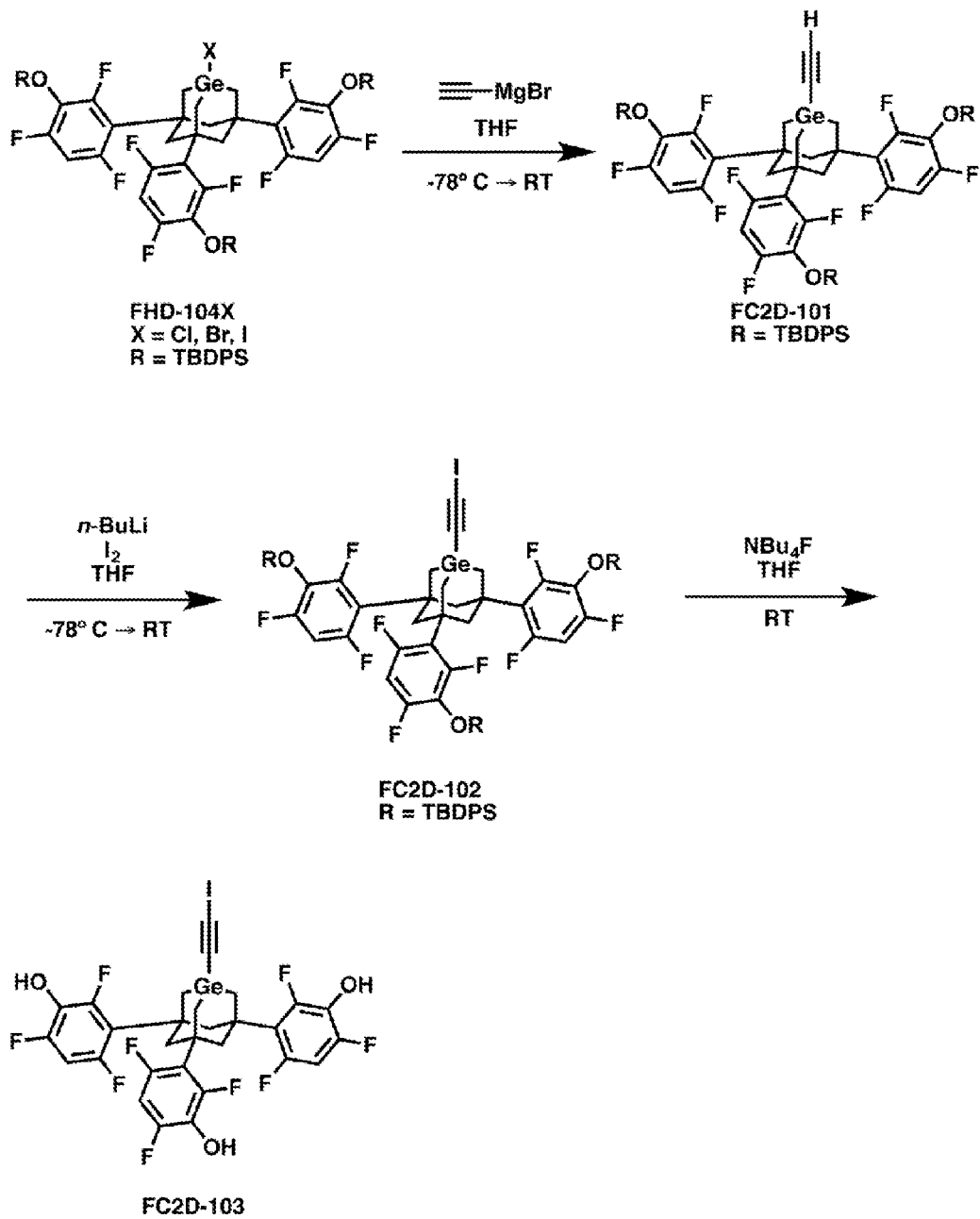
FIG. 20 depicts a synthetic route for the C2DonationO tip.

FIG. 20 depicts a synthetic pathway for C2DonationO. The synthesis steps are as follows: The Grignard reagent ethynylmagnesium bromide in THF solution is added to FHD-104X dissolved in dry THF and cooled to −78 C dropwise with rapid stirring. The reaction is stirred for 1 hour, warmed to 0 C for 1 hour, and stirred for 1 hour at room temperature to form FC2D-101. FC2D-101 is dissolved in dry THF and cooled to −78 C. A solution of n-butyllithium in hexanes is added and the reaction is stirred for 1 hour at −78 C. A solution of iodine in dry THF is added and the reaction is allowed to warm to room temperature to yield FC2D-102. FC2D-102 is dissolved in THF and stirred rapidly at room temperature. Tetra-n-butylammonium fluoride is added and the reaction is stirred for 1 hour to yield FC2D-103, the C2DonationO tip.

Figure 21:
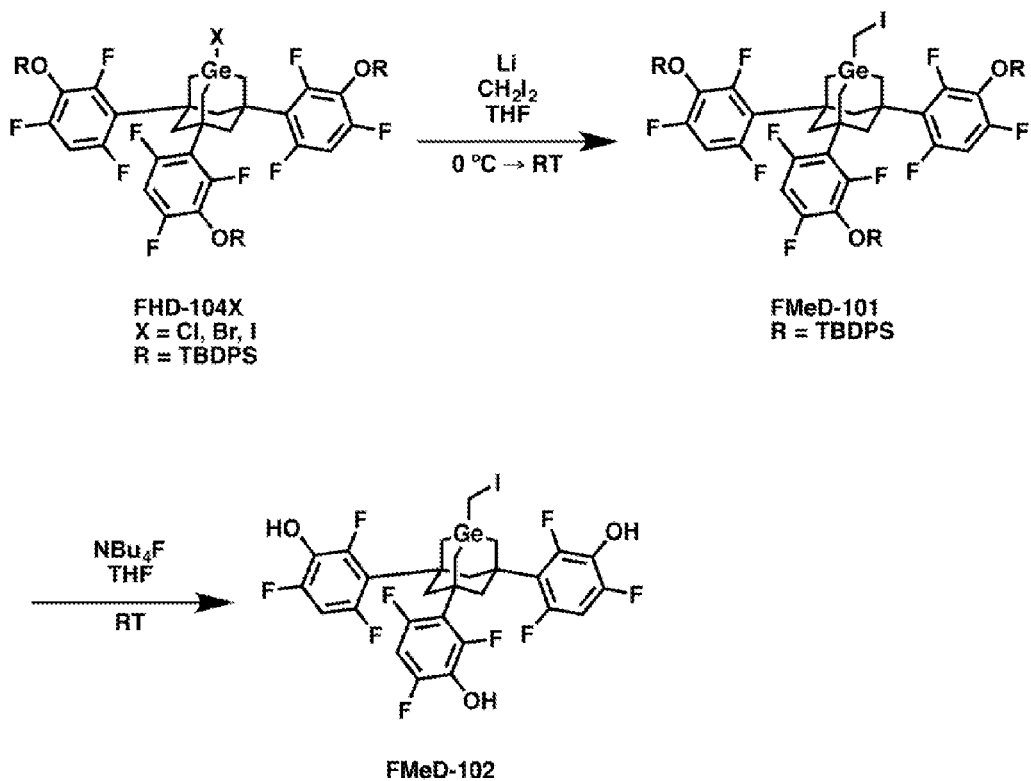
FIG. 21 depicts a synthetic route for the MeDonationO tip.

FIG. 21 depicts a synthetic pathway for MeDonationO. The synthesis steps are as follows: The germanium halide FHD-104X in THF solution is reduced with lithium metal to generate a lithiated germanium species in situ. The solution is then slowly added dropwise to a solution of 10-fold excess methylene iodide (CH2I2) in THF cooled to 0 C. This method of addition favors the formation iodomethyl germane FMeD-101 over methylene-bridged germanes. Stoichiometric tetra-n-butylammonium fluoride is used to deprotect the tert-butyldimethylsilyl protecting groups from FMeD-101 in THF to yield the triphenol FMeD-102, the MeDonationO tip.

Figure 22:
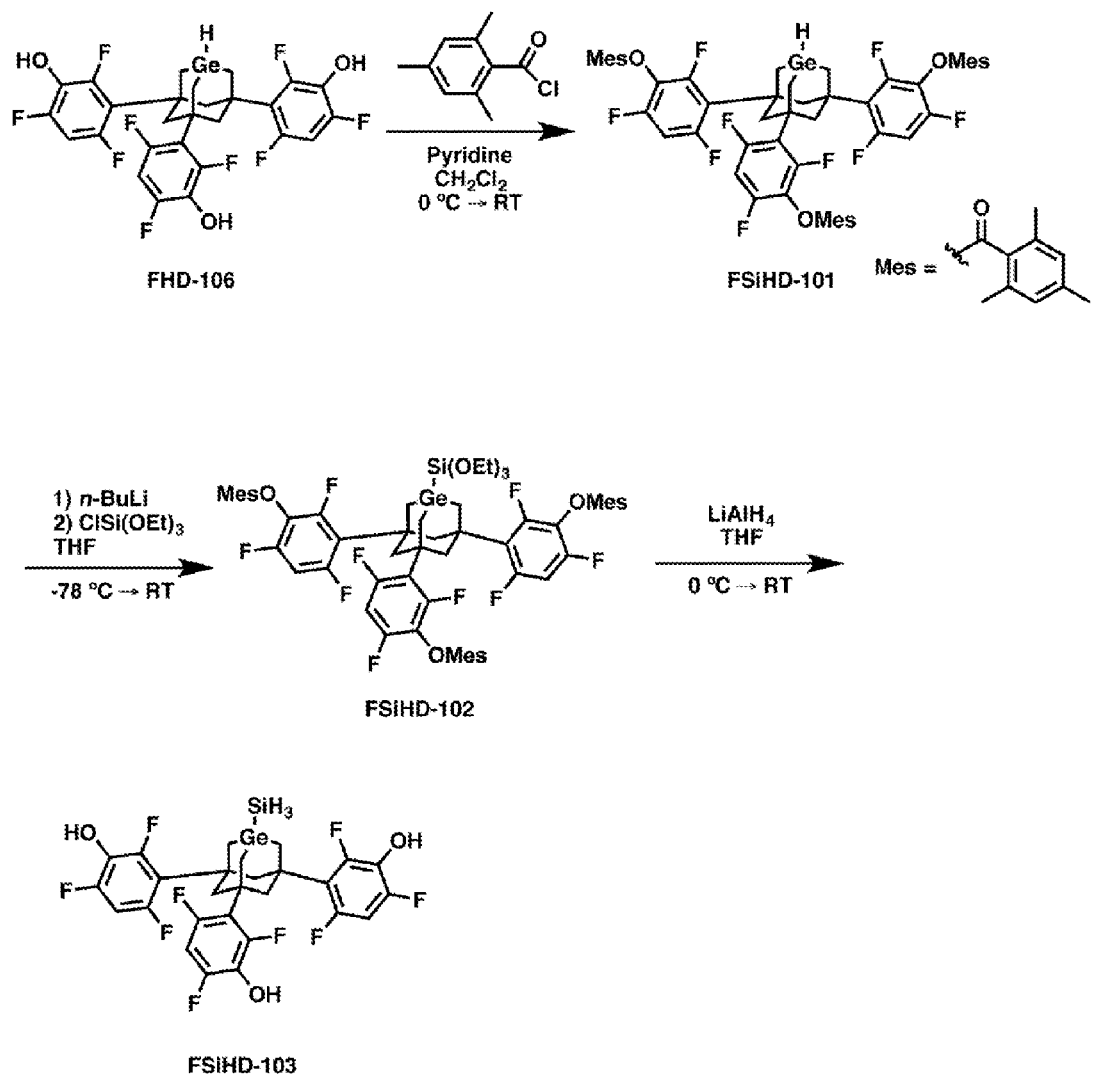
FIG. 22 depicts a synthetic route for the SiH3DonationO tip.

FIG. 22 depicts a synthetic pathway for SiH3DonationO. The synthesis steps are as follows: The phenols of FHD-106 are acylated with mesitoyl chloride in dichloromethane with pyridine base. (Corey et al., JACS 1969, 91, 4398) The mesitoate protecting group is utilized due to its stability to the lithiation conditions necessary for FSiHD-102. FSiHD-101 in dry THF solution is deprotonated with n-butyllithium in hexanes at −78 C and slowly warmed to room temperature. The resulting lithiated anion is silylated with chlorotriethoxysilane in THF solution to yield FSiHD-102. FSiHD-102 in dry THF solution is cooled to 0 C and lithium aluminum hydride in THF solution is added to cleave the mesitoate esters and reduce the triethoxysilyl group, yielding FSiHD-103, the SiH3DonationO tip.

Figure 23:
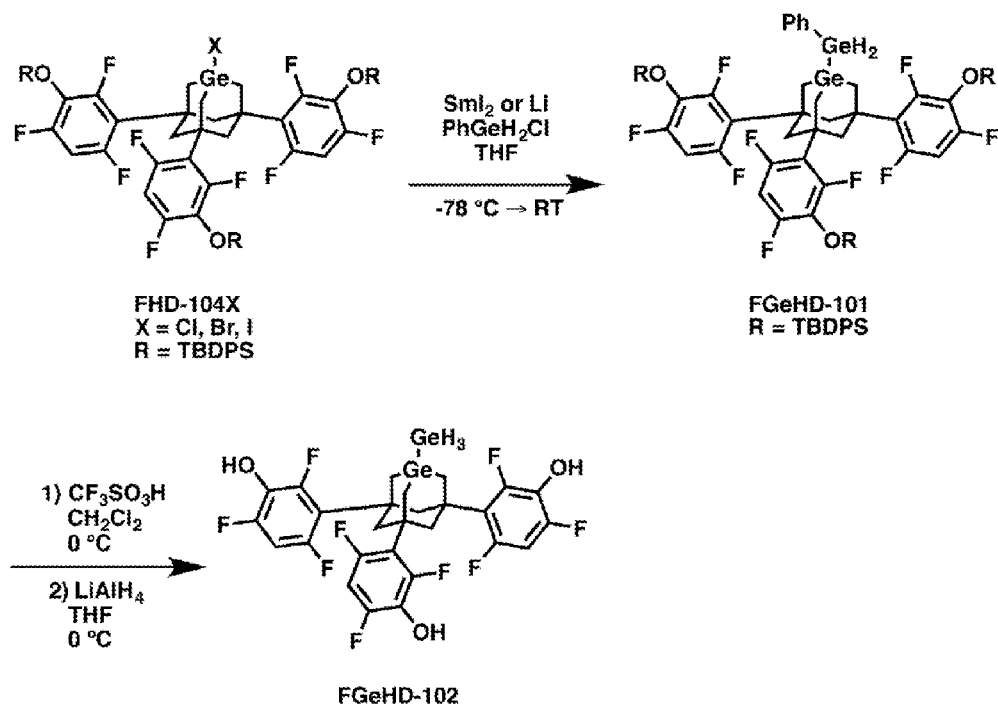
FIG. 23 depicts a synthetic route for the GeH3DonationO tip.

FIG. 23 depicts a synthetic pathway for GeH3DonationO. The synthesis steps are as follows: To form FGeHD-101, the germanium halide FHD-104X in THF solution is reduced with lithium metal to generate a lithiated germanium species in situ. The solution is then removed by syringe to separate the lithiated germanium species from the unreacted lithium metal and then slowly added dropwise to a solution of chloro(phenyl)germane (Ohshita, J.; Toyoshima, Y.; Iwata, A.; Tang, H.; Kunai, A. Chem. Lett. 2001, 886-887) in THF cooled to 0 C. It is necessary to separate the lithiated germanium species from excess lithium metal before addition to the trimethylgermanium chloride because lithium is capable of exchange reactions with germanium halides. FGeHD-101 is dephenylated with trifluoromethanesufonic acid in dichloromethane at 0 C. The crude reaction isolate after neutralization and workup is then dissolved in dry THF. The reaction is cooled to 0 C and lithium aluminum hydride is added dropwise to produce the germane FGeHD-102, the GeH3DonationO tip.

Figure 24:
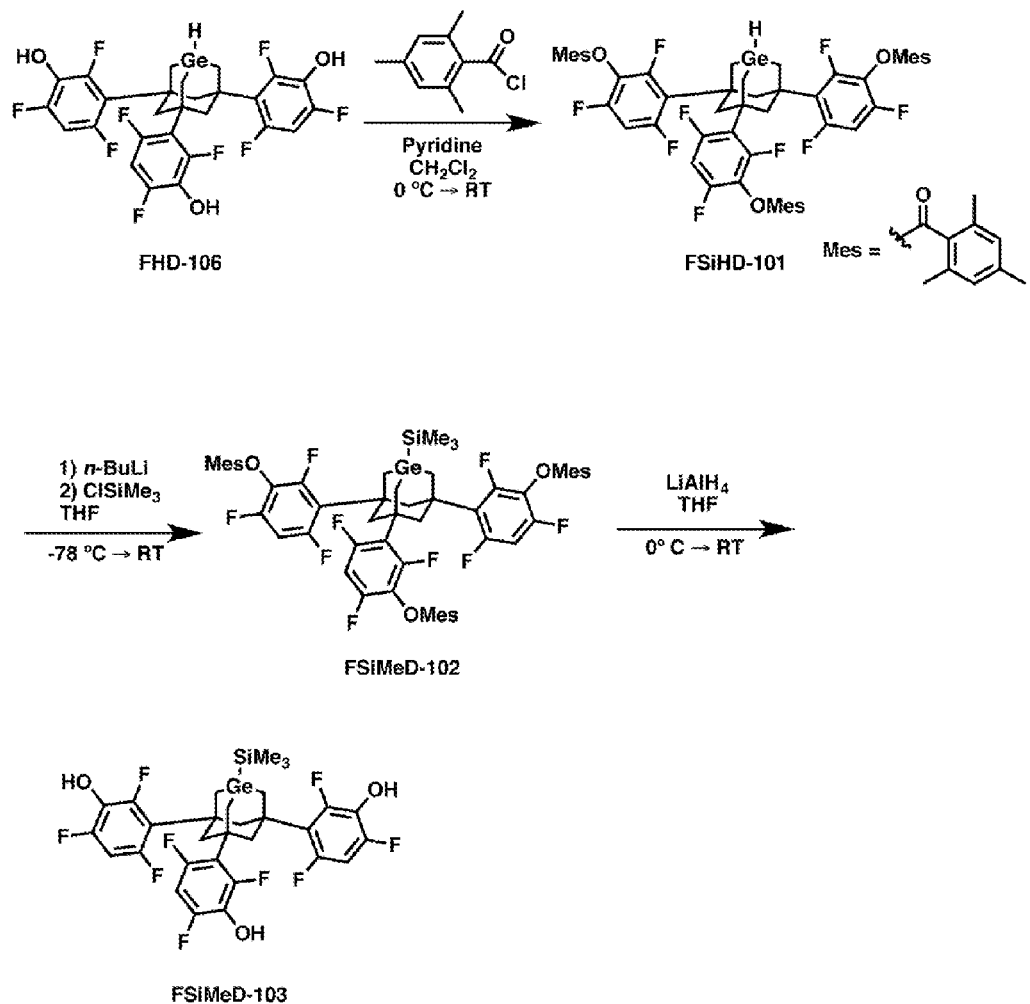
FIG. 24 depicts a synthetic route for the SiMe3DonationO tip.

FIG. 24 depicts a synthetic pathway for SiMe3DonationO. The synthesis steps are as follows: To prepare FSiHD-101, the phenols of FHD-106 are acylated with mesitoyl chloride in dichloromethane with pyridine base. (Corey et al., JACS 1969, 91, 4398) The mesitoate protecting group is utilitzed due to its stability to the lithiation conditions necessary for FSiHD-102. FSiHD-101 in dry THF solution is deprotonated with n-butyllithium in hexanes at −78 C and slowly warmed to room temperature. The resulting lithiated anion is silylated with trimethylsilyl chloride in THF solution to yield FSiMeD-102. FSiMeD-102 in dry THF solution is cooled to 0 C and lithium aluminum hydride in THF solution is added to cleave the mesitoate esters, yielding FSiMeD-103, the SiMe3DonationO tip.

Figure 25:
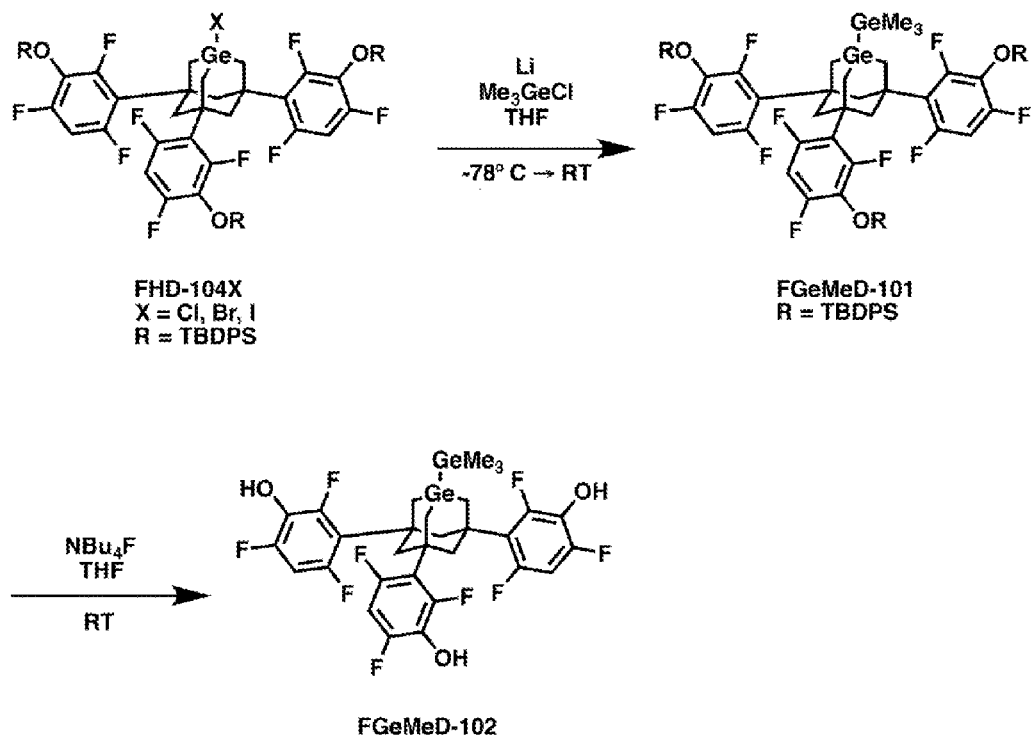
FIG. 25 depicts a synthetic route for the GeMe3DonationO tip.

FIG. 25 depicts a synthetic pathway for GeMe3DonationO. The synthesis steps are as follows: To prepare FGeMeD-101, the germanium halide FHD-104X in THF solution is reduced with lithium metal to generate a lithiated germanium species in situ. The solution is then removed by syringe to separate the lithiated germanium species from the unreacted lithium metal and then slowly added dropwise to a solution of trimethylgermanium chloride in THF cooled to 0 C. It is necessary to separate the lithiated germanium species from excess lithium metal before addition to the trimethylgermanium chloride because lithium is capable of exchange reactions with germanium halides. Stoichiometric tetra-n-butylammonium fluoride is used to deprotect the tert-butyldimethylsilyl protecting groups from FMeD-101 in THF to yield the triphenol FGeMeD-102, the GeMe3DonationO tip.

Figure 26:
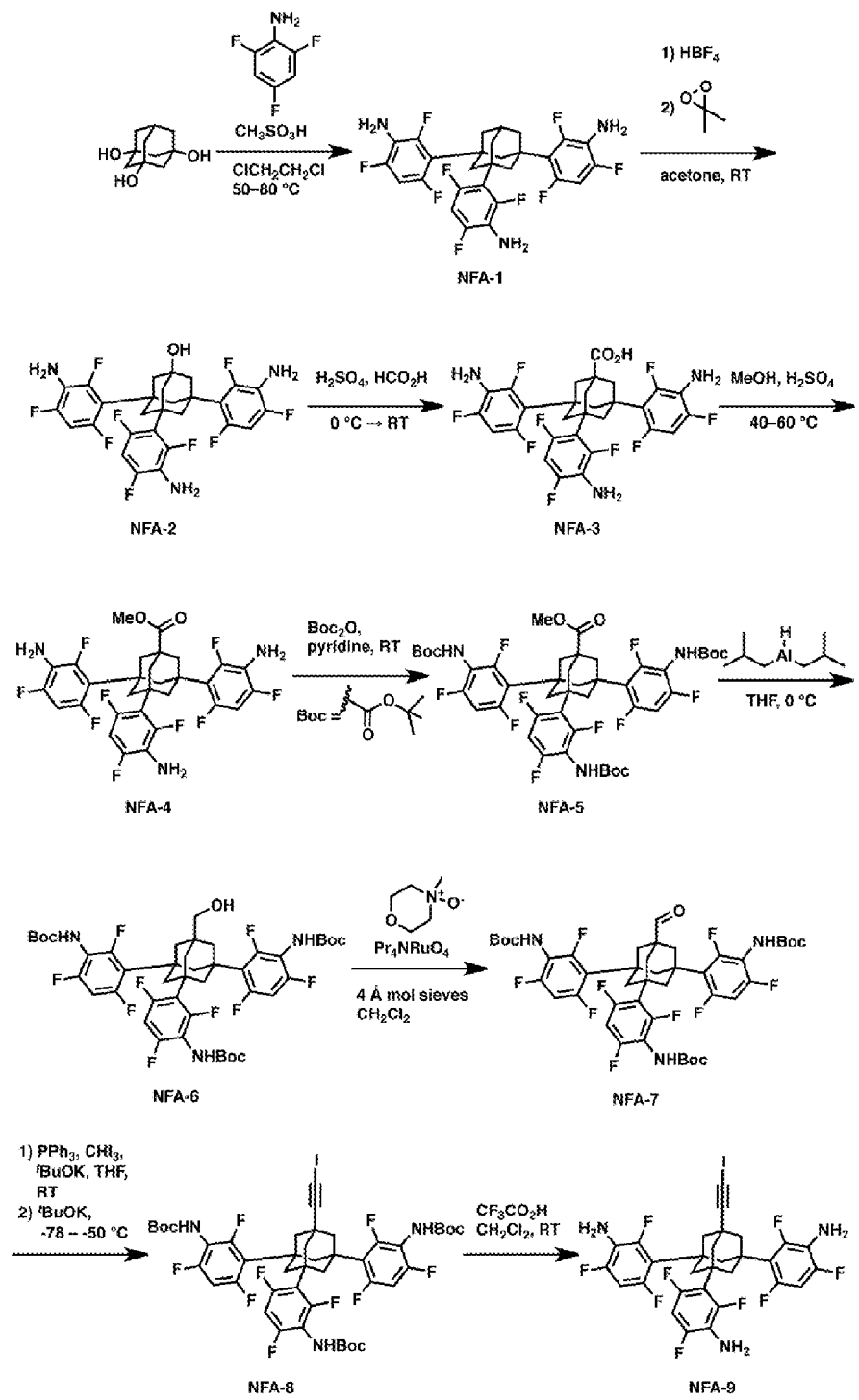
FIG. 26 depicts a synthetic route for the AbstractionNH tip.

FIG. 26 depicts a synthetic pathway for AbstractionNH. The synthesis steps are as follows: Commercially available 1,3,5-trihydroxyadamantane reacts with 2,4,6-trifluoroaniline while heated to 50-80° C. under acidic conditions in 1,2-dichloroethane to give NFA-1. Treating NFA-1 tetrafluoroboric acid forms the tetrafluoroborate amine salt in situ to prevent oxidation of the amines. (Asencio, G., Gonzalez-Nunez, M. E., Bernardini, C. B., Mello, R., Adam, W. J. Am. Chem. Soc., 1993, 115, 7250-7253) Following the salt formation, an excess of dimethyldioxirane (DMDO) in acetone at room temperature selectively oxidizes the tertiary C—H bond to give alcohol NFA-2. Using Koch-Haaf conditions (Stetter, H., Schwarz, M., Hirschhorn, A. Chem. Ber. 1959, 92, 1629-1635), CO is formed from the dehydration of formic acid by concentrated sulfuric acid. The CO forms a bond with the tertiary carbocation formed from the dehydration of the bridgehead alcohol. Upon aqueous workup the carboxylic acid NFA-3 is obtained. Esterification of NFA-3 with dry methanol and catalytic sulfuric acid yields the ester NFA-4 that can be reduced readily with diisobutylaluminum hydride. Di-tert-butyl-dicarbonate (Boc2O) is used to protect the —NH2 groups and to be removable by acid hydrolysis. Treating NFA-4 with Boc2O yields the protected compound NFA-5. Reduction of the methyl ester with LiAlH4 in tetrahydrofuran (THF) gives the methyl alcohol NFA-6. Oxidation of the methyl alcohol to the aldehyde NFA-7 proceeds with catalytic tetrapropylammonium perruthenate (TPAP) and stoichiometric N-methylmorpholine-N-oxide (NMO). The presence of 4 Å powdered molecular sieves in the reaction mixture adsorbs any water present and decreases the probability of over-oxidation to the carboxylic acid. (Ley, S. V., Norman, J., Griffith, W. P., Marsden, S. P., Synthesis, 1994, 639-666) Using a modified Corey-Fuchs procedure (Michel, P., Rassat, A. Tetrahedron Lett. 1999, 40, 8570-8581), the aldehyde in THF is added to a premixed solution of iodoform (CHI3), triphenylphosphine, and potassium tert-butoxide at room temperature in THF to undergo a carbon-carbon bond forming reaction to give the 1,1-diiodoalkene. Single elimination of iodide with careful temperature (−78° to −50° C.) and excess potassium tert-butoxide control yields the iodoalkyne NFA-8. It is possible to form the terminal alkyne from this reaction if temperature is not carefully controlled, however, the terminal alkyne can be iodinated with N-iodosuccinimide/AgNO3 or, alternatively, with I2 in basic methanol. The final global deprotection of the Boc-groups is performed with trifluoroacetic acid (TFA) in dichloromethane at RT. Upon aqueous workup, NFA-9, the AbstractionNH tip, is obtained.

Figure 27:
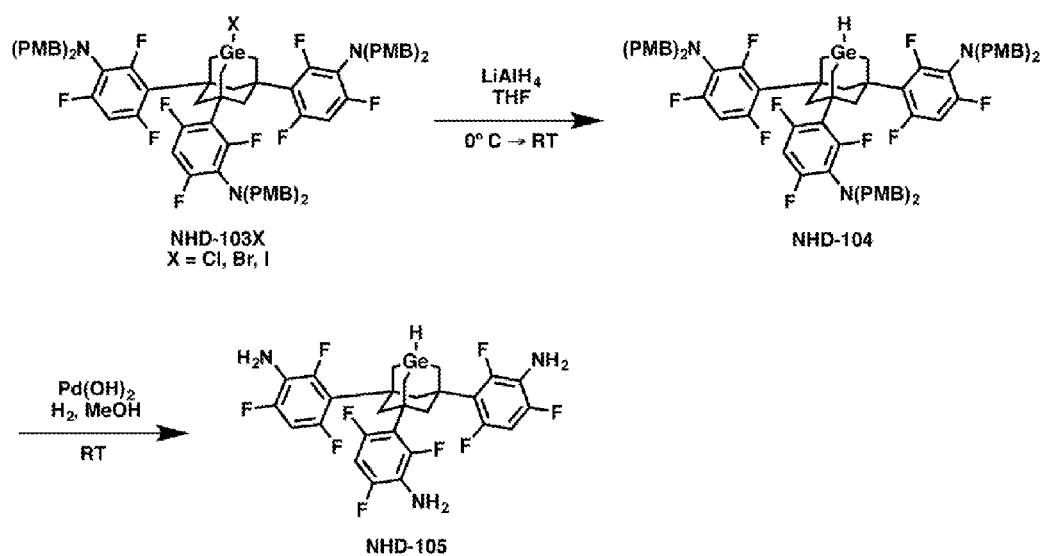
FIG. 27 depicts a synthetic route for the HDonationO tip.

FIG. 27 depicts a synthetic pathway for HDonationNH. The synthesis steps are as follows: NHD-103X in dry THF solution is cooled to 0 C and lithium aluminum hydride in THF solution is added to reduce the germanium halide, yielding NHD-104. NHD-104 is dissolved in dry MeOH and added to a reaction vessel suitable for pressurized hydrogenations. Palladium hydroxide catalyst is added and the vessel pressurized with hydrogen gas. Agitation of the reaction under the pressurized hydrogen atmosphere yields NHD-105, the HDonationNH tip.

Figure 28:
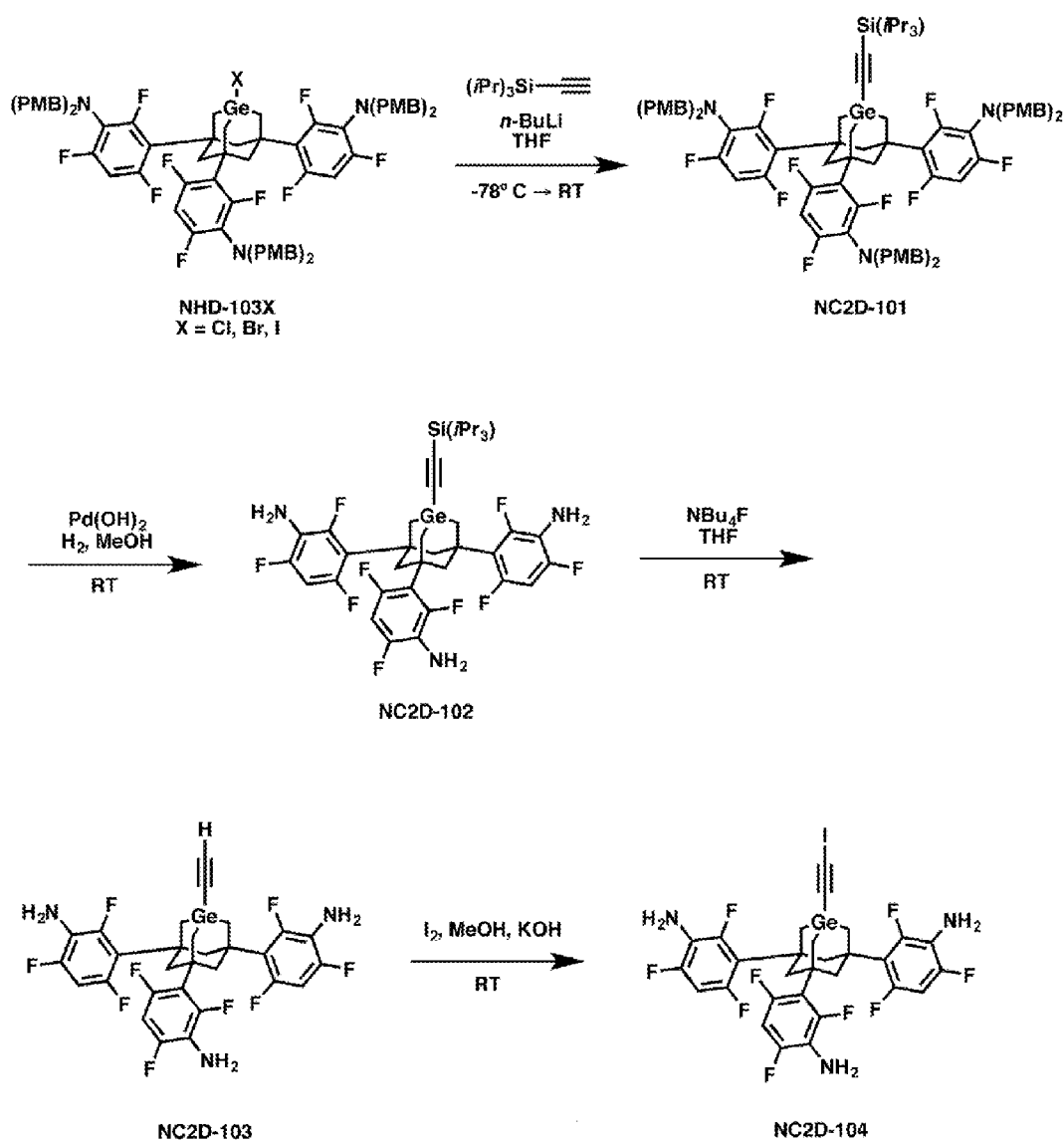
FIG. 28 depicts a synthetic route for the C2DonationO tip.

FIG. 28 depicts a synthetic pathway for C2DonationNH. The synthesis steps are as follows: (Triisopropylsilyl)acetylene is dissolved in dry THF and cooled to −78 C. n-Butyllithium solution in hexanes is slowly added dropwise to deprotonate the acetylene hydrogen. The solution is stirred for 1 hour, allowed to warm to room temperature, and is added dropwise to NHD-103X in dry THF solution cooled to −78 C. The reaction is stirred for 1 hour, warmed to 0 C for 1 hour, and stirred for 1 hour at room temperature to form NC2D-101. NC2D-101 is dissolved in dry MeOH and added to a reaction vessel suitable for pressurized hydrogenations. Palladium hydroxide catalyst is added and the vessel pressurized with hydrogen gas. Agitation of the reaction under the pressurized hydrogen atmosphere yields NC2D-102. The steric bulk of both the triisopropylsilyl group and the germaadamantane core prevent hydrogenation of the alkyne. NC2D-102 is dissolved in THF and stirred rapidly at room temperature. Tetra-n-butylammonium fluoride is added and the reaction is stirred for 1 hour at RT to yield NC2D-103. NC2D-103 is dissolved in MeOH and rapidly stirred. Potassium hydroxide is added and a solution of iodine in methanol is added slowly dropwise at RT to yield NC2D-104, the C2DonationNH tip.

Figure 29:
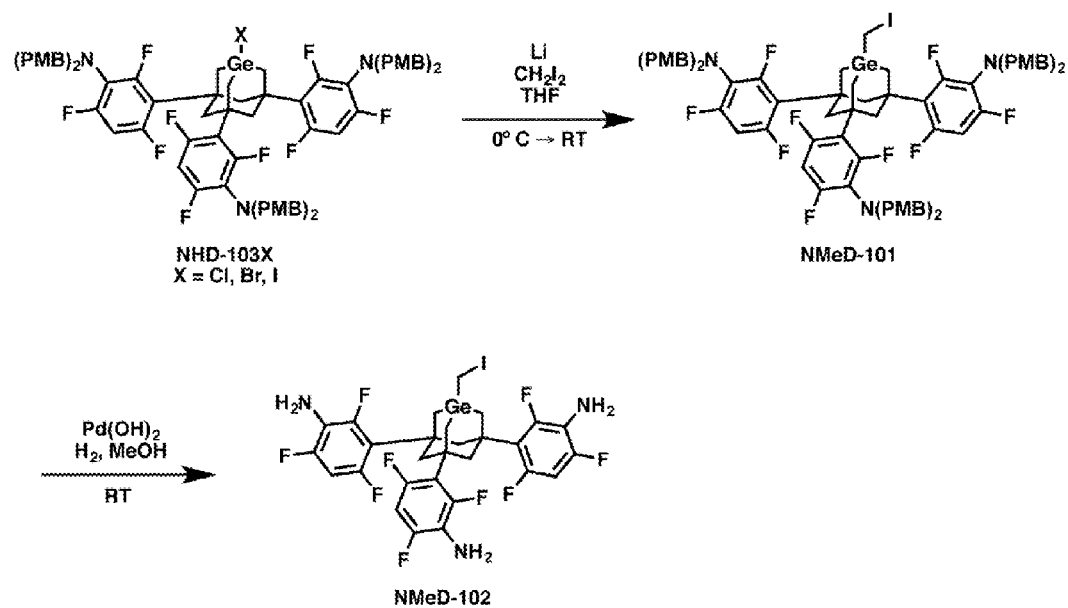
FIG. 29 depicts a synthetic route for the MeDonationO tip.

FIG. 29 depicts a synthetic pathway for MeDonationNH. The synthesis steps are as follows: The germanium halide NHD-103X in THF solution is reduced with lithium metal to generate a lithiated germanium species in situ. The solution is then slowly added dropwise to a solution of 10-fold excess methylene iodine (CH2I2) in THF cooled to 0 C. This method of addition favors the formation iodomethyl germane NMeD-101 over methylene-bridged germanes. NMeD-101 is dissolved in dry MeOH and added to a reaction vessel suitable for pressurized hydrogenations. Palladium hydroxide catalyst is added and the vessel pressurized with hydrogen gas. Agitation of the reaction under the pressurized hydrogen atmosphere yields NMeD-102, the MeDonationNH tip.

Figure 30:
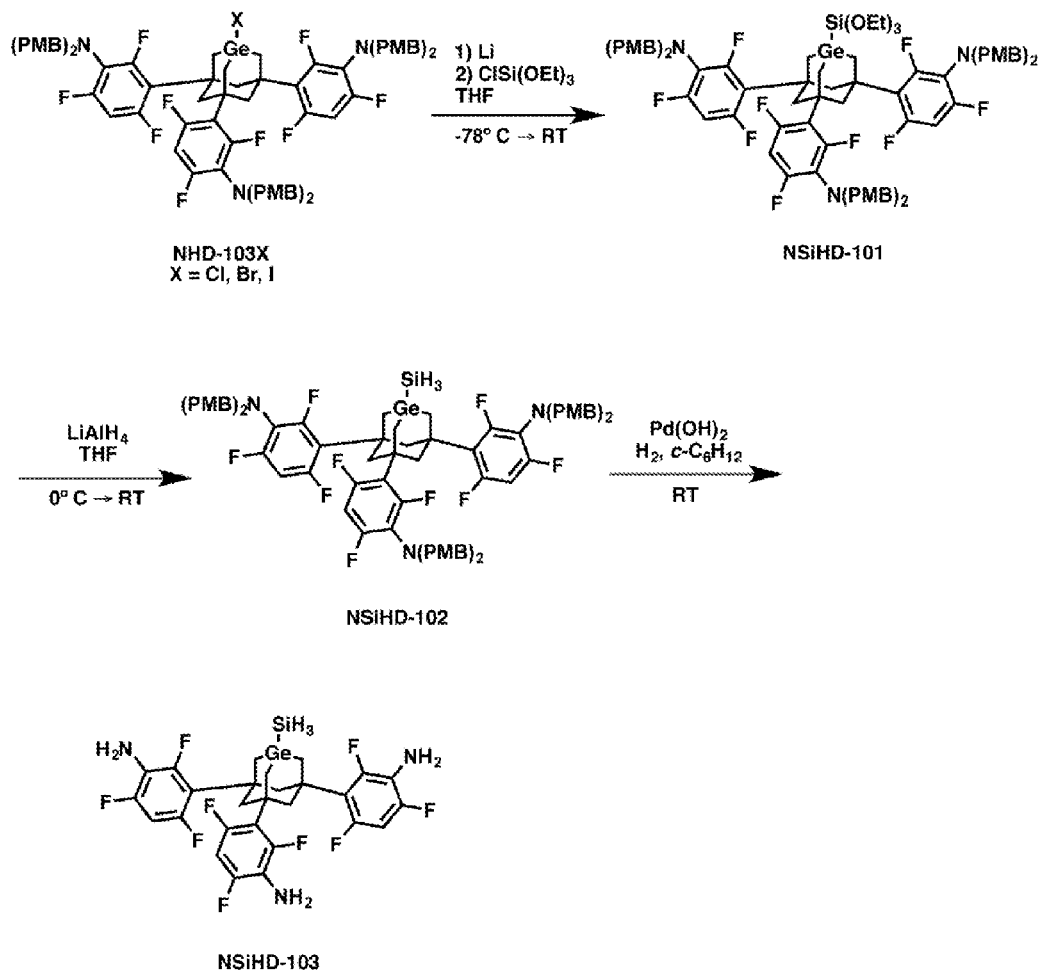
FIG. 30 depicts a synthetic route for the SiH3DonationO tip.

FIG. 30 depicts a synthetic pathway for SiH3DonationNH. The synthesis steps are as follows: The germanium halide NHD-103X in THF solution is reduced with lithium metal at −78 C to generate a lithiated germanium species in situ. The solution is then removed by syringe to separate the lithiated germanium species from the unreacted lithium metal and then slowly added dropwise to a solution of excess chlorotriethoxysilane in THF cooled to 0 C and the reaction is allowed to warm to room temperature to produce NSiHD-101. NSiHD-101 in THF solution cooled to 0 C is reduced with lithium aluminum hydride to generate NSiHD-102. NSiHD-102 is dissolved in cyclohexane and added to a reaction vessel suitable for pressurized hydrogenations. Palladium hydroxide catalyst is added and the vessel pressurized with hydrogen gas. Agitation of the reaction under the pressurized hydrogen atmosphere yields NSiHD-103, the SiH3DonationNH tip.

Figure 31:
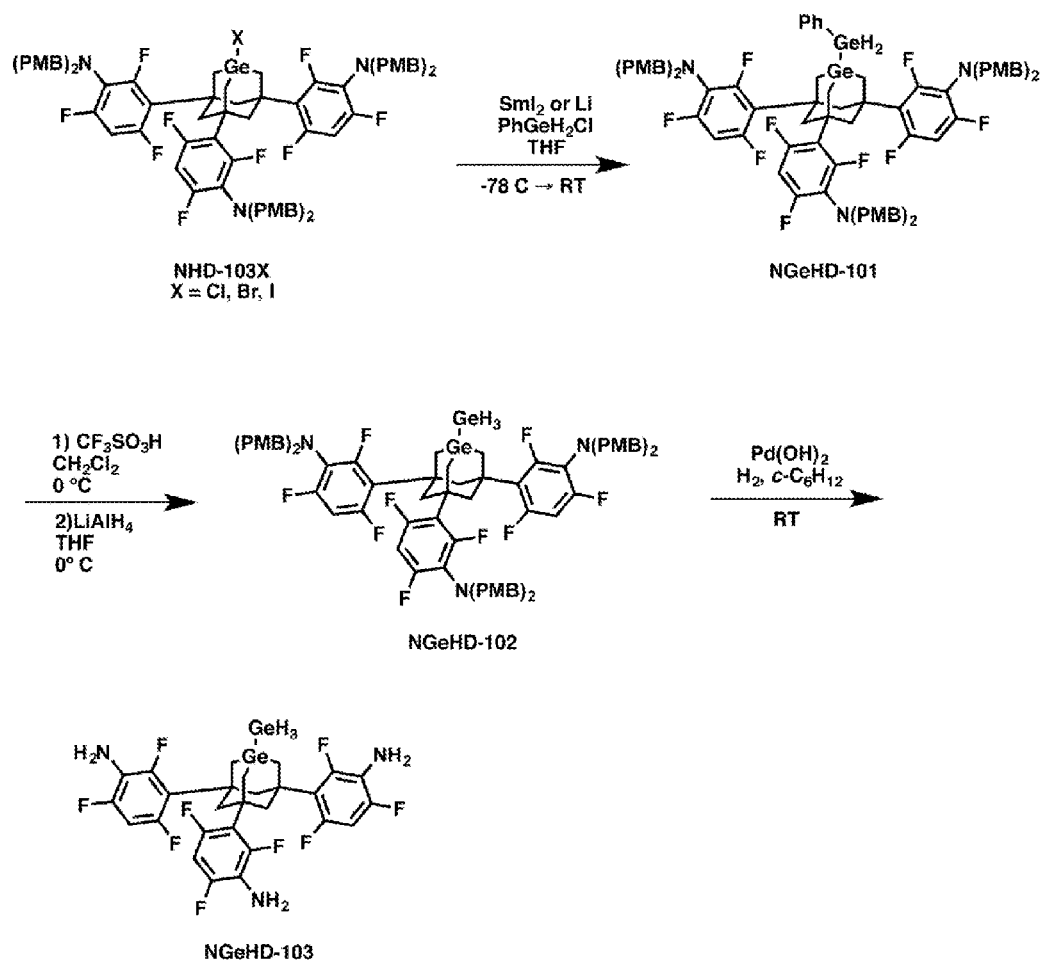
FIG. 31 depicts a synthetic route for the GeH3DonationO tip.

FIG. 31 depicts a synthetic pathway for GeH3DonationNH. The synthesis steps are as follows: The germanium halide NHD-103X in THF solution is reduced with lithium metal at −78 C to generate a lithiated germanium species in situ. The solution is then removed by syringe to separate the lithiated germanium species from the unreacted lithium metal and then slowly added dropwise to a solution of chloro(phenyl)germane in THF cooled to 0 C and the reaction is allowed to warm to room temperature to produce NGeHD-101. It is necessary to separate the lithiated germanium species from excess lithium metal before addition to the trimethylgermanium chloride to prevent lithium-halogen exchange reactivity with the chloro(phenyl)germane. NGeHD-101 is dephenylated with trifluoromethanesufonic acid at 0 C. The crude reaction isolate after neutralization of acid and workup is then dissolved in dry THF. The reaction is cooled to 0 C and lithium aluminum hydride is added to produce the germane NGeHD-102. NGeHD-102 is dissolved in cyclohexane and added to a reaction vessel suitable for pressurized hydrogenations. Palladium hydroxide catalyst is added and the vessel pressurized with hydrogen gas. Agitation of the reaction under the pressurized hydrogen atmosphere yields NGeHD-103, the GeH3DonationNH tip.

Figure 32:
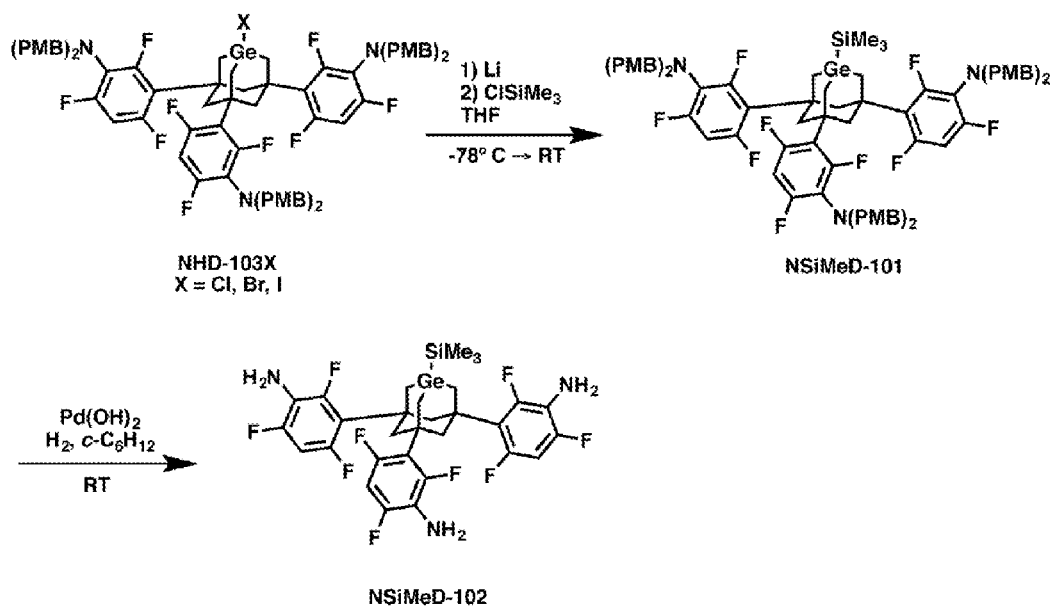
FIG. 32 depicts a synthetic route for the SiMe3DonationO tip.

FIG. 32 depicts a synthetic pathway for SiMe3DonationNH. The synthesis steps are as follows: The germanium halide NHD-103X in THF solution is reduced with lithium metal at −78 C to generate a lithiated germanium species in situ. The solution is then removed by syringe to separate the lithiated germanium species from the unreacted lithium metal and then slowly added dropwise to a solution of excess chlorotrimethylsilane in THF cooled to 0 C and the reaction is allowed to warm to room temperature to produce NSiMeD-101. NSiMeD-101 is dissolved in cyclohexane and added to a reaction vessel suitable for pressurized hydrogenations. Palladium hydroxide catalyst is added and the vessel pressurized with hydrogen gas. Agitation of the reaction under the pressurized hydrogen atmosphere yields NSiMeD-102, the SiMe3DonationNH tip.

Figure 33:
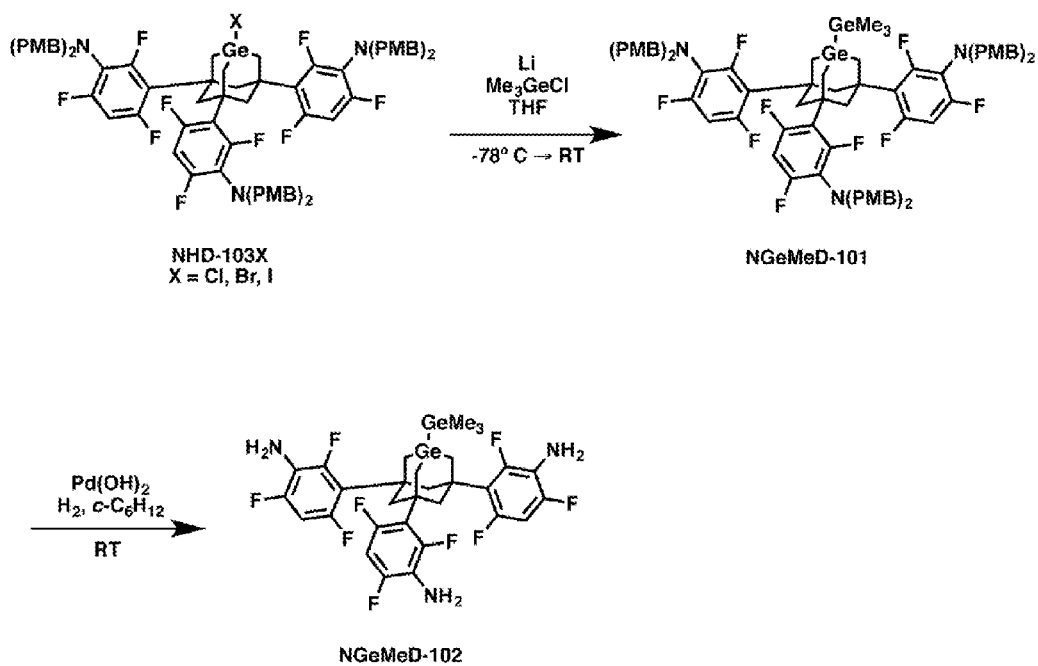
FIG. 33 depicts a synthetic route for the GeMe3DonationO tip.

FIG. 33 depicts a synthetic pathway for GeMe3DonationNH. The synthesis steps are as follows: The germanium halide NHD-103X in THF solution is reduced with lithium metal at −78 C to generate a lithiated germanium species in situ. The solution is then removed by syringe to separate the lithiated germanium species from the unreacted lithium metal and then slowly added dropwise to a solution of trimethylgermanium chloride in THF cooled to 0 C and the reaction is allowed to warm to room temperature to produce NGeMeD-101. It is necessary to separate the lithiated germanium species from excess lithium metal before addition to the trimethylgermanium chloride to prevent lithium reduction of the germanium chloride. NGeMeD-101 is dissolved in cyclohexane and added to a reaction vessel suitable for pressurized hydrogenations. Palladium hydroxide catalyst is added and the vessel pressurized with hydrogen gas. Agitation of the reaction under the pressurized hydrogen atmosphere yields NGeMeD-102, the GeMe3DonationNH tip.

Figure 34:
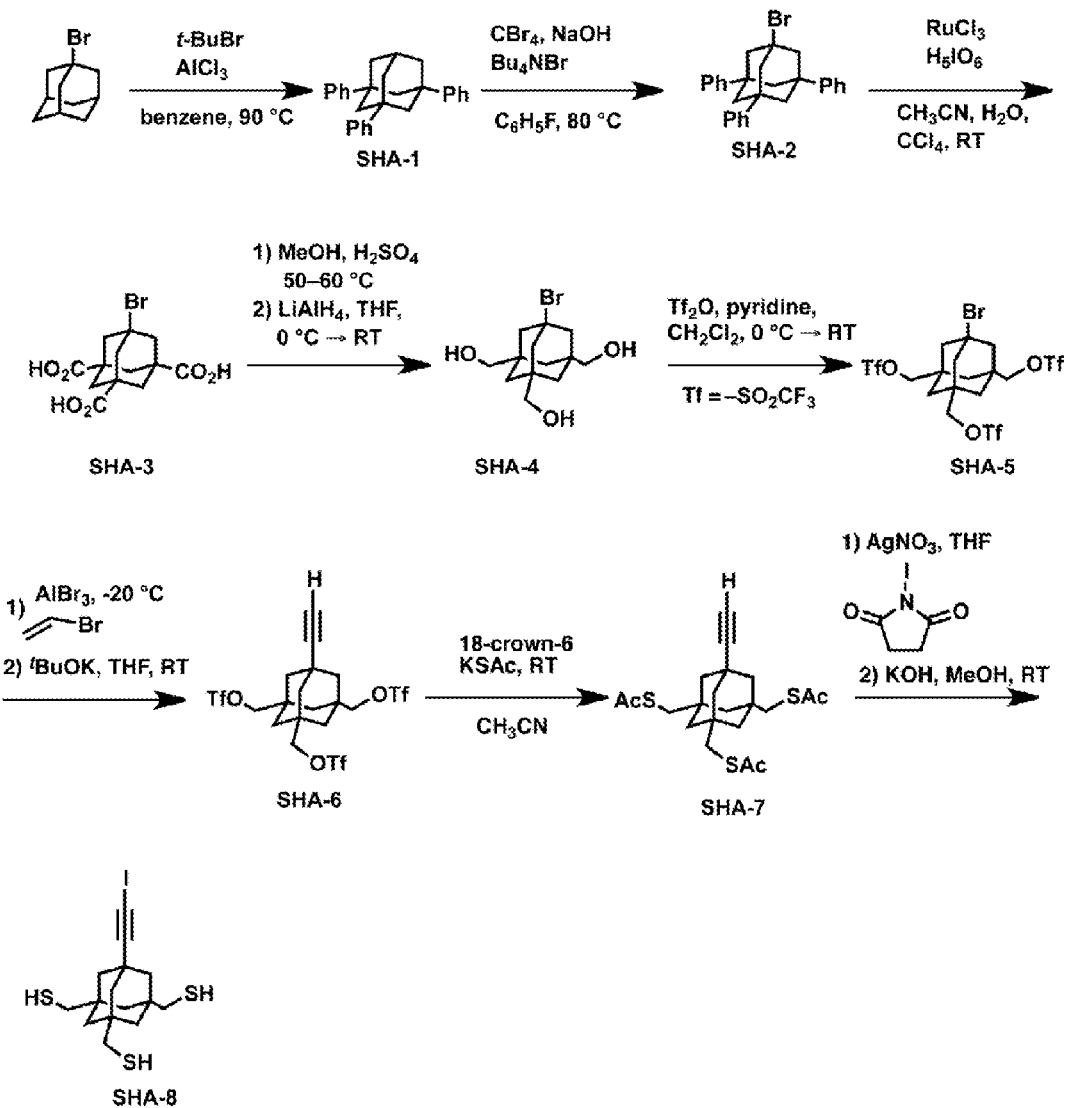
FIG. 34 depicts a synthetic route for the AbstractionS tip.

FIG. 34 depicts a synthetic pathway for AbstractionS. The synthesis steps are as follows: Commercially available 1-bromoadamantane undergoes a Friedel-Crafts alkylation with three separate benzene molecules under Lewis acidic conditions with AlCl3 at 90 C to yield SHA-1. Careful control of the stoichiometry of the tert-butyl bromide (2.0 equivalents) yields the 1,3,5-triphenyl adamantane (Newman, H. Synthesis, 1972, 12, 692-693). Treatment of SHA-1 in fluorobenzene and 50% aqueous NaOH solution with a phase transfer catalyst gives SHA-2. This reaction is selective at brominating the tertiary C—H bond in the adamantane (Schreiner, P. R.; Lauenstein, O.; Butova, E. D.; Gunchenko, P. A.; Kolomitsin, I. V.; Wittkopp, A.; Feder, G.; Fokin, A. A., Chem. Eur. J. 2001, 7, 4996-5003). Oxidative cleavage of the aromatic rings by RuCl3 in a biphasic mixture gives the tricarboxylic acid SHA-3 (Carlsen, P. H. J.; Katsuki, T.; Martin, V. S.; Sharpless, K. B., J. Org. Chem. 1981, 46, 3936-3938). Esterification of SHA-3 with dry methanol and catalytic sulfuric acid between 50-60° C. yields the triester SHA-4 that can be reduced readily with LiAlH4 at 0 C. The triol SHA-4 can react readily with triflic anhydride and pyridine in dichloromethane at 0 C to give the compound SHA-5. Condensing vinyl bromide at −20° C. with catalytic AlBr3 in the presence of the adamantyl bromide SHA-5 gives a dibromoethyladamantane intermediate that is used with potassium tert-butoxide to eliminate to give the alkyne SHA-6 (Malik, A. A.; Archibald, T. G.; Baum, K.; Unroe, M. R., J. Polymer Sci. Part A: Polymer Chem. 1992, 30, 1747-1754). Three equivalents of potassium thioacetate displaces the triflate groups in refluxing acetonitrile to give the compound SHA-7. The use of 18-crown-6 enhances the nucleophilicity of the thioacetate and can be added to enhance the rate of the reaction at room temperature (Kitagawa, T., Idomoto, Y.; Matsubara, H.; Hobara, D.; Kakiuchi, T.; Okazaki, T.; Komatsu, K., J. Org. Chem. 2006, 71, 1362-1369). Silver nitrate with N-iodosuccinimide in THF creates the iodoalkyne at room temperature and treatment with potassium hydroxide removes the acetate groups to give compound SHA-8, the AbstractionS tip.

Figure 35:
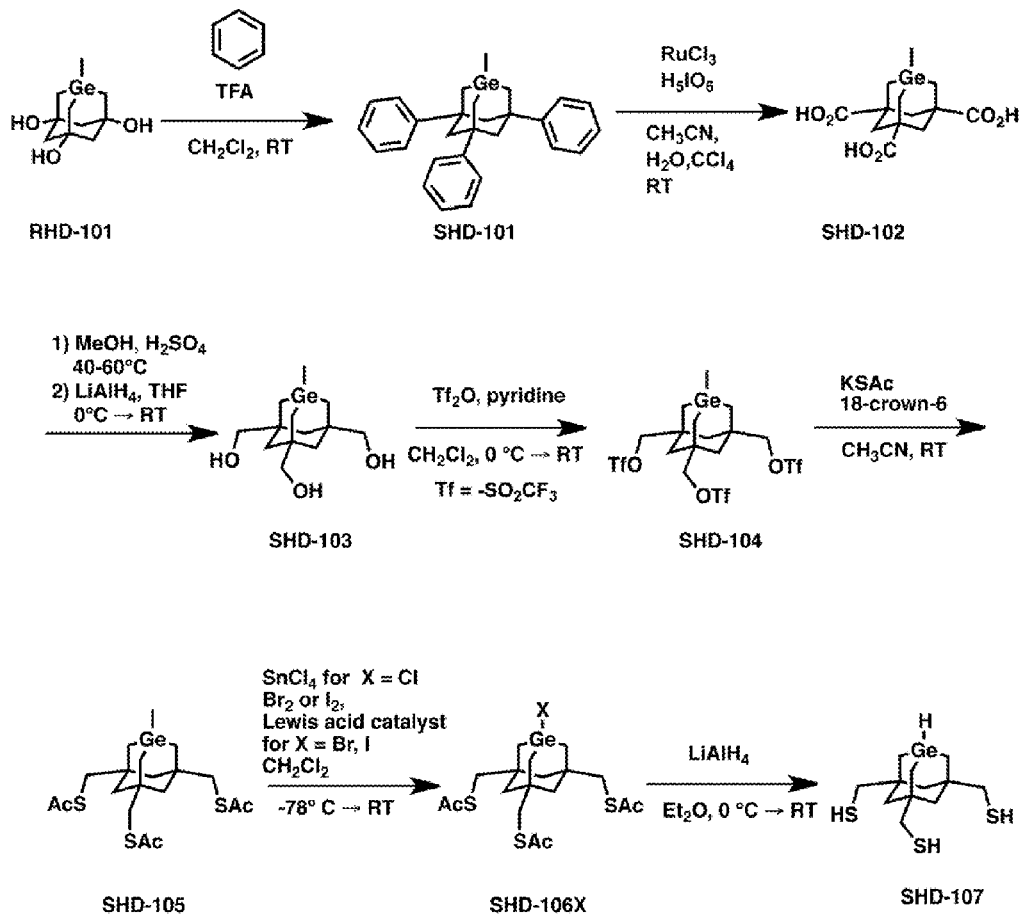
FIG. 35 depicts a synthetic route for the HDonationS tip.

FIG. 35 depicts a synthetic pathway for HDonationS. The synthesis steps are as follows: Allowing RHD-101 to react with benzene and trifluoroacetic acid (TFA) at room temperature in dichloromethane forms the triphenylgermaadamantane SHD-101. Oxidative cleavage of the phenyl groups with catalytic RuCl3 in a solvent mixture of CCl4, CH3CN, and H$_2$O with periodic acid added as stoichiometric oxidant cleaves the aromatic rings between 0° C. to room temperature gives the tricarboxylic acid SHD-102. Esterification of SHD-102 with methanol with sulfuric acid between 40-60° C. gives the triester that can subsequently be reduced with LiAlH4 at 0° C. to give the triol SHD-103. Triol SHD-103 can be treated with triflic anhydride at 0° C. with pyridine in dichloromethane to give the triflate SHD-104. Displacement of the triflate groups with potassium thioacetate in the presence of 18-crown-6 ether in acetonitrile at room temperature yields the acetate-protected thiols in SHD-105. Treatment of SHD-105 with a Lewis acid source including to but not limited to SnCl4, I2, or Br2 in dichloromethane at −78° C. to room temperature selectively cleaves the Ge-Me bond to give the respective Ge—X (X=Cl, Br, I) bond in SHD-106X. Treating the resulting Ge—X compound SHD-106X with LiAlH4 at 0° C. to room temperature reduces the Ge—X bond as well as simultaneously removing the thioacetate groups from the thiols to yield the trithiol SHD-107, the HDonationS tip, upon aqueous workup.

FIG. 36 depicts a synthetic pathway for C2DonationS. The synthesis steps are as follows: The intermediate SHD-106X from the HDonationS synthesis is allowed to react with an excess of commercially available ethynylmagnesium bromide solution in diethyl ether at 0° C. to room temperature to form SC2D-101. The excess of the ethynylmagnesium bromide ensures full deprotection of the thioacetate protective groups upon aqueous workup. The thiols in SC2D-101 are protected with acetate groups by treating it with acetic anhydride (Ac2O). The protected compound is then treated with silver nitrate and a slight excess of N-iodosuccinimide in THF at room temperature to form the iodoalkyne in SC2D-102. Subsequent treatment of the crude reaction mixture in basic methanol at room temperature yields SC2D-102, the C2DonationS tip.

FIG. 37 depicts a synthetic pathway for MeDonationS. The synthesis steps are as follows: The synthesis of the thiol methyl donation tool begins from intermediate SHD-105. The acetate groups must be exchanged with a thioether protective group, specifically the tert-butyl group, to withstand the synthetic conditions. The acetate groups are removed in basic methanol at room temperature and then subsequently treated with an acidic solution of tert-butanol at room temperature to form SMeD-101. The Ge-Me bond is cleaved with a Lewis acid between −78° C. and room temperature with a reagent such as SnCl4, I2, or Br2 to yield the Ge—Cl bond in SMeD-102X. Treating SMeD-102X with lithium metal and excess CH2I2 at 0 C in THF at high dilution yields SMeD-103. Removal of the tert-butyl groups is performed with 2-nitrobenzenesulfenyl chloride in acetic acid and yields a mixed disulfide (Pastuszak, J. J., Chimiak, A., J. Org. Chem., 1981, 46, 1868. Quintela, J. M., Peinador, C., Tetrahedron, 1996, 52, 10497). Treating this disulfide with NaBH4 at low temperature between −20° C. and 0° C. allows the recovery of the free thiol SMeDon-104, the MeDonationS tip, without reducing the C—I bond.

Figure 38:
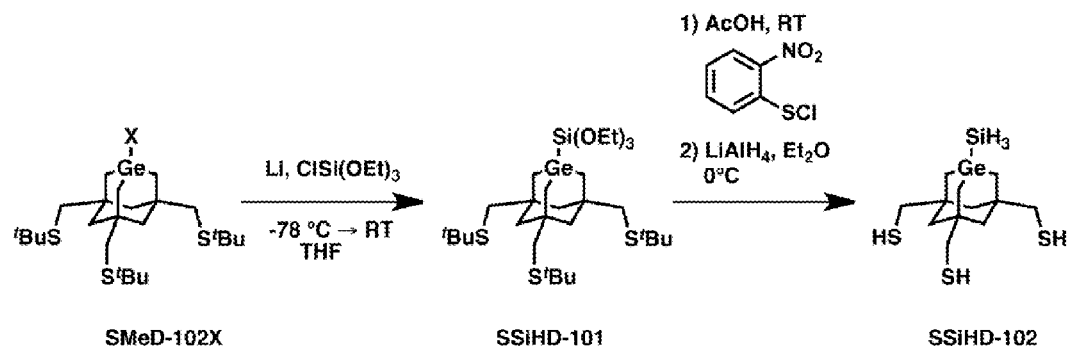
FIG. 38 depicts a synthetic route for the SiH3DonationS tip.

FIG. 38 depicts a synthetic pathway for SiH3DonationS. The synthesis steps are as follows: Intermediate SMeD-102X with t-butyl protected thiols is treated with lithium metal in THF at 0° C. followed by the addition of triethoxychlorosilane to give SSiHD-101 upon workup. This reaction forms the Ge—Si bond necessary for the SiH3 donor. The removal of the t-butyl groups is performed with the reagent 2-nitrobenzenesulfenyl chloride in acetic acid at room temperature to give the mixed disulfide. Treatment with LiAlH4 cleaves the S—S bonds to give the free thiols in SSiHD-102, the SiH3DonationS tip, as well as simultaneously reducing the triethoxysilyl group to —SiH3.

Figure 39:
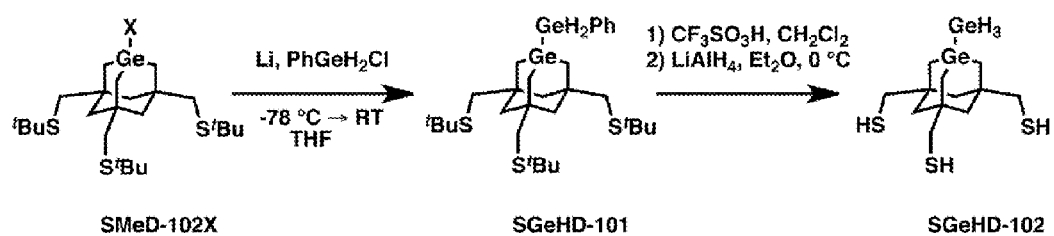
FIG. 39 depicts a synthetic route for the GeH3DonationS tip.

FIG. 39 depicts a synthetic pathway for GeH3DonationS. The synthesis steps are as follows: Intermediate SMeD-102X with t-butyl protected thiols is treated with lithium metal in THF at −78° C. The solution is then removed by syringe to separate the lithiated germanium species from the unreacted lithium metal and then slowly added dropwise to a solution of PhGeH2Cl at 0° C. to give SGeHD-101 upon workup. This reaction forms the Ge—Ge bond necessary for the —GeH3 donor. Treatment of SGeHD-101 with triflic acid cleaves the Ph-Ge bond to form a Ge—OSO2CF3 bond. Triflic acid also removes of the t-butyl thioether groups. Treatment of the this intermediate with LiAlH4 in diethyl ether at 0° C. cleaves any S—S bonds to give the free thiols in SGeHD-102, the GeH3DonationS tip, as well as simultaneously reducing the Ge triflate group to —GeH3.

Figure 40:
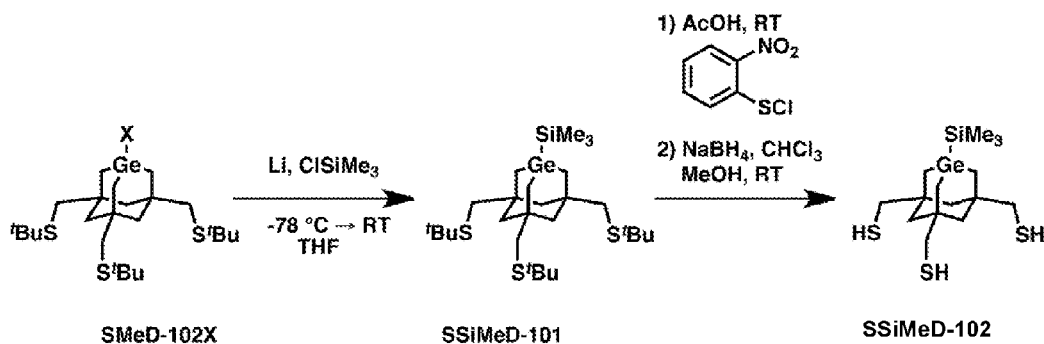
FIG. 40 depicts a synthetic route for the SiMe3DonationS tip.

FIG. 40 depicts a synthetic pathway for SiMe3DonationS. The synthesis steps are as follows: Intermediate SMeD-102X with t-butyl protected thiols is treated with lithium metal in THF at −78 C followed by the addition of chlorotrimethylsilane upon warming to 0° C. Upon workup the compound SSiMeD-101 with the Ge—Si bond is obtained. The removal of the t-butyl groups is performed with the reagent 2-nitrobenzenesulfenyl chloride in acetic acid at room temperature to give the mixed disulfide. Treatment with NaBH4 in chloroform and methanol at room temperature cleaves the S—S bonds to give the free thiols in SSiMeD-102, the SiMe3DonationS tip.

Figure 41:
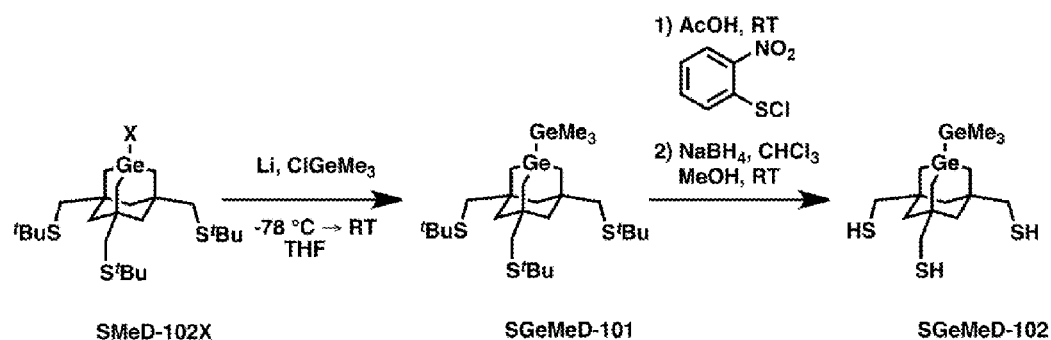
FIG. 41 depicts a synthetic route for the GeMe3DonationS tip.

FIG. 41 depicts a synthetic pathway for GeMe3DonationS. The synthesis steps are as follows: Intermediate SMeD-102X with t-butyl protected thiols is treated with lithium metal in THF at −78 C. The solution is then removed by syringe to separate the lithiated germanium species from the unreacted lithium metal and then slowly added dropwise to a solution of chlorotrimethylgermane at 0 C. Upon workup the compound SGeMeD-101 with the Ge—Ge bond is obtained. The removal of the t-butyl groups is performed with the reagent 2-nitrobenzenesulfenyl chloride in acetic acid at room temperature to give the mixed disulfide. Treatment with NaBH4 in chloroform and methanol at room temperature cleaves the S—S bonds to give the free thiols in SGeMeD-102, the GeMe3DonationS tip.

Figure 42:
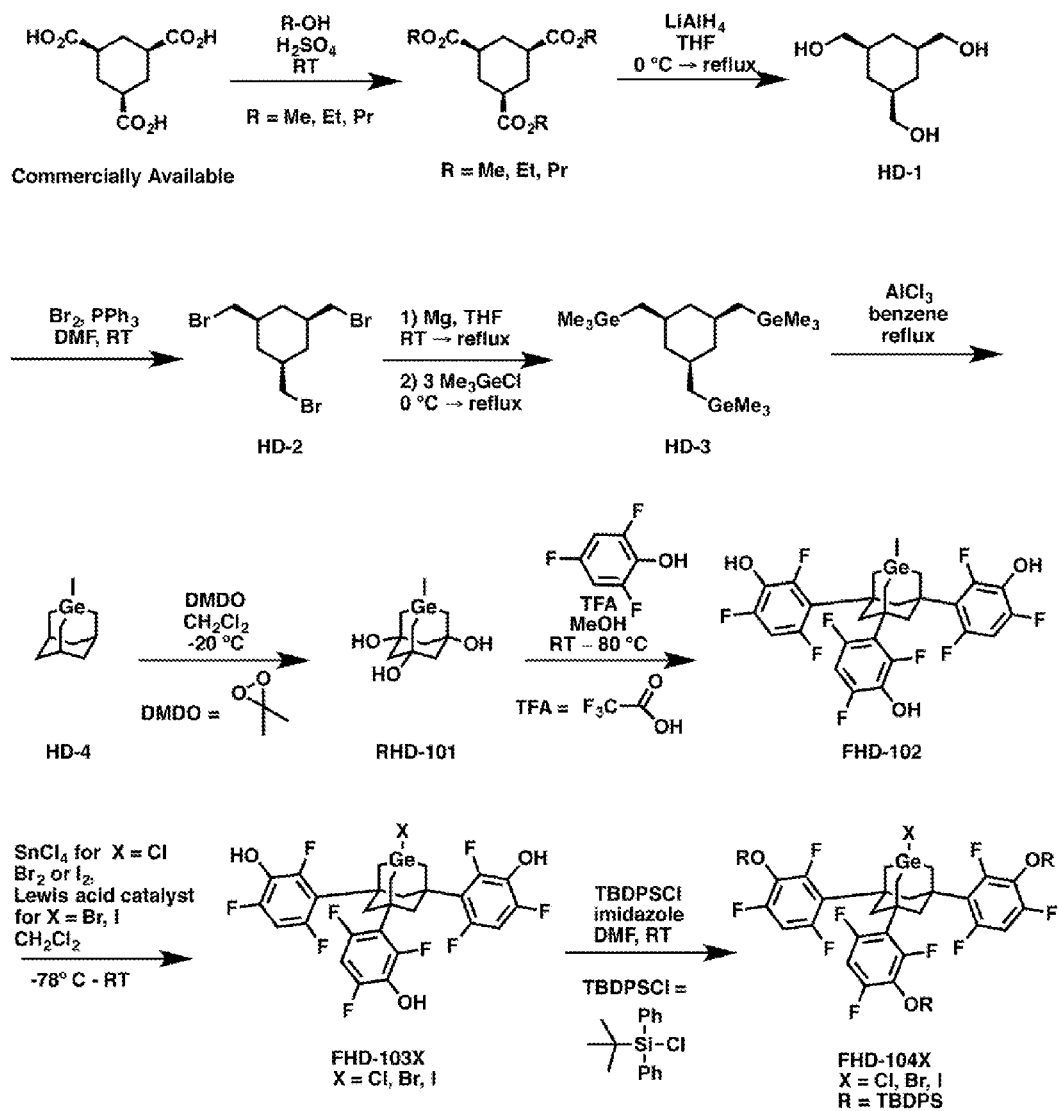
FIG. 42 depicts a synthetic route for the FHD-104X intermediate.

FIG. 42 depicts a synthetic pathway for intermediate FHD-104X, from which some of the other syntheses begin. The synthesis steps are as follows: Cis, cis-Tri-O-alkyl 1,3,5-Cyclohexanetricarboxylate is reduced with lithium aluminum hydride in refluxing THF and vigorous mechanical stirring to yield cis, cis-1,3,5-tris(hydroxymethyl)cyclohexane HD-1. The procedure used resembles that found in Boudjouk et al., Organometallics 1983, 2, 336. Cis, cis-1, 3,5-Tris(hydroxymethyl)cyclohexane, HD-1, is brominated utilizing triphenylphosphine dibromide generated in situ. This is accomplished by slow addition of bromine to a solution of the triol and triphenylphosphine in DMF at room temperature to yield cis, cis-1,3,5-tris(bromomethyl)cyclohexane, HD-2. The procedure used resembles that found in Boudjouk et al., Organometallics 1983, 2, 336. The tri-Grignard is generated in situ by adding cis, cis-1,3,5-Tris (bromomethyl)cyclohexane, HD-2, at room temperature to magnesium turnings in THF and heating to reflux. The tri-Grignard is then transferred to a second reaction vessel to separate the reagent from the excess magnesium turnings (Mg is capable of inserting into a Ge—Cl bond). Trimethylchlorogermane, previously dried over calcium hydride and degassed, is added slowly dropwise to the reaction at 0 C. After 2 hours, the reaction is warmed to room temperature for two hours, and finally refluxed overnight. The reaction yields predominantly cis, cis-1,3,5-Tris(trimethylgermylmethyl)cyclohexane, HD-3. Cis, cis-1,3-dimethyl-5-(trimethylgermylmethyl)cyclohexane and cis, cis-1-methyl-3,5-bis (trimethylgermylmethyl)cyclohexane are also produced in small amounts. The procedure used is similar to that found in Boudjouk and Kapfer, Journal of Organometallic Chemistry, 1983, 296, 339. HD-3 in benzene solution is subjected to redistribution reaction conditions using high purity anhydrous aluminum trichloride and heating to reflux to yield 1-methyl-1-germaadamantane. HD-3 side products cis, cis-1,3-dimethyl-5-(trimethylgermylmethyl)cyclohexane and cis, cis-1-methyl-3,5-bis(trimethylgermylmethyl)cyclohexane may also be present in the reaction or isolated and reacted under these conditions to yield HD-4 as well. HD-4 is reacted with excess "ketone free" dimethyldioxirane (DMDO) (Crandall, J. K. 2005. Dimethyldioxirane. e-EROS Encyclopedia of Reagents for Organic Synthesis.) in methylene chloride solution at −20 C to yield 1-methyl-3,5,7-trihydroxy-1-germaadamantane RHD-101. The absence of acetone in the reaction conditions allows for RHD-101 to precipitate from the reaction mixture, preventing over-oxidation. Upon completion of the reaction, isopropyl alcohol is used to quench the excess DMDO, preventing over-oxidation by excess reagent during reaction workup. RHD-101 is subjected to strongly acidic conditions in the presence of 2,4,6-trifluorophenol at room temperature to yield FHD-102. The use of Brønsted acidic conditions favors carbocation formation at the 3,5,7 bridgehead positions of the adamantane cage structure over redistribution reactivity at the germanium center. The 1-methyl group of FHD-102 can be exchanged with a halide (X=F, Cl, Br, I) with a variety of electrophilic reagents at low temperatures ranging from −78 C up to room temperature, depending on the halide desired. Reagents include, but are not limited to: Lewis acids such as SnCl4 or GaCl3, elemental halides Br2 and I2 with Lewis acid catalyst, alkyl halides such as isopropyl chloride with Lewis acid catalyst, and interhalogen compounds such as IBr and ICl. Furthermore, heavier FHD-103X halides can be converted to lighter halides utilizing the appropriate lighter silver halide (e.g. FHD-103Br and AgCl will produce FHD-103Cl). The phenolic alcohols of FHD-103X (X=F, Cl, Br, I) can be protected utilizing tert-butyl(chloro) diphenysilane and imidazole in DMF at RT to yield FHD-104X (X=F, Cl, Br, I).

Figure 43:
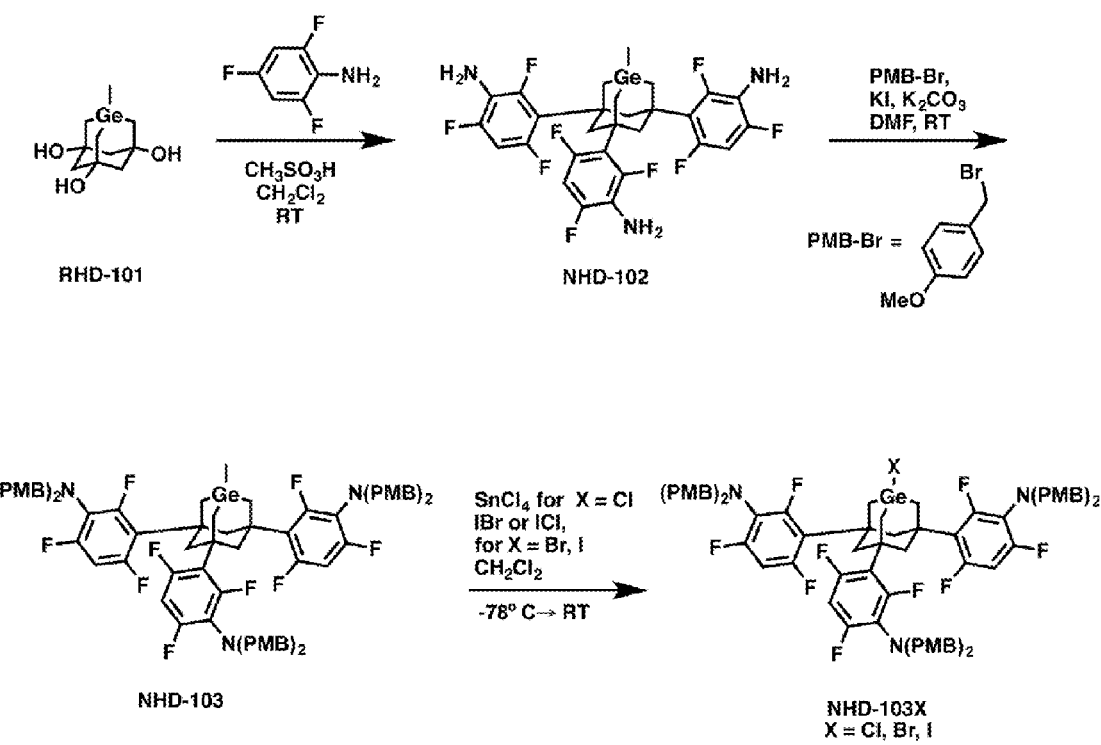
FIG. 43 depicts a synthetic route for the NHD-103X intermediate.

FIG. 43 depicts a synthetic pathway for intermediate NHD-103X, from which some of the other syntheses begin. The synthesis steps are as follows: RHD-101 is subjected to strongly acidic conditions such as methanesulfonic acid in the presence of 2,4,6-trifluoroaniline at room temperature to yield NHD-102. The use of Brønsted acidic conditions favors carbocation formation at the 3,5,7 bridgehead positions of the adamantane cage structure over redistribution reactivity at the germanium center. To form NHD-103, NHD-102 is alkylated at room temperature with 4-methoxybenzyl bromide in DMF with potassium carbonate base in the presence of potassium iodide. To form NHD-103X, the 1-methyl group of NHD-103 can be exchanged with a halide (X=F, Cl, Br, I) with a variety of electrophilic reagents at low temperatures ranging from −78 C up to room temperature depending on the halide desired. Reagents include, but are not limited to: Lewis acids such as SnCl4 or GaCl3, elemental halides Br2 and I2 with Lewis acid catalyst, alkyl halides such as isopropyl chloride with Lewis acid catalyst, and interhalogen compounds such as IBr and ICl. Furthermore, heavier NHD-103X halides can be converted to lighter halides utilizing the appropriate lighter silver halide (e.g. NHD-103Br and AgCl will produce NHD-103Cl).

Surface Preparation

Various exemplary surfaces are described herein, including diamond, silicon and gold. Preferably, these surfaces would more specifically be depassivated diamond, partially-hydrogenated partially-chlorinated Si(111), and Au(111). Of course, similar surfaces could be used, including germanium, and lead, although they may require leg or linker modifications.

With respect to diamond, methods for obtaining surfaces appropriate for both presentation of tips and building of workpieces are well known in the literature (for example, see (Hayashi, Yamanaka et al., "Atomic force microscopy study of atomically flat (001) diamond surfaces treated with hydrogen plasma," Applied Surface Science. 1998. 125:120-124; Watanabe, Takeuchi et al., "Homoepitaxial diamond film with an atomically flat surface over a large area," Diamond and Related Materials. 1999. 8:1272-1276; Okushi, "High quality homoepitaxial CVD diamond for electronic devices," Diamond and Related Materials. 2001. 10:281-288; Tokuda, Umezawa et al., "Atomically flat diamond (111) surface formation by homoepitaxial lateral growth," Diamond and Related Materials. 2008. 17:1051-1054; Yatsui, Nomura et al., "Realization of an atomically flat surface of diamond using dressed photon-phonon etching," Journal of Physics D: Applied Physics. 2012. 45:475302)).

Partially-hydrogenated partially-chlorinated Si(111) is used in preference to a fully-chlorinated Si surface because the partial chlorination reduces the energy barrier to the tip molecules binding as compared to just chlorinated Si(111) because the hydrogen, being smaller in size than Cl, helps reduce steric congestion as the tip approaches the surface. Hydrogenation is preferably in the 33%-50% range, although wider ranges will work, as will not using hydrogenation at all. Partially hydrogenated partially-chlorinated Si(111) can be prepared in a number of ways. One is the following.

Clean, atomically flat doped Si(111) surfaces are prepared by direct current annealing the Si for several hours at ~650 C followed by rapid heating to ~1200 C for 1-20 sec while keeping the chamber pressure <1×10−9 Torr. This procedure gives the 7×7 reconstructed Si(111) surface, as in J Phys Cond Matt 26, 394001 (2014).

The Si(111) surface can be chlorinated by depositing Cl2 from an electrochemical cell similar to the one in J Vac Sci and Tech A 1, 1554 (1983), while the Si(111) is heated to ~400 C. Atomically flat halogenated Si(111) surfaces have been prepared this way, as in Phys Rev Lett 78, 98 (1997).

Si(111)-Cl surfaces can then be partially hydrogenated by exposing the surface to 600 L of atomic hydrogen from a H2 cracker, as in Surf Sci 402-404, 170-173 (1998), with the Si(111)-Cl at room temperature.

Clean, atomically flat Au(111) surfaces are prepared by repeated cycles of sputtering and annealing a single crystal Au(111) surface, as in Phys Rev Lett 80, 1469 (1998).

Tip Bonding

Once synthesized, a tip can be bound to a presentation surface, including large surfaces, and smaller surfaces such as meta-tips or a single-tip tool surface. Many ways of binding tips to surfaces are possible, and these may vary with the exact nature of the tip and the surface.

One method of depositing isolated tips on a surface is via thermal evaporation in vacuum. In this technique, purified molecules in the form of a solid or liquid are heated up in a vacuum chamber until they evaporate as a gas of isolated molecules. By placing the presentation surface within this gas, individual tips will adhere to the surface. (See tetramantane deposition as described in "Spatially resolved electronic and vibronic properties of single diamondoid molecules," Nature Materials 7, 38-42 (2008)). This method has the advantage of depositing molecules without surface contamination from a solvent and can be used with masks. The use of masks allows creating sectors which could each contain different tips, or different mixtures of tips, allowing for logical and efficient layout of tips.

The tips having sulfur or thiol-based linkers will bond to gold spontaneously at room temperature. The tips with O or NH linkers designed to bond to chlorinated silicon surfaces require heating of the surface to overcome reaction barriers. This is the reason partial hydrogenation/chlorination is favored: The reduction in steric interference keeps the reaction barrier to tip binding as far below the tip decomposition temperature as possible.

A simple way to evaporate molecules is to place the molecules in a glass or alumina crucible with a tungsten wire wrapped around the crucible. Passing a current through the wire heats the crucible and molecules, generating a molecular gas that exits the front of the crucible. A thermocouple on the crucible measures its temperature. A quartz crystal microbalance can be used to determine how much is evaporating as a function of time and temperature.

This is just one example of how tips could be bonded to a surface. Such techniques, including how to create sectors of specific molecules, are well-known in the respective arts. (Zahl, Bammerlin et al., "All-in-one static and dynamic nanostencil atomic force microscopy/scanning tunneling microscopy system," Review of Scientific Instruments. 2005. 76:023707; Sidler, Cvetkovic et al., "Organic thin film transistors on flexible polyimide substrates fabricated by full-wafer stencil lithography," Sensors and Actuators A: Physical. 2010. 162:155-159; Vazquez-Mena, Gross et al., "Resistless nanofabrication by stencil lithography: A review," Microelectronic Engineering. 2015. 132:236-254; Yesilkoy, Flauraud et al., "3D nanostructures fabricated by advanced stencil lithography," Nanoscale. 2016. 8:4945-50)

Tip Activation

Figure 44:
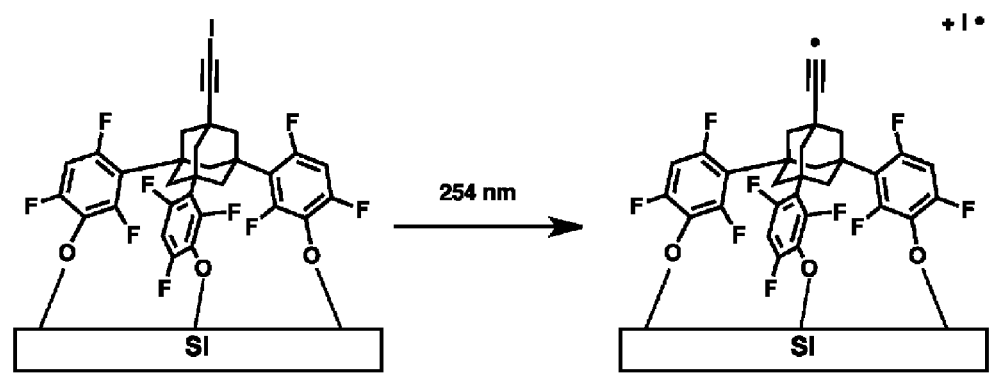
FIG. 44 depicts photo-activation of a halogen-capped tip.
Figure 45:
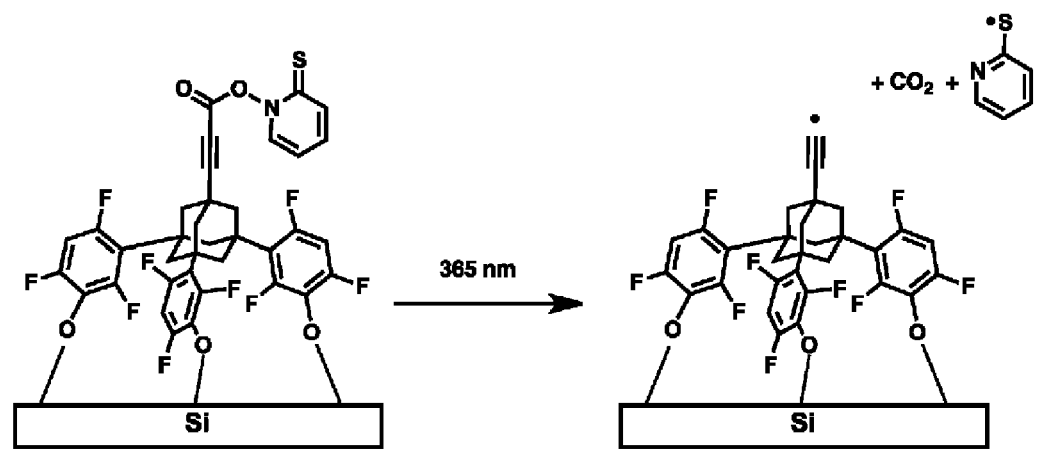
FIG. 45 depicts photo-activation of a Barton ester-capped tip.

Tips, particularly those with exposed radicals at their active site, may be bonded to a surface in an inactive form. One method of activating such tips is through photo-cleavage of the structure. For example, the halogen-capped tip examples herein can be activated through exposure to 254 nm light. FIG. 44 depicts an activating reaction for halogen-capped tips. Other wavelengths and chemistries can also be used. For example, if different synthetic steps were used, a tip could be protected with a Barton ester, which can then be cleaved, activating the tip, with 365 nm light. FIG. 45 provides an example of the activation reaction that could be used with a Barton ester.

While not the only way to remove a tip cap, photo-activation is convenient in that different areas of a surface can be masked. Different wavelengths can also be used, choosing wavelengths which affect some tips but not others. This makes photo-activation a versatile technique even when multiple types of tips are present, or when potentially-complex layout patterns are desired.

Barton Ester Caps

Other examples are provided herein of synthetic routes to halogen-capped tips, and how to activate them. To demonstrate another chemistry for synthesizing tips with protective caps, the Barton ester is an alternative that fragments upon being irradiated with, for example, 355-365 nm wavelength light to give the carbon centered radical, $CO_2$, and the pyrithiyl radical. (Barton, D. H. R., Crich, D., Potier, P. Tetrahedron Lett., 1985, 26, 5943-5946. For a review of thiohydroxamic acids chemistry see: Crich, D., Quintero, L. Chem. Rev. 1989, 89, 1413-1432) These types of activated molecules can be made from the described compounds and one such synthetic route is described below, resulting in the Barton ester version of the AbstractionO tip.

FIG. 46 depicts the synthesis of the Barton ester AbstractionO tip, which is as follows: To synthesize the Barton ester for photoactivation, propynoic acid OFAB-1 is made from OFA-7 using the traditional Corey-Fuchs procedure and quenching by bubbling gaseous $CO_2$ through the reaction mixture. (Corey, E. J., Fuchs, P. L. Tetrahedron Lett. 1972, 36, 3769-3772) The first step forms the 1,1-dibromoalkene in solution at −78 C. The addition of 2 more equivalents of butyllithium forms the lithium acetylide in the reaction mixture. By bubbling with the carbon dioxide the desired carboxylic acid OFAB-1 is obtained after an aqueous workup. To make the Barton ester, carboxylic acid derivative OFAB-1 is activated to the acid halide by oxalic acid and catalytic N,N-dimethylformamide (DMF) in dichloromethane at room temperature. To this reaction mixture the sodium pyrithione salt is added to the mixture to form the desired ester bond in compound OFAB-2. The Barton ester is unstable to aqueous acidic and basic media, so careful control of reaction conditions must be taken when removing the protective groups. Multiple techniques are possible for removal of silyl ethers such as OFAB-2 that are pH sensitive. One is to use more labile silyl ethers such as trimethylsilyl-(TMS-) or triethylsilyl-(TES-) ethers in place of the more stable TBS silyl ethers. Another method is to use OFAB-2 and catalytic solid tetra-n-butylammonium fluoride (TBAF) or cesium fluoride in 100:1 THF-buffer solution to produce OFAB-3. A solution of K2HPO4 buffered at pH=7.1 could be used in the TBAF deprotection. (DiLauro, A. M.; Seo, W.; Phillips, S. T., J. Org. Chem. 2011, 76, 7352-7358) This decreases the risk of hydrolyzing the Barton ester bond and increases the likelihood of obtaining the free phenols in OFAB-3, the Barton ester AbstractionO tip.

Methods of Tip Use

Figure 47:
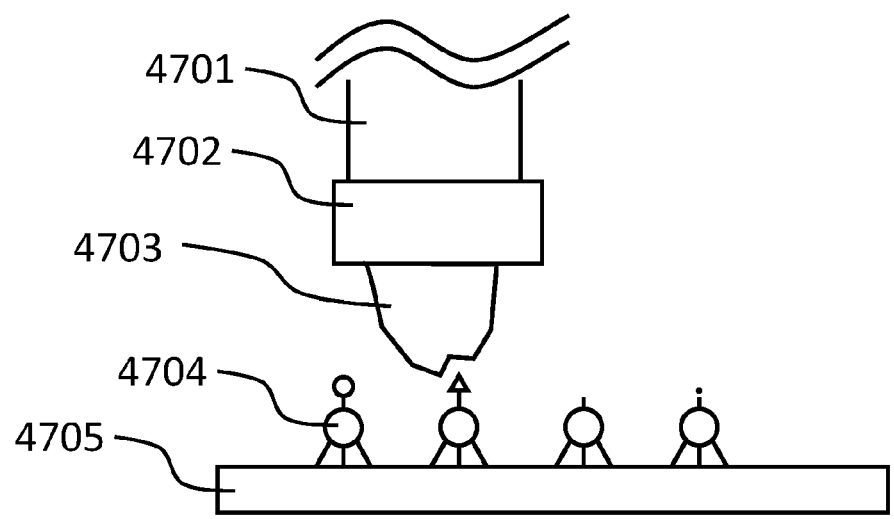
FIG. 47 depicts the use of surface-mounted tips where the workpiece moves.

One of the ways in which surface mounted tips can be used is depicted in FIG. 47. This figure is diagrammatic and not to scale. In FIG. 47, handle 4701 is connected to surface 4702. Surface 4702 is optional, serving to provide the desired materials and chemistry to bind workpiece 4703 in the case where the material of the handle is unsuitable for doing this directly. It may be possible to bind workpiece 4703 directly to handle 4701. Handle 4701 would be connected to a positional means (not shown) for the purposes of moving handle 4701, and thereby workpiece 4703 with respect to tips (of which tip 4704 is representative) mounted on surface 4705.

In the depicted position, workpiece 4703 could be descending upon a tip, or it could be rising from just having been acted upon by a tip. Regardless, the point is that surface 4705 can contain many tips, of many different types, including non-functional tips (which either failed to synthesize correctly or have already been used). Knowledge of tip position, for example, because sectoring was used to place certain tip types in certain locations, or via scanning the surface (before or during a build sequence), allows the workpiece to be moved to a desired tip, at which time a mechanosynthetic reaction occurs, and the workpiece then moves to the next desired tip. This process is repeated until the workpiece is complete.

Figure 48:
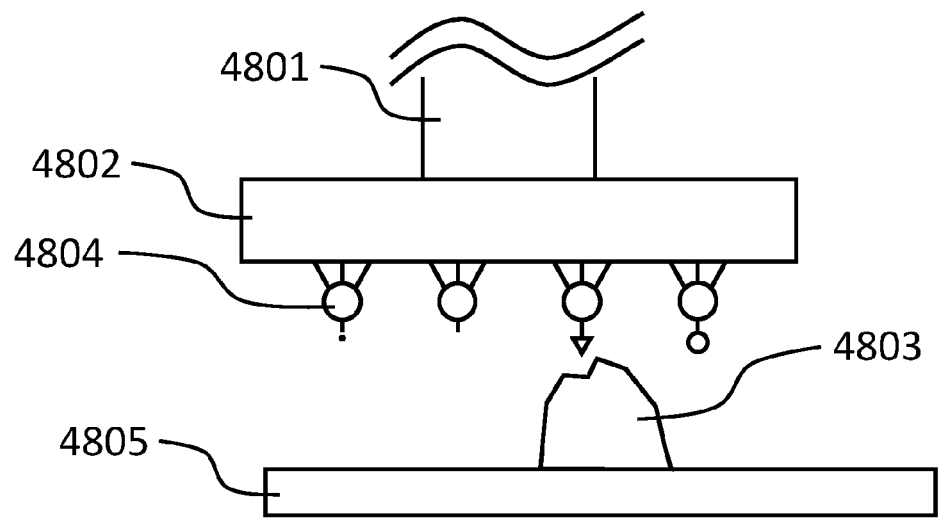
FIG. 48 depicts the use of surface-mounted tips where the surface moves.

Another way to use surface-mounted tips is to create a meta-tip, which is a handle upon which a plurality of tips may be mounted, directly, or via a surface. FIG. 48 depicts this mode of using surface-mounted tips, where handle 4801 is connected to (optional) surface 4802. Handle 4801 is also connected to a positional means (not shown). Tips, of which tip 4804 is representative, are shown mounted on surface 4802, but could be mounted directly to handle 4801. In this scenario, the tips move to act upon workpiece 4803, which resides upon surface 4805.

The main difference between the scenarios of FIG. 47 and FIG. 48 is whether the workpiece moves or the tips move. In actuality, it is possible that both move (e.g., one for course adjustments, one for fine), and the distinction is mainly one of equipment design.

FIG. 48 perhaps provides the clearest illustration of the advantages surface-mounted tips have over previous mechanosynthesis techniques. If surface 4802 only had one tip affixed to it, it would be analogous to the tips commonly used for mechanosynthesis. In this scenario, to create complex workpieces, the affixed tip would have to a) be capable of multiple reactions and b) be regenerated frequently, or, frequent tip swapping employed. Using either the scenario of FIG. 47 or FIG. 48 (and modifications thereof which would be possible given the teachings herein), many tips are available to provide mechanosynthetic reactions, potentially (depending on the number of tips initially available and the number of reactions required to build the workpiece) without tip recharge and without tip swapping. Any reduction in tip recharge or tip swapping can help decrease the average time it takes to perform a reaction.

Number of Available Tips

The total number of available tips could span a very wide range, depending on factors such as the total number of reactions needed to make a workpiece, the number of different types of reactions needed to make a workpiece, the available size of the presentation surface, and the exact methods being used. Also, it is conceptually important to distinguish between the total number of available tips, and the number of different types of tips.

For example, if tip recharge is acceptable, then the number of tips might be limited to only providing one tip for each type of reaction needed by a build sequence. For example, as described herein, one way of building diamond requires four different tips (and row initiation and termination each take only three tips, while row extension requires four). Ignoring feedstock and differences only in legs or linkers, about 7 different types of tips are described herein. Counting feedstock, given the structures in Table 1, in addition to those in, e.g., FIGS. 1-17 and FIG. 51, this number becomes about 20 or more since some tips can use a variety of feedstocks. Given these examples, it will be obvious that the number of types of tips present in a system can include less than 4, 4 to 7, 8 to 20, or more. Note that this says nothing about the number of positional means in a system, since multiple types of tips can be affixed to a single positional means.

Having a single tip of any required type present is useful for avoiding tip swapping, but not as useful for avoiding tip recharge. To avoid tip recharge, ideally each type of tip would be present at least as many times as that tip is used in a build sequence. Given that build sequences can essentially be arbitrarily long, this is one example where it becomes useful to have the total number of tips present be, e.g., 10 to 100 for even quite small workpieces, and between one hundred and a thousand, or between a thousand and a million, or between a million and a billion, or more, for larger workpieces. It can easily be seen by determining the surface area available to an appropriate system, and the size of the average tip, that even while allowing for some wasted space given, for example, imperfect tiling of tips on a presentation surface and the possible presence of some percentage of defective tips, the presentation surface can hold a very large number of tips.

Mechanosynthesis-Adapted Equipment

Typical commercial atomic microscopy systems combine course and fine motion controllers to provide both long range of motion, and atomic resolution. Multi-tip systems are also available (or can be constructed, for example (Eder, Kotakoski et al., "Probing from both sides: reshaping the graphene landscape via face-to-face dual-probe microscopy," Nano Letters. 2013. 13:1934-40)), whereby more than one tip can be employed simultaneously. For example, Omicron's (Scienta Omicron GmbH, Germany) LT Nanoprobe provides a pre-integrated SPM, having 4 probe tips, a course motion controller with a range of 5 mm×5 mm×3 mm, a fine motion controller with a range of 1 um×1 um×0.3 um, and atomic resolution in STM mode. Such equipment suffices for mechanosynthesis work, and given that mechanosynthesis work has been carried out for decades, even what would currently be considered outdated equipment can suffice. However, typical SPM equipment is not optimized for carrying out high-volume mechanosynthetic reactions. Typical SPM work involves analysis rather than manufacture, the point generally being to scan specimens to create an image or collect other data. Scan speed is frequently the limiting factor, and increasing scan speed is an active area of research (Dai, Zhu et al., "High-speed metrological large range AFM," Measurement Science and Technology. 2015. 26:095402).

Scan speed is less important to systems for mechanosynthesis as long as the system can obtain the necessary accuracy without scanning, which is well within the state-of-the-art. Ideally, systems adapted for mechanosynthesis would not need to scan, at least for position determination or refinement. Realistically, some scanning will probably be necessary, including an initial surface scan to map surface topology and tip location and identity, and, if desired, small areas around a reaction site could be scanned after a reaction to verify that the reaction occurred correctly (it should be noted that this may not be necessary given the extremely high reliability of many of the exemplary reactions). Note that such scanning and tip or workpiece characterization capabilities are clearly present in the state-of-the-art; see for example (Giessibl, "Forces and frequency shifts in atomic-resolution dynamic-force microscopy," Physical Review B. American Physical Society. 1997. 56:16010-16015; Perez, Stich et al., "Surface-tip interactions in noncontact atomic-force microscopy on reactive surfaces: Si(111)," PHYSICAL REVIEW B. 1998. 58:10835-10849; Pou, Ghasemi et al., "Structure and stability of semiconductor tip apexes for atomic force microscopy," Nanotechnology. 2009. 20:264015; Yurtsever, Sugimoto et al., "Force mapping on a partially H-covered Si(111)-(7×7) surface: Influence of tip and surface reactivity," Physical Review B. 2013. 87; Hofmann, Pielmeier et al., "Chemical and crystallographic characterization of the tip apex in scanning probe microscopy," Phys Rev Lett. 2014. 112:066101; Hapala, Ondráçek et al., "Simultaneous nc-AFM/STM Measurements with Atomic Resolution," Noncontact Atomic Force Microscopy: Volume 3. Cham, Springer International Publishing. 2015.29-49).

Regardless of the fact that some scanning will likely be used at various points in the mechanosynthetic process, doing away with frequent scanning for position refinement, and instead using metrology that allows the requisite point-to-point accuracy (meaning, moving directly from one tip or workpiece location to another, without using scanning in between to refine position), would considerably speed up the process of mechanosynthesis.

Note that while the ideal attributes for analytical or metrological SPM are different than those for systems for mechanosynthesis, even previous work on mechanosynthesis did not provide systems well-adapted for such work, presumably due to the simple and low-volume nature of the work being performed, for which conventional equipment suffices. For example, many commercial atomic microscopes are open-loop, meaning, they do not use metrology to refine tip position. However, closed-loop systems are also available, can be built, or metrology can be added to an existing open-loop system (e.g., see (Silver, Zou et al., "Atomic-resolution measurements with a new tunable diode laser-based interferometer," Optical Engineering. 2004. 43:79-86)). Closed-loop systems are generally more accurate due to metrology feedback and positional means capable of very high accuracy over large distances are available. For example, piezo elements are often used to position tips very precisely, and using interferometry, angstrom or even picometer-level accuracy has been shown to be possible, even at distances up to 50 mm. (Lawall, "Fabry-Perot metrology for displacements up to 50 mm," J. Opt. Soc. Am. A. OSA. 2005. 22:2786-2798; Durand, Lawall et al., "Fabry-Perot Displacement Interferometry for Next-Generation Calculable Capacitor," Instrumentation and Measurement, IEEE Transactions on. 2011. 60:2673-2677; Durand, Lawall et al., "High-accuracy Fabry-Perot displacement interferometry using fiber lasers," Meas. Sci. Technol. 2011. 22:1-6; Chen, Xu et al., "Laser straightness interferometer system with rotational error compensation and simultaneous measurement of six degrees of freedom error parameters," Optics Express. 2015. 23:22) Further, although this could be unnecessary with high-accuracy closed loop systems, software capable of compensating for positional errors due to hysteresis, creep, and other phenomenon is available; for example see (Mokaberi and Requicha, "Compensation of Scanner Creep and Hysteresis for AFM Nanomanipulation," IEEE Transactions on Automation Science and Engineering. 2008. 5:197-206; Randall, Lyding et al., "Atomic precision lithography on Si," Journal of Vacuum Science & Technology B: Microelectronics and Nanometer Structures. 2009. 27:2764; Follin, Taylor et al., "Three-axis correction of distortion due to positional drift in scanning probe microscopy," Rev Sci Instrum. 2012. 83:083711). Software also exists that essentially uses image recognition for positional refinement; for example see (Lapshin, "Feature-oriented scanning methodology for probe microscopy and nanotechnology," Nanotechnology. 2004. 15:1135-1151; Lapshin, "Automatic drift elimination in probe microscope images based on techniques of counter-scanning and topography feature recognition," Measurement Science and Technology. 2007. 18:907-927; Lapshin, "Feature-Oriented Scanning Probe Microscopy," Encyclopedia of Nanoscience and Nanotechnology. 2011. 14:105-115). Ideally, this would not be necessary since the required scanning would slow down the overall process, but it is available if desired.

Note that 50 mm is far longer than the working distance needed to accommodate a very large number of tips (billions, trillions, or more) and complex workpieces. Distances on the order of microns (or even smaller for small workpieces), thousands of times smaller than the technology has been proven capable of, would suffice for many types of workpieces.

In a metrological system, the tip is generally not exactly at the point being measured (which may be, e.g., a reflective flat when using laser interferometry), such metrology has to be carefully implemented to avoid, e.g., Abbe error which can be induced by slightly non-linear movement of the tip or workpiece with respect to, e.g., the reflective flat. One way to address this issue it to measure not only the X, Y and Z coordinates of the reflective flat, but also to measure (and so be able to account for) any rotation that might be occurring around these axis as well.

Figure 49:
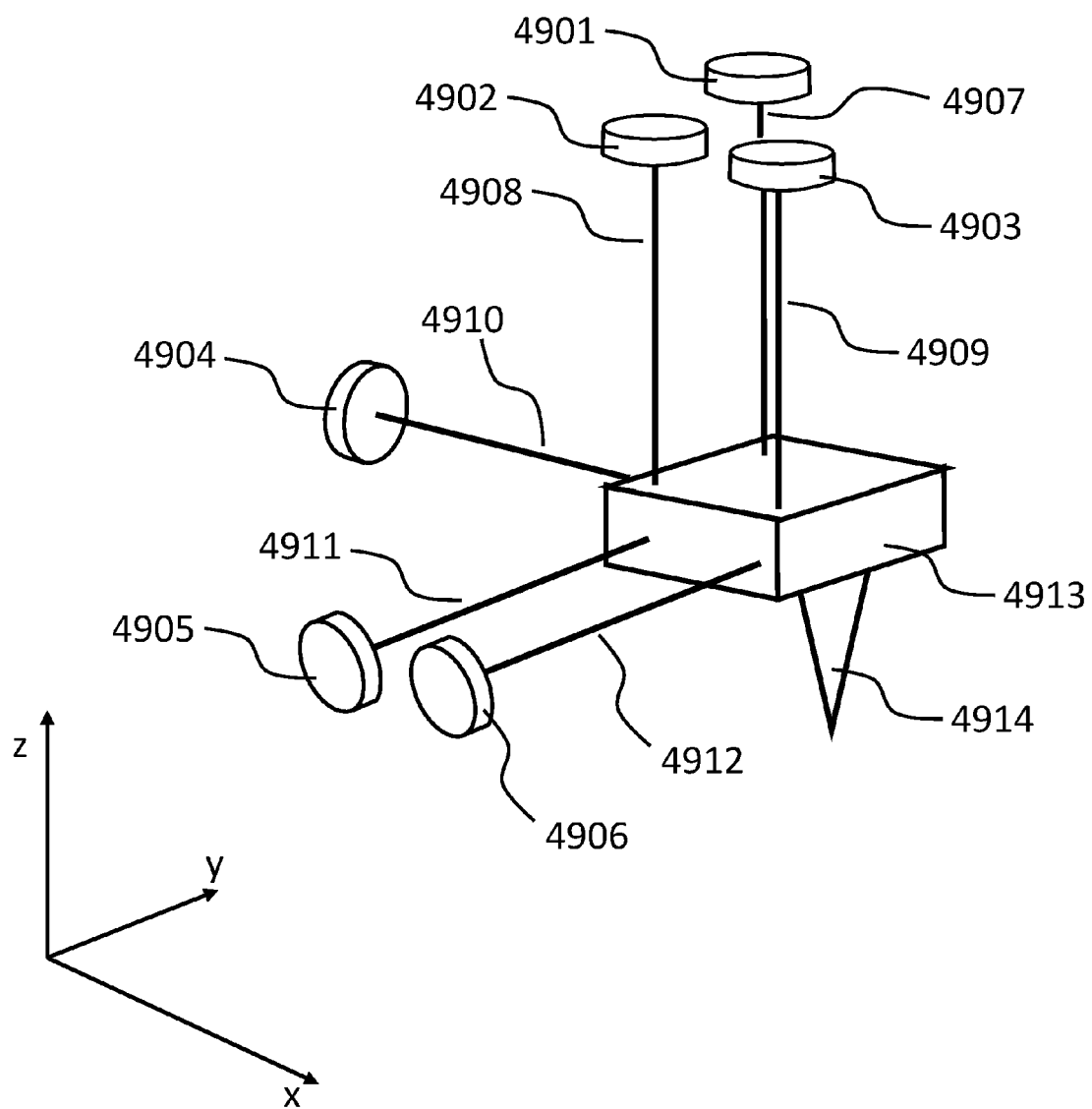
FIG. 49 depicts a metrology setup for measuring six degrees of freedom.

One way to measure both linear and angular position is to use 6 interferometers (e.g., Michelson or Fabry-Perot optical interferometers). FIG. 49 illustrates one way interferometers can be used to measure six degrees of freedom (X, Y, and Z, and rotation about each of those axes).

In FIG. 49, Reflective mirrors 4901-4906 and, and their respective beams, BeamZ1 4907, BeamZ2 4908, BeamZ3 4909, BeamX1 4910, BeamY1 4911 and Beam Y2 4912 can be used together to determine position in all six degrees or freedom. The spacing between various pairs of beams must be known to compute rotations. In this scenario, BeamX1 provides the X position. BeamY1 or BeamY2 provide the Y position. BeamZ1, or BeamZ2, or BeamZ3 provides the Z position. BeamZ1 and BeamZ2, together with the distance between the two beams allows the rotation about the X axis to be calculated. BeamZ2 and BeamZ3, together with the distance between the two beams allows the rotation about the Y axis to be calculated. And, BeamY1 and BeamY2, together with the distance between the two beams allows the rotation about the Z axis to be calculated.

Coupling the ability to provide, ideally, sub-Angstrom linear distance measurement over distances up to the millimeter scale, while also measuring and accounting for angular errors, with, for example, a microscope that operates at 4K (room temperature is feasible but more technically challenging) in ultra-high vacuum, while using, e.g., a qPlus sensor, provides for a system that can access precise locations on large presentation surfaces with a greatly-reduced need to use scanning and image recognition to refine the relative position of tips and workpieces. These adaptations themselves are valuable for mechanosynthesis. Using such equipment with surface-mounted tips and the processes described herein provides systems adapted for mechanosynthesis that can provide much greater reaction throughput than conventional systems.

Other useful adaptations that are somewhat unique to the requirements of mechanosynthesis include reducing tip recharge and reducing tip swapping (which does occur in more conventional uses of SPM equipment, but normally because a tip has been damaged, not because many tips of different chemical natures are required). Surface mounted tips have been discussed herein as one way to reduce the need for tip recharge and tip swapping.

Sequential Tip Method

Surface-mounted tips and inverted mode offer important improvements over conventional mode. However, inverted mode, because the workpiece is being built on the handle (e.g., an SPM probe), does have some drawbacks. For example, if the workpiece is not conductive, some modes such as STM may not be possible. Also, the geometry of the workpiece can pose a problem. For example, if a workpiece has a sizeable flat surface adjacent to the site of the next reaction, as the reaction site on the workpiece approaches the surface-mounted tips, other portions of the workpiece will also be approaching other surface-mounted tips, potentially causing undesired reactions. Ideally, one would like to combine the benefits of both inverted mode and conventional mode, keeping the high aspect ratio, versatile mode capabilities and other desirable characteristics of conventional mode, without sacrificing the important improvements that inverted mode with surface mounted tips offers, such as the reduction or elimination of tip swapping due to the availability of large numbers of any type of tips required for a given build sequence, and the elimination of feedstock provisioning and trash depots as separate entities from surface-mounted tips.

Obtaining the benefits of both inverted mode with surface-mounted tips and conventional mode is possible if the tip thermodynamics are engineered to allow an additional tip-to-tip feedstock transfer, resulting in what we refer to as a "thermodynamic cascade." Rather than a surface-mounted tip interacting directly with the workpiece, the sequential tip method consists of a surface-mounted tip interacting with a conventional mode tip. The conventional mode tip interacts with the workpiece. The surface mounted tips thus serve as what can be conceptualized as a surface with tunable affinity. Since the surface mounted tips can be engineered to have any desired affinity for their feedstock, they can present or accept a much wider range of feedstocks to the conventional tip than would be possible if the feedstock was attached directly to the presentation surface. Note that the workpiece is preferably located on the presentation surface along with the surface mounted tips, although this is not always true, as is explained herein.

Figure 50A:
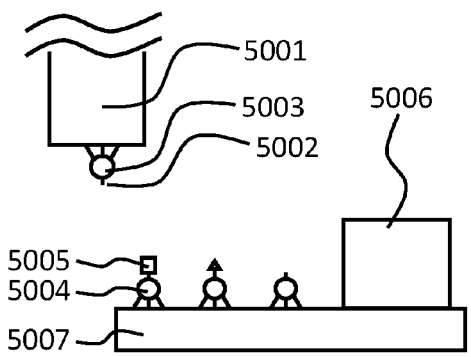
FIG. 50a-f depicts a way of implementing the sequential tip method.
Figure 50B:
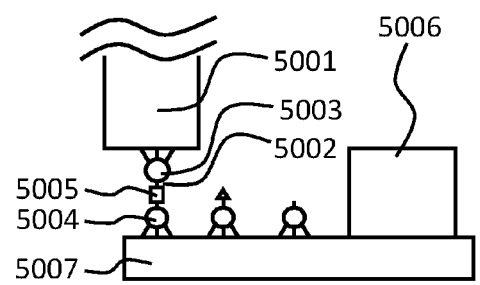
Figure 50C:
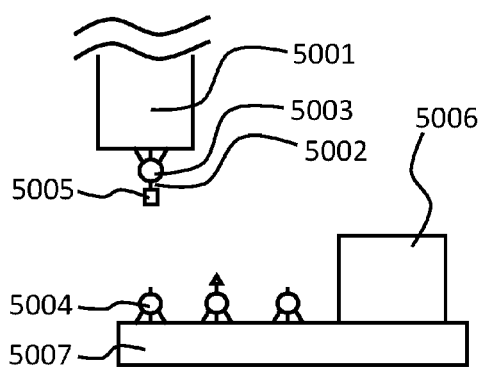
Figure 50D:
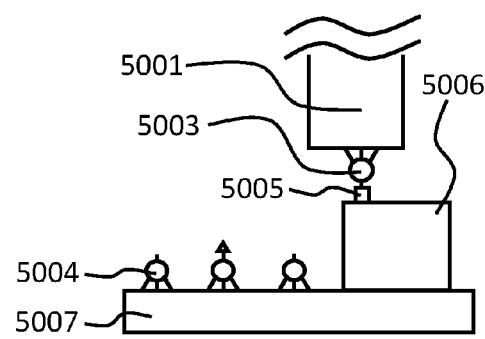
Figure 50E:
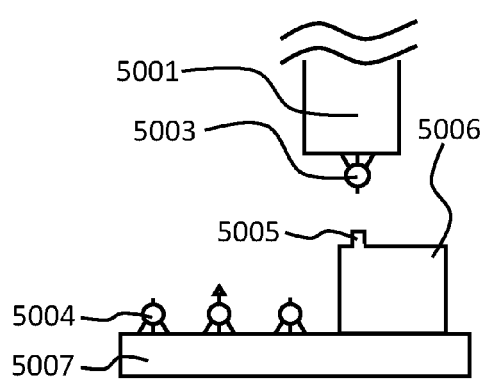
Figure 50F:
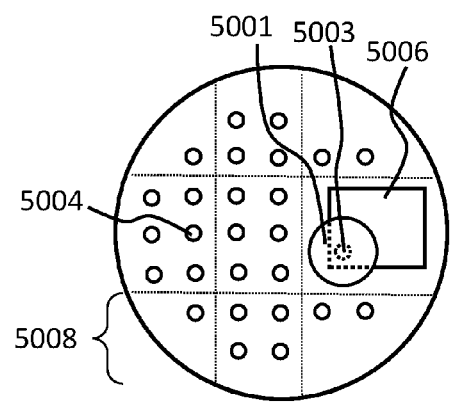

FIG. 50a-f shows one way of implementing the sequential tip method, with sub-FIGS. 50a-e depicting sequential states of the same system and FIG. 50f showing an overhead view.

FIG. 50a, which we arbitrarily use as a starting state, shows handle 5001 (which would be connected to positional control means, not shown) with a tip 5003 (a conventional mode tip) bound to its apex. Tip 5003 has an active site 5002, which in this case, is empty and awaiting feedstock. A presentation surface 5007 holds tips, of which tip 5004 (an inverted mode tip) is exemplary, and a workpiece 5006. The tip 5004 includes feedstock 5005.

In FIG. 50b, handle 5001 and tip 5003 have been positioned so that active site 5002 binds to feedstock 5005. In other words, a mechanosynthetic reaction occurs between tip 5003 and feedstock 5005. At this point, feedstock 5005 is bound to both tip 5003 and tip 5004.

In FIG. 50c, handle 5001, and thus tip 5003, have been pulled away from tip 5004, and feedstock 5005 has transferred to tip 5003. This transfer occurs upon pulling the two tips away from each other because tip 5003 has been engineered to have greater affinity for feedstock 5005 than tip 5004.

In FIG. 50d, handle 5001 brings tip 5003 and its feedstock 5005 to a specific location on workpiece 5006, facilitating a mechanosynthetic reaction between feedstock 5005 and workpiece 5006. At this point feedstock 5005 is bound to both tip 5003 and workpiece 5006.

In FIG. 50e, handle 5001 and tip 5003 have been pulled away from workpiece 5006, leaving feedstock 5005 bound to workpiece 5006. Like the previous tip-to-tip transfer between tip 5004 and tip 5003, feedstock 5005 remains bound to workpiece 5006, instead of pulling away with tip 5003, because tip 5003 has been engineered to have lower affinity for feedstock 5005 than does the chosen specific location on workpiece 5006.

FIG. 50f depicts a top view of the system shown in side views in FIG. 50a-e. Workpiece 5006 is shown partially under handle 5001 (dotted lines representing the hidden borders of the workpiece) and tip 5003 (denoted with dotted lines as it is under handle 5001). Tip 5004 is representative of many surface-mounted tips arrayed in sectors set off by a grid of dotted lines, such as exemplary sector 5008. Of course, this is not to scale, nor necessarily the actual arrangement that would be used. The workpiece could be next to the surface-mounted tips, in the middle of the surface-mounted tips, or at any other convenient location, even on a different presentation surface. The sectors could be rectangular, concentric, shaped like pie wedges, or any other convenient shape, or sectors could not exist at all, with tips of different types being intermingled.

The addition of the tip-to-tip transfer step may complicate the system design from a chemical perspective, but overall creates a more efficient and versatile system. The increased chemical complexity stems from the fact that to carry out the sequential tip method, assuming a donation reaction, the affinity of the surface-mounted tip for the feedstock must be less than the affinity of the conventional tip for the feedstock (a requirement that does not exist in conventional or inverted mode, since no tip-to-tip transfer takes place), and the affinity of the conventional tip for the feedstock must be less than the affinity of the workpiece for the feedstock.

The chemistry is further complicated by the desire to have a single conventional tip be able to receive many different feedstocks from surface-mounted tips, and be able to donate those feedstocks to various specific locations on a workpiece, which may vary in their chemical nature, and therefore in their affinity for feedstock. Note that while these reactions are generally described in terms of a tip donating feedstock to a workpiece, the same principles apply to abstraction reactions, although the thermodynamics and sequence of events need to be changed as appropriate.

Subsequently, we describe how to design and build tips, both surface mounted and conventional, that meet the necessary thermodynamic requirements. We also provide a work-around for situations where it is not possible or desirable for one conventional tip to carry out all the reactions of a given build sequence.

Note that, while the sequential tip method is generally described as involving two tips and therefore a single tip-to-tip transfer for a given reaction on a workpiece, if desired, there is no reason the sequential tip method could not be performed with more than two tips as long as the tip affinities are appropriately designed.

Tip Design for the Sequential Tip Method

Two types of tips are used in the sequential tip method: surface-mounted tips and conventional tips. Herein we describe a set of tips that can be used as surface-mounted tips and allow the transfer of a wide variety of feedstock (including atoms abstracted from a workpiece, such as with the AbstractionO, AbstractionNH and AbstractionS tips). Using these surface-mounted tips as examples, we now turn to the design of a conventional tip which has an affinity for many of the various feedstocks which is between that of the surface-mounted tips and that of an exemplary diamond workpiece.

Note that in mechanosynthetic reactions it is not necessarily the energy levels of the products and reactants that specify their relative affinities. Bond stiffness is also a factor. Consider the hypothetical reaction Tip-F+Workpiece-→Tip-+F-Workpiece. It is possible that the reactants have lower energy than the products. However, the mechanosynthetic reaction can still be successful if the F-Workpiece bond is stiffer than the Tip-F bond. In such a case, as the tip is retracted from the workpiece, the Tip-F bond gradually stretches and then breaks, unable to overcome the stiffness of the F-Workpiece bond, even though the overall energy of the Tip-F bond may be greater. This is not merely hypothetical; some of the reactions of which the exemplary tips are capable work in this manner. Given this, affinity is not defined by bond energy. Rather, we use the practical definition that when two structures (e.g., two tips, or a tip and a surface, or a tip and a workpiece, or a workpiece and a surface) are brought together to potentially transfer feedstock in a mechanosynthetic reaction, the structure to which the feedstock is bound after the two structures are separated has the higher affinity for that feedstock.

Figure 51:
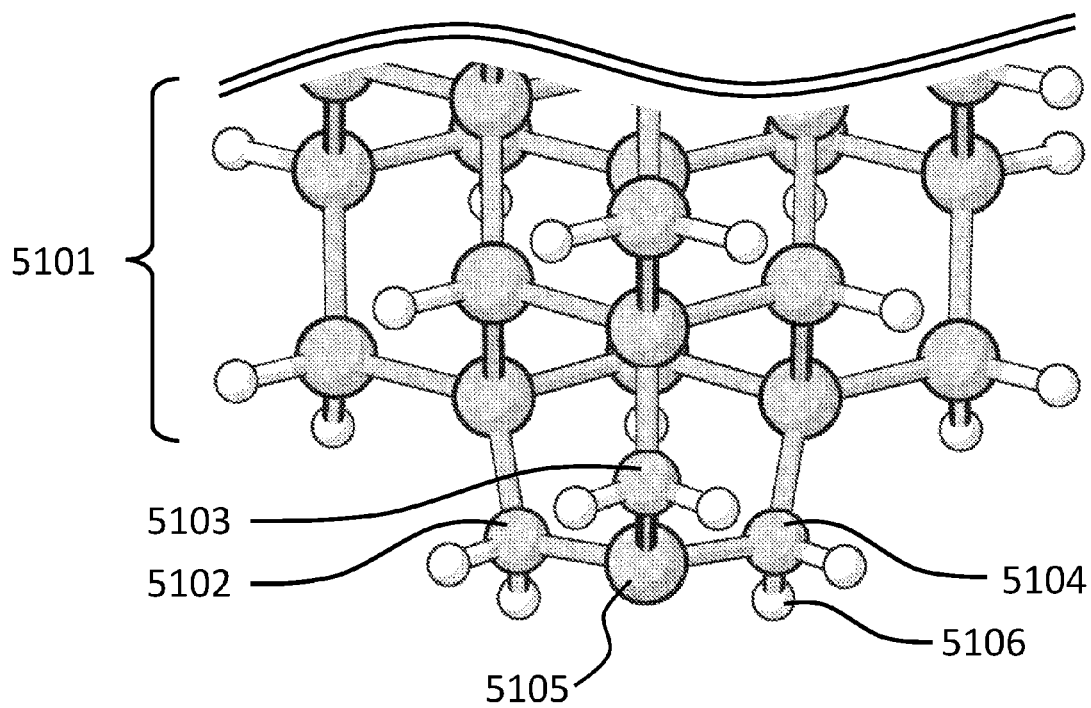
FIG. 51 depicts a conventional mode tip that can be used for the sequential tip method.

FIG. 51 depicts one possible structure of a conventional tip for use in the sequential tip method. The tip is built on surface 5101 (which would be connected to a positional means, not shown) and comprises support atoms 5102, 5103 and 5104, and active atom 5105. In this state, active atom 5105 is a radical, ready to e.g., bind feedstock from surface-mounted tips, or abstract one or more atoms from a workpiece. Passivating atom 5106 is used to satisfy unused valences, and is representative of many such atoms bonded to the tip and surface.

In one embodiment, surface 5101 is silicon, support atoms 5102, 5103 and 5104 are carbon, and active atom 5105 is silicon. For building diamond-based structures, this embodiment has an affinity which is conveniently between that of the described surface-mounted tips and the workpiece for multiple different feedstocks and reactions. In one embodiment passivating atom 5106 and other passivating atoms could be any atom of appropriate chemical nature such as hydrogen or fluorine.

We refer to the embodiment where the active atom is silicon, connected to three support atoms which are carbon, as half-Si-Rad (because it is a partial or "half" adamantane structure with an apical silicon radical in its basic form). With various feedstock attached, the tip can take forms which include half-Si-Rad-CC (a carbon dimer bound to the active atom, and a radical itself, which for some reactions actually makes the apical carbon of the carbon dimer the active atom as it can be used to abstract other atoms from tips or workpieces), half-Si-Rad-H (a hydrogen bound to the active atom), and half-Si-Rad-CH2 (CH2 bound to the active atom), among others.

Exemplary reactions that various versions of the half-Si-Rad tip can carry out include: H Abstraction from C(111) to half-Si-Rad-CC, H Donation to from half-Si-Rad-H to C(111)-Radical, H Abstraction from C(111)-CH3 to half-Si-Rad-CC, H Donation from half-Si-Rad-H to C(111)-CH2, CH2 Donation from half-Si-Rad-CH2 to C(111)-Radical, CH2 Donation from half-Si-Rad to C(111)-CH2 and C2 Dimer Donation from half-Si-Rad-CC to C(111)-Radical.

While half-Si-Rad can carry out many useful reactions, it is not capable of carrying out all reactions, particularly when different classes of workpieces are considered. For example, silicon bonds tend to be weaker than carbon bonds, and germanium bonds tend to be weaker still. Given this, for Si- or Ge-based workpieces, the half-Si-Rad tip will often have an affinity for feedstock that is higher than the affinity of the workpiece for the feedstock. This means that it could not donate the feedstock to the workpiece. A systematic method of adjusting tip affinity would be useful to assist in the rational design of tips with different feedstock affinities. There are two main ways of adjusting tip affinity without departing from the basic bonding structure of the tip depicted in FIG. 51.

First, active atom 5105 can be substituted with an atom of different affinity. For example, to increase the affinity of the active atom for feedstock, carbon could be substituted for silicon, and to reduce the affinity of the active atom for feedstock, in order of descending affinity, germanium, tin, or lead could be used (although it should be recognized that this is a rule of thumb and will not be accurate for all tip-feedstock combinations; those familiar with the relevant arts will understand more nuanced ways of predicting affinity).

Second, one or more of the support atoms 5102, 5103 and 5104 can be substituted with different atoms which can affect the affinity of active atom 5105. For example, the embodiment described above where the support atoms are each carbon is, for most diamond-based reactions, superior to an all-silicon tip because the affinity of the all-silicon tip is lower than desired. The carbon atoms strengthen the bond between the active atom and the feedstock. Our computational studies indicate that active atom affinity for feedstock, in general, is affected by the support atoms in the following manner: O>N>C>S>P>Si. Meaning, using oxygen as a support atom results in the highest affinity of the active atom for the feedstock, while using silicon results in the lowest affinity of the active atom for the feedstock, although like the affinity comments above, this is a rule of thumb. Regardless, this hierarchy provides a useful starting point for the design of new tips. Obviously, tips with different basic structures, but with the desired feedstock affinity, could also be designed given the examples and teachings herein.

The ability to rationally design new conventional tips raises the issue of how these tips can be synthesized and bound to the positional means. While we could design and affix conventional tips in a manner like that described for surface-mounted tips, this would likely mean that multiple handles, each with a different tip, would be needed. Assuming a single positional means, this implies that tip swapping would be required. Tip swapping is, as described herein, preferably avoided. Using equipment with multiple positional means is one way to overcome this problem. For example, systems with two to four positional means exist, and if each positional means was affixed to a tip of different affinity, the overall set of tips would allow a greater diversity of reactions than a single tip. However, multiple positional means complicates equipment design and increases cost. A method to avoid tip swapping even with only a single positional means may be preferable.

In Situ Tip Synthesis

Tip swapping can be avoided if conventional tips are disassembled and reassembled (in modified form, as appropriate) on the same surface (e.g., a presentation surface connected to a handle) as needed. For example, if the half-Si-Rad tip described above was the initial tip bound to a handle, a build sequence could be carried out up until the point when a tip of different affinity was needed. At that point, the conventional tip (half-Si-Rad in this example) essentially becomes a workpiece, with the system temporarily operating in inverted mode rather than sequential mode.

By this, it is meant that the surface-mounted tips act upon the conventional tip, modifying it as desired. The surface mounted tip can be used to remove any (or all, creating a completely new structure) of the atoms in the conventional tip. The surface-mounted tips then provide the new atoms to manufacture a tip that can complete the next part of the build sequence. This process can be repeated as many times as necessary to complete a build sequence, although preferably the need to change the conventional tip would be minimized to streamline the manufacturing process. This suggests a refinement to the process of creating a build sequence where build sequences are ordered, at least in part, in a manner that minimizes the need to rebuild the conventional tips.

Figure 52A:
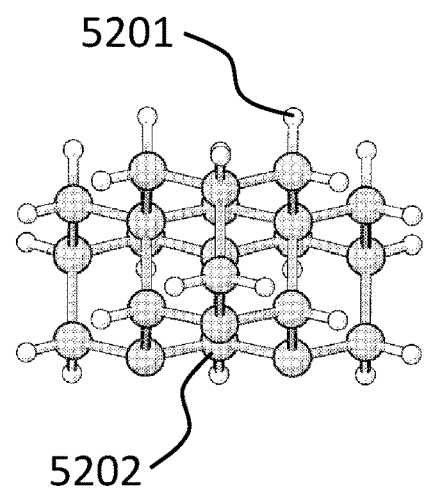
FIG. 52a-o depicts a build sequence for building a half-Si-Rad tip.
Figure 52B:
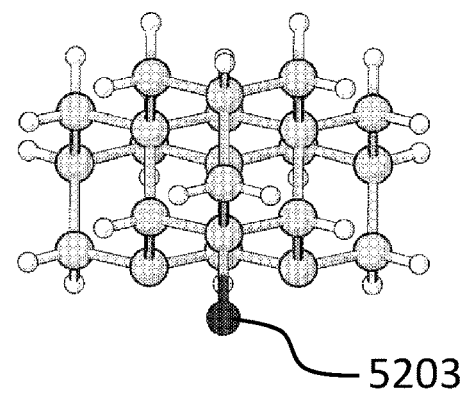
Figure 52C:
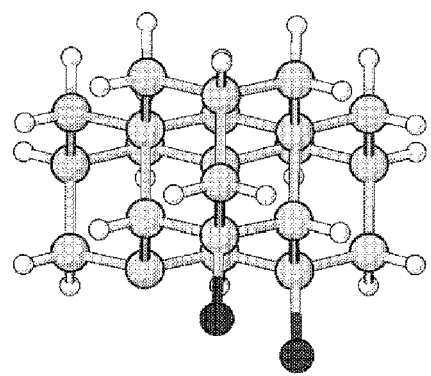
Figure 52D:
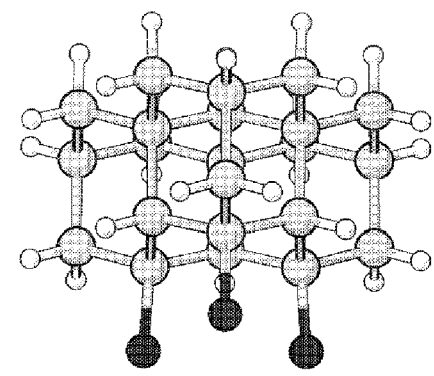
Figure 52E:
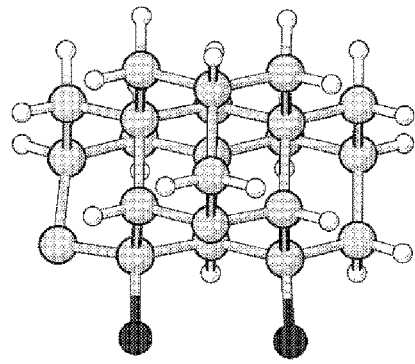
Figure 52F:
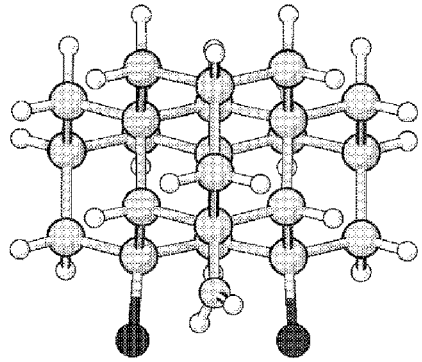
Figure 52G:
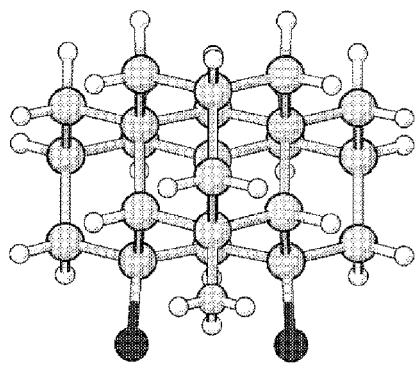
Figure 52H:
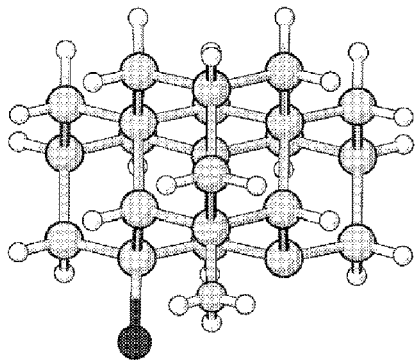
Figure 52I:
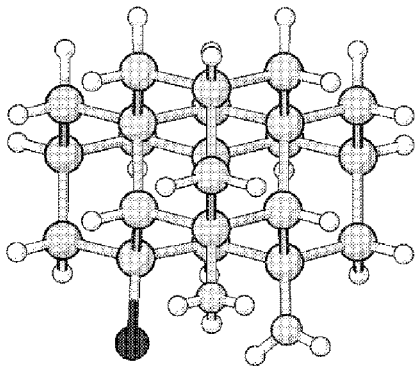
Figure 52J:
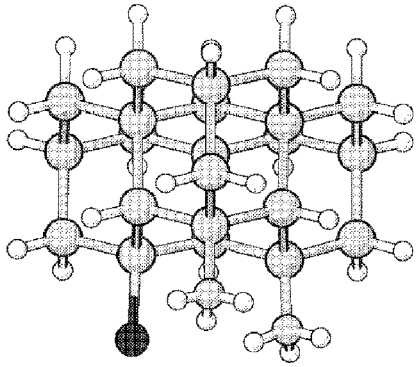
Figure 52K:
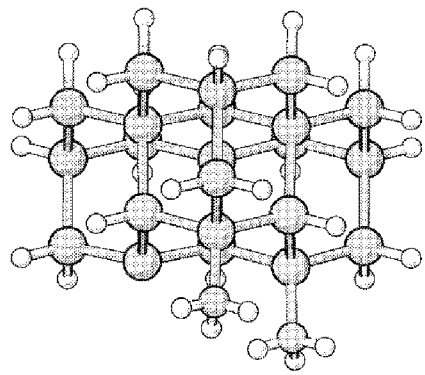
Figure 52L:
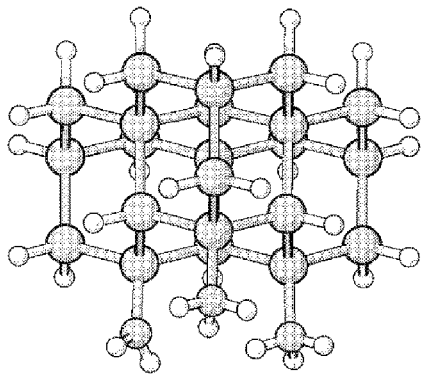
Figure 52M:
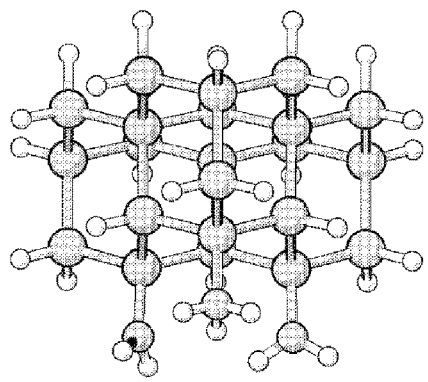
Figure 52N:
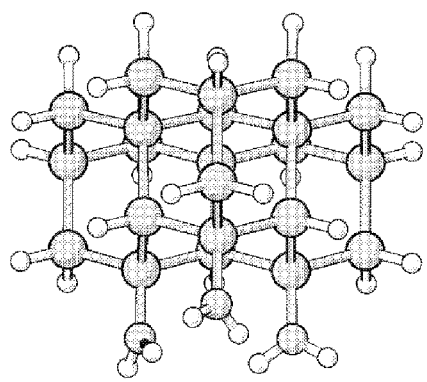
Figure 52O:
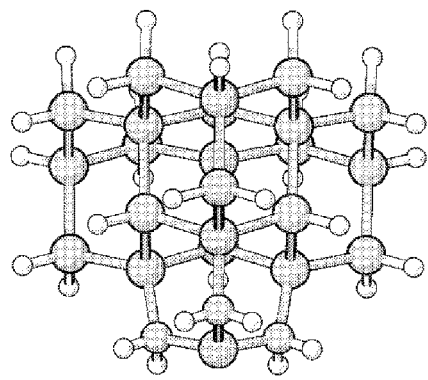

As an example of in situ tip synthesis, FIGS. 52*a-o* depict a build sequence which creates the half-Si-Rad tip starting from a depassivated silicon surface. Depassivated silicon surfaces are well-known in the relevant fields, and can be created via bulk chemical methods or heating. Also, a patch of depassivated silicon atoms could be created using mechanosynthesis. For example, starting with a conventional passivated silicon probe, three hydrogens could be removed from a small flat area on the apical end via the abstraction tips described herein.

In FIG. 52*a*, an exemplary silicon structure is depicted as a stand-alone structure terminated with passivating hydrogens, of which hydrogen atom 5201 is representative, except on its lower face, which is depassivated. In reality, the structure depicted would be part of a larger structure (which may itself be connected to larger structures such as a handle and positioning means), but only the small area needed for a presentation surface is shown for clarity. Three depassivated silicon atoms are present, of which silicon atom 5202 is representative. This silicon structure, with its small patch of depassivated silicon atoms, serves as the starting point for building the half-Si-rad tip.

In FIG. 52*b*, a bromine atom is donated to one of the depassivated silicon atoms. This can be accomplished with a tip comprising an adamantane body with a carbon radical active site, to which a bromine atom has been bound. We will refer to this tip as AdamRad-Br.

In FIG. 52*c*, another bromine atom has been added to one of the other depassivated silicon atoms, also using an AdamRad-Br.

In FIG. 52*d*, the third and final bromine is added to the last unpassivated silicon atom, again using AdamRad-Br.

Note that the three bromine atoms which were added in the first three steps of this sequence will end up being removed. This raises the question of why the bromine atoms were added in the first place. The reason is that it is preferable to satisfy the valences of the depassivated silicon atoms at certain points in the sequence to prevent unwanted rearrangements (a useful technique in many build sequences). The question might also be raised as to why the sequence does not just start from a hydrogenated silicon surface, since on that surface there are no unused valences to lead to potential reactivity problems. The issue is one of chemical convenience. Hydrogen, and in general, passivating atoms other than bromine, could be made to work. However, using the particular tips we have chosen for this sequence, bromine is found to more reliably facilitate the desired reactions than other atoms that were investigated.

In FIG. 52*e*, the structure shows that one of the bromine atoms has been removed. This is accomplished using a GeRad tip.

In FIG. 52*f*, a CH2 group has been added to the radical silicon that was created by the bromine removal in the previous step. This CH2 donation reaction is accomplished using a tip like MeDonationO or its variants, described herein.

In FIG. 52*g*, a hydrogen atom is added to the CH2 radical that was added in the previous step. This is accomplished using HDonation (whether it is HDonationNH, HDonationO, or HDonationS not being relevant to the reaction).

In FIG. 52*h*, one of the remaining bromine atoms is removed, using GeRad.

In FIG. 52*i*, a methyl group is donated to the silicon radical that was created by the bromine abstraction in the previous step. The methyl donation reaction is accomplished using MeDonation (again, the specific variant not being relevant).

In FIG. 52*j*, the methyl group donated by the MeDonation tool in the previous step is given a hydrogen atom, using an HDonation tip.

In FIG. 52*k*, the sole remaining bromine is removed from the structure, using GeRad.

In FIG. 52*l*, a methyl group is donated to the silicon radical that was created by the bromine abstraction in the previous step. The methyl donation reaction is accomplished using an MeDonation tip. Note that unlike the previous methyl groups, this methyl group does not have its open valence satisfied via a hydrogen donation reaction.

In FIG. 52*m*, one of the previously-created CH3 groups has a hydrogen abstracted from it, via an Abstraction tip, resulting in a surface that has two CH2 groups and one CH3 group.

In FIG. 52*n*, the remaining previously-created CH3 group has a hydrogen abstracted from it, via an Abstraction tip, resulting in three CH2 groups on the surface of the structure.

In FIG. 52*o*, a silicon atom is bound to all three CH2 groups. The silicon atom is donated from an already-described tip loaded with a different payload. Specifically, the Abstraction tip can have a silicon atom bound to its radical active site, and will then donate that silicon atom to the structure. The Abstraction tip can be charged with a silicon feedstock atom by abstracting a Si atom from anywhere else on the conventional tip which is not crucial to the build sequence. The resulting structure is the half-Si-rad tip, which will be obvious when realizing that the structure shown in FIG. 52*o*, although differing in how termination is depicted at the top of the diagram, is essentially the structure from FIG. 51.

Figure 53:
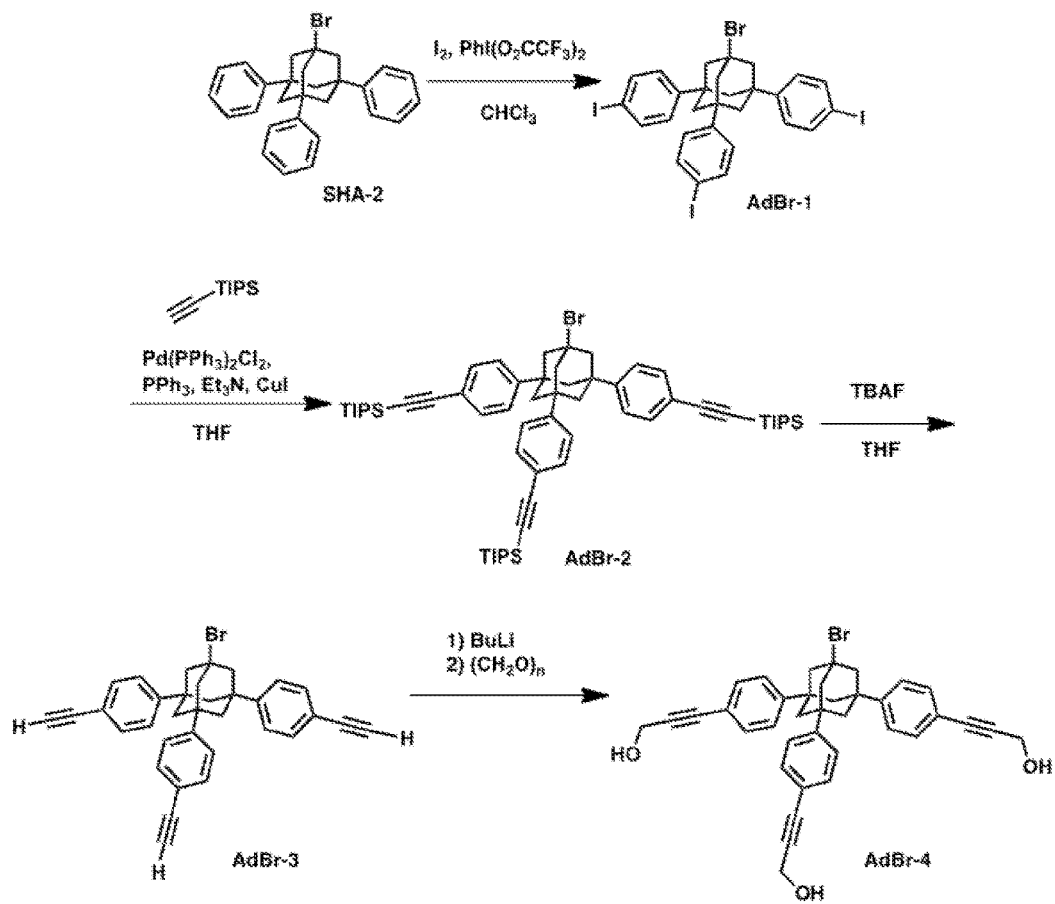
FIG. 53 depicts a synthetic pathway for synthesizing an AdamRad-Br tip.

The build sequence for the half-Si-Rad as described requires the AdamRad-Br tip. This is an adamantane radical with a bromine feedstock. The synthesis for this tip is depicted in FIG. 53. The synthesis starts with chemical SHA-2, previously described in FIG. 34 and the respective synthesis. SHA-2 can be iodinated at the 4-position of the aromatic rings using I2 and [bis(trifluoroacetoxy)iodo]benzene in CHC13 to yield AdBr-1. Sonogashira coupling conditions of AdBr-1 with triisopropylsilylacetylene (TIPS acetylene) produces the protected alkyne AdBr-2. Deprotection of the TIPS group proceeds with TBAF in THF to make the terminal acetylene AdBr-3. The terminal acetylene is deprotonated with n-butyllithium at low temperature and paraformaldehyde is added to produce the tripropargylic alcohol AdBr-4, also called AdamRad-Br. Note that this version of AdamRad-Br depicts a new leg structure, phenylpropargyl alcohol, which has been found to be useful in conjunction with adamantane-based bodies and silicon surfaces and could be coupled with any of the other tips described herein.

Note that it is possible to perform a modified version of the half-Si-Rad build sequence without using AdamRad-Br at all. The only purpose AdamRad-Br serves in the build sequence is to brominate a depassivated silicon surface. If the silicon surface is bulk passivated with bromine, rather than the more common hydrogen, the build sequence can start from a structure equivalent to that of FIG. 52d, eliminating all the bromine donation reactions. Techniques for bulk bromination (and halogenation in general) of silicon are known in the literature, e.g., see (He, Patitsas et al., "Covalent bonding of thiophenes to Si(111) by a halogenation/ thienylation route," Chemical Physics Letters. 1998. 286: 508-514; Eves and Lopinski, "Formation and reactivity of high quality halogen terminated Si (111) surfaces," Surface Science. 2005. 579:89-96).

While the example given describes building a conventional tip using surface-mounted tips, this need not be the only such process. For example, conventional tips could build surface-mounted tips, using either feedstock from other surface-mounted tips, or feedstock provisioned directly off presentation surfaces. This could be useful if, for example, there were one or more surface-mounted tips that were only needed in small quantity and so it is more efficient to build them mechanosynthetically rather than via bulk chemistry.

Additional Tip Design Guidelines and Examples

Herein we have described many different tips, and how a modular tip design can facilitate the creation of new tips. Some other comments on tip structure and design criteria may further facilitate new tip and reaction design.

First, the use of a rigid tip geometry can be helpful so that the bonds between the apical atom and the other tip atoms do not deform excessively or break as a feedstock atom is transferred. However, where there is a small or non-existent reaction barrier, this requirement may be relaxed. For various reasons (e.g., ease of synthesis, tip size, tip aspect ratio) a rigid tip may not be desired, and relaxing the requirement expands the possible design space. For example, if a given feedstock-workpiece reaction requires no physical force (meaning, the reaction will simply occur if the feedstock is brought into proximity of the desired site on the workpiece) to surmount a reaction barrier, there may be no need for a design with three or more legs. One or two legs may work fine.

The tip shape preferably allows the tip to approach a workpiece and perform the desired reaction without steric hindrance, leading to the observation that higher aspect ratios can be advantageous (although steric considerations can also be addressed through reaction order, for example, by avoiding the need for high aspect ratios). Further, tip geometry could also be exploited to hold feedstock at a particular angle. For example, equipment limitations may dictate that, e.g., an SPM probe, must be kept perpendicular to the work surface. But, there may be reactions where a perpendicular alignment of the feedstock with the workpiece is not a desirable trajectory. In that case, it is possible to design a tip that holds the feedstock at e.g., 45 degrees (or any other angle desired) to the rest of the tip or handle.

With regards to a rigid tip geometry, a tetrahedral structure with respect to the apical atom can be useful as, with a feedstock atom bound to one leg of the tetrahedron, the other three bonds serve to stabilize the apical atom when force is applied during a reaction. However, other geometries are possible. For example, in addition to VSEPR AX4 (tetrahedral, or other variations of AX4), AX5 and higher hybridizations can also provide the necessary free electrons to bond a feedstock atom while having the ability to form at least three other bonds to create a rigid tip structure. However, the primary concern is simply whether or not a given tip will reliably perform the intended reaction, and certainly working tips can deviate from these suggestions.

To facilitate the design of new tips and reactions by example, and to provide a library of known tips and reactions (which may in themselves constitute a set of tips and reactions sufficient for some build sequences, and the availability of a set of pre-vetted reactions certainly speeds up the build sequence design process), below we provide a table of various donating structures (e.g., tips), receiving structures (e.g., workpieces, although in the examples the receiving structures are also tip-sized to facilitate computational analysis) and reactions which can be facilitated between the two. These structures and reactions have been vetted using multiple computational chemistry algorithms and approaches, including B3LYP/6-311G(d,p) using the Gaussian09 software package with default DFT grid size and convergence criteria. Other computational chemistry algorithms and basis sets can also be employed, as can multiscale methods such as ONIOM.

Computational means (hardware) were generally individual or clustered Intel CPU-based, multi-core servers, having between 8 and 256 GB RAM, solid state hard drives, and network interconnects as appropriate. This hardware is only exemplary. Other computational means can be used (as could other software). For example, processors may be CPU-, GPU-, ASIC-based, or other. Memory means or data storage means, both volatile and non-volatile, could also take many forms including various flavors of RAM, hard drives, or Flash, among others.

The data provided include net energy changes and reaction barriers, and the feedstock transferred includes Al, B, Be, Br, C, Cl, F, Ge, H, Ir, Li, Mg, N, Na, O, P, S, and Si. While many examples are provided, they are indeed only examples. These are certainly not the only structures and reactions that would be possible given the teachings presented herein.

With respect to the reactions in Table 1, the tip always approached the workpiece coaxially. "Coaxial" means that the bond that is being broken (e.g., the tip-feedstock bond) and the bond being formed (e.g., the feedstock-workpiece bond) lie on the same line. The coaxial trajectory has been found to be reliably facilitate most reactions we have studied. This fact, along with the extensive data provided, should enable the facile design of a vast number of related reactions. Also, (Tarasov, Akberova et al., "Optimal Tooltip Trajectories in a Hydrogen Abstraction Tool Recharge Reaction Sequence for Positionally Controlled Diamond Mechanosynthesis," J. Comput. Theor. Nanosci., 2, 2010) teaches a process that may be used to determine other trajectories, and we incorporate by reference this material.

In the table below, "Tip" is the donating structure, "FS" (feedstock) is the atom being transferred, "Workpiece" is the structure to which the feedstock is transferred, "Delta (eV)"

indicates the change in energy for the reaction, and "Barrier (eV)" indicates the reaction barrier.

"300K" is the probability of reaction failure at 300 Kelvin (room temperature), while "77K" is the probability at 77 Kelvin (liquid nitrogen temperature). Scientific notation is used due to the very small numbers. These calculations were performed using the formulas disclosed in Code Listing 1. 300K and 77K are representative temperatures only. Any temperature at which the reactions are reliable enough for a given purpose could be used, and another common temperature, 4K, is easily-accessible with liquid helium and would show much higher reliability figures. Also, it is noteworthy that most of the reactions listed would have over 99.99% reliability even at room temperature.

With respect to the structures, C9H14[Al,B,N,P] have the apical atom, to which the feedstock atom is attached, at the sidewall position of an adamantane frame. C9H15[C,Si,Ge] have the apical atom, to which the feedstock atom is attached, at the bridgehead position of an adamantane frame. The notation for the workpieces are the same, except that the apical atoms are listed first. For example, the reaction where a C914Al tip using a Be feedstock atom donates the feedstock atom to CC9H15 could be expressed as:

AdamantaneSidewall-Al—Be.+.C-AdamantaneBridgeHead→AdamantaneSidewall-Al.+.Be—C-AdamantaneBridgeHead

TABLE 1

Element Transfers with Energy Calculations and Reliabilities at Various Temperatures

| Tip | FS | Workpiece | Delta (eV) | Barrier (eV) | 77 K | 300 K |
|---|---|---|---|---|---|---|
| C9H14Al | Al | CC9H15 | −0.64 | 0.02 | 1.15E−42 | 1.72E−11 |
| C9H14Al | B | NC9H14 | −3.40 | 0.00 | 1.18E−222 | 1.09E−57 |
| C9H14Al | Be | CC9H15 | −1.46 | 0.00 | 2.39E−96 | 2.87E−25 |
| C9H14Al | Be | NC9H14 | −2.71 | 0.00 | 1.14E−177 | 3.84E−46 |
| C9H14Al | H | BC9H14 | −1.05 | 0.15 | 4.94E−69 | 2.94E−18 |
| C9H14Al | H | CC9H15 | −0.90 | 0.22 | 1.77E−59 | 8.32E−16 |
| C9H14Al | H | SiC9H15 | −0.49 | 0.23 | 1.06E−32 | 6.21E−09 |
| C9H14Al | Li | NC9H14 | −0.76 | 0.00 | 1.30E−50 | 1.57E−13 |
| C9H14Al | Mg | BC9H14 | −0.22 | 0.00 | 2.48E−15 | 1.78E−04 |
| C9H14Al | Mg | NC9H14 | −0.61 | 0.00 | 1.53E−40 | 6.04E−11 |
| C9H14Al | N | BC9H14 | −1.73 | 0.04 | 6.14E−114 | 8.75E−30 |
| C9H14Al | P | BC9H14 | −0.75 | 0.14 | 1.47E−49 | 2.93E−13 |
| C9H14Al | P | NC9H14 | −0.42 | 0.00 | 4.85E−28 | 9.76E−08 |
| C9H14Al | P | SiC9H15 | −0.21 | 0.00 | 3.30E−14 | 3.47E−04 |
| C9H14Al | S | BC9H14 | −0.90 | 0.00 | 2.69E−59 | 9.27E−16 |
| C9H14B | Al | CC9H15 | −0.13 | 0.00 | 3.72E−09 | 6.86E−03 |
| C9H14B | Be | NC9H14 | −1.26 | 0.00 | 4.21E−83 | 7.19E−22 |
| C9H14B | Li | NC9H14 | −0.78 | 0.00 | 5.61E−52 | 7.01E−14 |
| C9H14B | Na | NC9H14 | −0.13 | 0.00 | 3.15E−09 | 6.58E−03 |
| C9H14N | Br | AlC9H14 | −2.48 | 0.00 | 7.75E−163 | 2.46E−42 |
| C9H14N | S | AlC9H14 | −0.65 | 0.02 | 1.95E−43 | 1.09E−11 |
| C9H14N | S | BC9H14 | −1.55 | 0.00 | 5.25E−102 | 1.01E−26 |
| C9H14N | S | SiC9H15 | −0.41 | 0.11 | 2.18E−27 | 1.44E−07 |
| C9H14P | Al | NC9H14 | −1.67 | 0.07 | 6.91E−110 | 9.60E−29 |
| C9H14P | Mg | AlC9H14 | −0.05 | 0.00 | 6.87E−04 | 1.54E−01 |
| C9H14P | Mg | BC9H14 | −0.27 | 0.02 | 1.71E−18 | 2.75E−05 |
| C9H14P | P | BC9H14 | −0.87 | 0.07 | 1.31E−57 | 2.51E−15 |
| C9H15C | Br | AlC9H14 | −1.23 | 0.01 | 3.73E−81 | 2.27E−21 |
| C9H15C | Br | BC9H14 | −1.50 | 0.00 | 1.44E−98 | 7.71E−26 |
| C9H15C | Br | GeC9H15 | −0.60 | 0.06 | 5.25E−40 | 8.28E−11 |
| C9H15C | Br | SiC9H15 | −1.01 | 0.04 | 1.27E−66 | 1.22E−17 |
| C9H15C | Cl | AlC9H14 | −1.22 | 0.17 | 9.07E−81 | 2.86E−21 |
| C9H15C | Cl | BC9H14 | −1.62 | 0.18 | 8.02E−107 | 5.87E−28 |
| C9H15C | Cl | GeC9H15 | −0.52 | 0.32 | 1.27E−34 | 2.00E−09 |
| C9H15C | Cl | SiC9H15 | −1.02 | 0.21 | 1.29E−67 | 6.79E−18 |
| C9H15C | Li | NC9H14 | −1.06 | 0.00 | 6.19E−70 | 1.72E−18 |
| C9H15C | Mg | NC9H14 | −0.61 | 0.00 | 8.90E−41 | 5.25E−11 |
| C9H15C | O | BC9H14 | −2.68 | 0.00 | 1.58E−175 | 1.36E−45 |
| C9H15C | S | AlC9H14 | −0.88 | 0.00 | 2.90E−58 | 1.71E−15 |
| C9H15C | S | BC9H14 | −1.78 | 0.00 | 7.93E−117 | 1.59E−30 |

TABLE 1-continued

Element Transfers with Energy Calculations and Reliabilities at Various Temperatures

| Tip | FS | Workpiece | Delta (eV) | Barrier (eV) | 77 K | 300 K |
|---|---|---|---|---|---|---|
| C9H15C | S | GeC9H15 | −0.24 | 0.00 | 2.11E−16 | 9.47E−05 |
| C9H15C | S | NC9H14 | −0.23 | 0.00 | 1.49E−15 | 1.56E−04 |
| C9H15C | S | SiC9H15 | −0.63 | 0.00 | 3.25E−42 | 2.25E−11 |
| C9H15Ge | Br | AlC9H14 | −0.63 | 0.11 | 7.10E−42 | 2.75E−11 |
| C9H15Ge | Br | BC9H14 | −0.90 | 0.14 | 2.73E−59 | 9.31E−16 |
| C9H15Ge | Br | SiC9H15 | −0.41 | 0.21 | 2.39E−27 | 1.47E−07 |
| C9H15Ge | C | CC9H15 | −1.15 | 0.00 | 9.46E−76 | 5.54E−20 |
| C9H15Ge | C | SiC9H15 | −0.46 | 0.00 | 7.39E−31 | 1.85E−08 |
| C9H15Ge | Cl | AlC9H14 | −0.71 | 0.31 | 7.12E−47 | 1.43E−12 |
| C9H15Ge | Cl | SiC9H15 | −0.51 | 0.47 | 1.00E−33 | 3.39E−09 |
| C9H15Ge | F | AlC9H14 | −1.08 | 0.01 | 2.00E−71 | 7.15E−19 |
| C9H15Ge | F | BC9H14 | −1.79 | 0.18 | 1.19E−117 | 9.76E−31 |
| C9H15Ge | Ge | CC9H15 | 0.02 | 0.00 | 6.18E−02 | 4.89E−01 |
| C9H15Ge | H | SiC9H15 | −0.35 | 0.23 | 1.12E−23 | 1.29E−06 |
| C9H15Ge | Li | NC9H14 | −0.46 | 0.00 | 1.62E−30 | 2.26E−08 |
| C9H15Ge | O | BC9H14 | −2.96 | 0.00 | 3.94E−194 | 2.29E−50 |
| C9H15Ge | O | SiC9H15 | −0.96 | 0.00 | 9.41E−64 | 6.66E−17 |
| C9H15Ge | P | BC9H14 | −0.79 | 0.03 | 5.05E−52 | 6.82E−14 |
| C9H15Ge | S | BC9H14 | −1.54 | 0.15 | 3.71E−101 | 1.67E−26 |
| C9H15Ge | Si | CC9H15 | −0.21 | 0.00 | 3.21E−14 | 3.44E−04 |
| C9H15Si | Al | CC9H15 | −0.25 | 0.02 | 4.97E−17 | 6.54E−05 |
| C9H15Si | B | CC9H15 | −1.12 | 0.14 | 4.39E−74 | 1.48E−19 |
| C9H15Si | Br | BC9H14 | −0.49 | 0.43 | 1.13E−32 | 6.31E−09 |
| C9H15Si | H | BC9H14 | −0.56 | 0.27 | 4.65E−37 | 4.73E−10 |
| C9H15Si | Li | NC9H14 | −0.57 | 0.00 | 5.33E−38 | 2.71E−10 |
| C9H15Si | P | BC9H14 | −0.54 | 0.16 | 4.44E−36 | 8.44E−10 |
| C9H15Si | S | BC9H14 | −1.14 | 0.00 | 2.44E−75 | 7.07E−20 |
| C9H15Si | Si | CC9H15 | −0.11 | 0.00 | 6.11E−08 | 1.41E−02 |
| C9H15Si | Ge | CC9H15 | −0.08 | 0.00 | 5.83E−06 | 4.53E−02 |
| C9H15Ge | Ir | CC9H15 | −0.04 | 0.00 | 1.97E−03 | 2.02E−01 |
| C9H15Ge | Ir | SiC9H15 | −0.33 | 0.00 | 1.82E−22 | 2.63E−06 |
| C9H15C | Ir | SiC9H15 | −0.29 | 0.00 | 9.36E−20 | 1.31E−05 |
| C9H15C | Ir | BC9H14 | −1.07 | 0.00 | 6.78E−71 | 9.77E−19 |

Note that it is possible for the change in energy (eV) to be positive. This is due to the fact that energy and force are not equivalent. A mechanosynthetic tip may exert force over a distance that results in a net change in energy which is positive, even if the reaction product resides in a local energy minima. This is discussed in more detail herein with respect to bond stiffness and affinity.

As the Table 1 data indicates, high reliability transfers of atoms including Al, B, Be, Br, C, Cl, F, Ge, H, Ir, Li, Mg, N, Na, O, P, S, and Si have been shown to be possible, using tips which employ active atoms Al, B, C, Ge, N, P, and Si. Obviously, these are examples only, and an even wider range of tips and reactions can be designed given the teachings herein.

Bond Strain in Tip, Reaction and Workpiece Design

A number of strain types exist, such as Van der Waals, stretch, torsion, and angle (or "bend," including ring) strain. In aggregate the various types of strain are often referred to as "steric energies," and these steric energies, or strain, are known to influence molecular stability and chemical reaction energetics.

For example, cyclobutane, with 7.5% kcal/mol/bond strain, is more reactive than the larger cycloalkanes in which the ring strain is relaxed. Fullerenes are similarly affected by bond strain. Since the lowest energy configuration for individual fullerene units is planar, higher curvatures generally lead to more reactive molecules due at least in part, to angle strain. In terms of individual bond energy, less than about 2% strain tends to have little effect on reactivity. 3-5% strain tends to cause at least some increase in reactivity, while at 5-10% strain, major increases in reactivity are generally apparent. Of course, this trend cannot continue indefinitely;

if strain is too high, a bond can spontaneously rupture, leading to rearrangement of the molecule.

Note that overall, a molecule could have very little strain, but one or more strained bonds can still cause it to be highly reactive, so the distribution of strain is also important. Conversely, a molecule could have many bonds which are only slightly strained (perhaps less than the 5% figure), yet when accumulated across multiple bonds, the overall strain energy is substantial. In such cases, modest amounts of strain on per-bond basis can lead to substantial effects on molecule conformation and various other properties. These observations lead to the conclusion that using strain to alter bond strength, and therefore reactivity, can be a useful technique in the design of tips and workpieces.

One scenario is that of feedstock held to a tip by a single bond. Strain within the tip may be used to change the bond angles, and thereby energies, of the apical tip atom to the feedstock. For example, consider an adamantane structure where a bridgehead carbon is bonded to the feedstock. This bridgehead carbon would normally be bonded to three other carbons, and the uniform length of the carbon-carbon bonds throughout the adamantane structure allows the bridgehead carbon to achieve a perfect tetrahedral configuration where each bond to the bridgehead carbon is about 109.5 degrees. However, if a Ge atom is substituted for each of the three carbons to which the bridgehead carbon is attached, the Ge—C-feedstock angle becomes about 112.9 degrees, causing angle strain.

In addition to angle strain, other type of strain can also be employed. For example, Van der Waals strain can be created by replacing, e.g., H atoms with larger diameter atoms of the same valence, adjacent to the feedstock. In this case, the larger diameter atom need not be bonded to the feedstock or to the apical tip atom. It need only impinge upon the feedstock's Van der Waals radius to cause steric strain.

While a tip designed in this manner can cause Van der Waals strain by having two or more parts of the same tip interfere (where one part is the feedstock site and the other part is a portion of the tip designed to at least partially impinge upon the feedstock location), a second tip could also be used to apply mechanical force to feedstock. For example, consider a first tip with feedstock bound to it. Using a second tip to apply force to the feedstock perpendicularly (or at any useful angle) to its point of attachment could weaken the bond between the first tip and the feedstock. This is conceptually similar to building such strain into a single tip, but more versatile as the timing, amount of force, and angle of force application can all be varied.

Another scenario where strain could be employed is when feedstock is held by more than one bond to a tip. To reduce tip bond strength to the feedstock, the bonding points can be pulled apart until the bonds are strained by the desired amount. This is more easily illustrated in a slightly larger structure than a single adamantane, so that rigidity of the tip backbone can be used to create strain without excessive deformation. For example, the native distance between two methyl groups connected by an oxygen (3HC—O—CH3) is about 2.36 A, and the angle is about 110.7 degrees. However, due to the lattice spacing, this configuration cannot be obtained on (111) diamond. If two adjacent carbons on the (111) face of diamond each have a hydrogen removed, and an oxygen atom is then bound to those carbons, with a very small structure composed of 3 interlocked adamantanes (larger structures would likely allow less deformation of the tip backbone), the oxygen becomes bound to the two carbons at an angle of about 87.8 degrees with the carbons being spaced about 2.02 A apart. Clearly, this is a substantial distortion of the minimal energy configuration and so if the oxygen is the feedstock, it will require less energy to remove from the tip structure than if it were bound in a configuration closer to its energy minima. Substitutions could be used to alter the diamond lattice spacing to increase or decrease the amount of strain created. An analogous technique could be used by a single feedstock moiety held by more than one tip. The tip spacing could be used to adjust tip-feedstock bond strength, and this could be changed on-the-fly if desired.

Note that with one single bond, as they are free to rotate, torsion is generally irrelevant. But, if a feedstock moiety was multiply-bonded, or one or more, e.g., double bonds (or any bond type not free to rotate), were used to bind the feedstock to one or more tips, or one or more points on a single tip, torsion could also be used to create strain, as could any other well-known strain-inducing modifications.

Many of the same techniques could be employed on the workpiece. In some cases, modulating bond strength on the workpiece instead of, or in addition to, the tip may be convenient. And, build sequence order can be chosen to create intermediate structures with strain if this alters the reactivity favorably.

It should be noted that creating strain and releasing strain are two sides of the same effect. If one considers a strained structure the default structure, releasing strain could be used to, for example, strengthen, instead of weaken, bonds. Further, strain levels need not be static. Levels of strain could be changed curing the course of a reaction. For example, to increase tip affinity when picking up feedstock, and then decreasing tip affinity when releasing feedstock.

Figure 54:
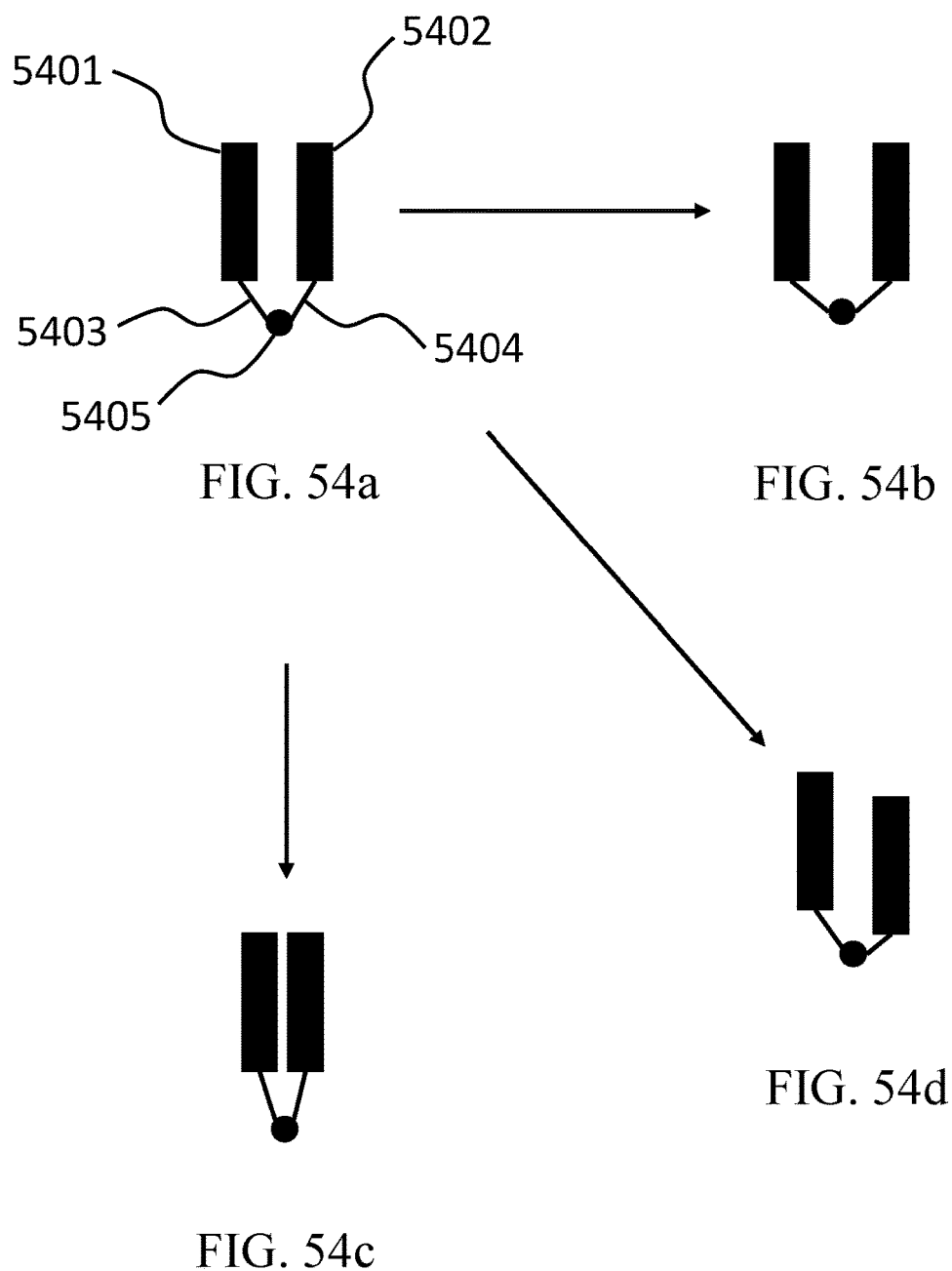
FIG. 54a-d depicts exemplary methods of using strain to alter affinity.

FIG. 54 depicts various one way of creating adjustable strain, and hence affinity, for feedstock. In FIG. 54a, a first tip (5401) is connected to feedstock (5405) via bond (5403). A second tip (5402) is also connected to feedstock (5405) via bond (5404). We assume this to be the minimum energy configuration. Various movements of the two tips would change the bond angles and lengths, causing strain and thereby reducing the affinity of the feedstock for the tips. For example, in FIG. 54b, the two tips have been moved part, stretching and changing the angle of the bonds to the feedstock. In FIG. 54c, the two tips have been move closer together, potentially compressing and changing the angle of the bonds to the feedstock. And, in FIG. 54d, one tip has been moved vertically with respect to the other, potentially resulting in stretching of bond (5403) and compression of bond (5404), plus angle changes. In a complete system, the tips would be attached to positional means (not shown). It is possible that each tip has its own position means. It is also possible that both tips reside on a single positional means (and actually may be considered two halves of the same tip) in which case relative movement can still be caused in various ways. For example, the surface onto which the tips are affixed could be a piezo element which can expand and contract. Or, changing temperature, charge, or other parameters could result in a conformation change in either the tips, or the surface to which they are affixed.

Workpiece Specification and Build Sequences

Many structures and reactions have been discussed herein, along with teachings which enable the creation of additional structures and reactions. However, to apply this information to the building of a workpiece, it helps to define the workpiece in an atomically-precise manner, and to define a build sequence which will create the workpiece.

A workpiece for mechanosynthesis can be defined by specifying each atom in the workpiece and its atomic coordinates, directly or indirectly (for example, via an algorithm which generates the desired structure). Many computational chemistry programs allow the creation of models based on atomic coordinates, or algorithms to generate such coordinates.

Once the atomic coordinates have been specified, a build sequence can be created that specifies the order in which each atom is to be added to, or removed from, the workpiece. Reactions that do not add or remove atoms are also possible, such as those that change the bonding structure of the workpiece, or if necessary, charge or otherwise alter tips. The reactions must be ordered so that they result in the desired workpiece, while avoiding, for example, intermediate states prone to pathological reactions, or unstable structures that undesirably rearrange. These topics are addressed in more detail below.

Process Flowcharts and Descriptions

To aid in the understanding of the general process of creating a workpiece, FIGS. 55 through 58 illustrate embodiments of the invention using exemplary flowcharts. Note that many variations on these processes are possible, and even without changing the steps involved, one might change the decision logic or loop through some processes more than once. For example, to optimally design a workpiece for manufacturability (55-2) may require an iterative process where the workpiece design is revised based on the outcome of subsequent steps or processes, such as the reaction design process described in FIG. 56.

Figure 55:
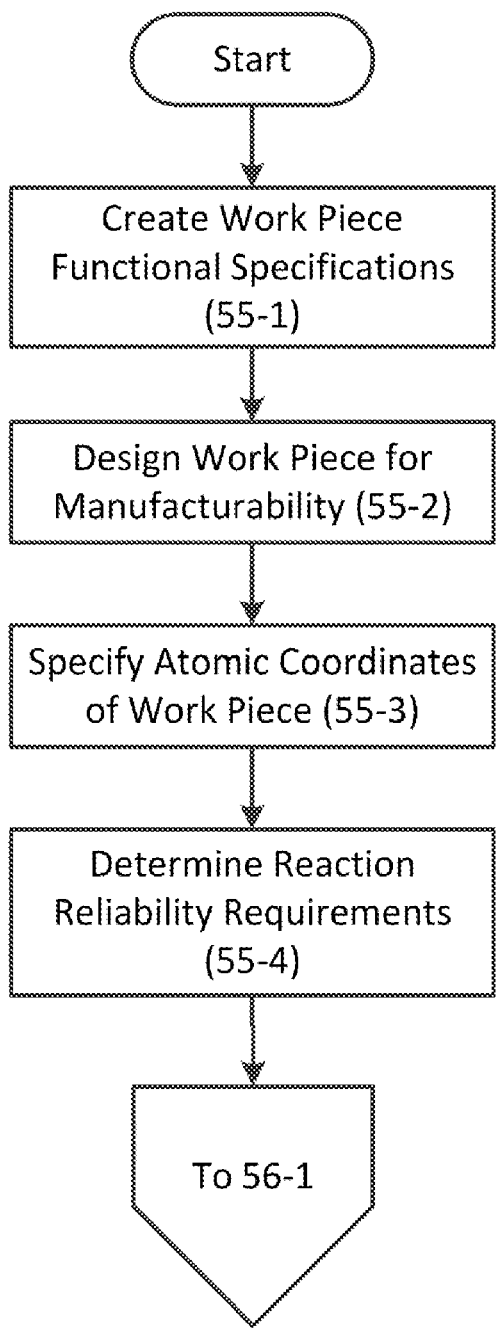
FIG. 55 is a flowchart of an exemplary process for specifying a workpiece.

The process can be started in FIG. 55, which provides an overview of how a workpiece definition can be created, at step (55-1), "Create Workpiece Functional Specifications." This step is similar to that for any traditionally-manufactured product in that product requirements must be defined before the product can be designed from an engineering perspective.

Step (55-2), "Design Workpiece for Manufacturability" also has an analog in traditional manufacturing. The product must be designed with the limitations of the manufacturing process in mind. In the case of mechanosynthesis, this means that a device is preferably designed with elements and bonding patterns whose properties are understood, for which tips and build sequences have been, or can be, designed and are compatible with equipment capabilities, using geometries accessible to the relevant tips, among other limitations which will be obvious to those skilled in the art given the teachings herein.

Once the device has been designed, step (55-3) is to "Specify Atomic Coordinates of Workpiece." That is, define each atom type and its position within the structure. This step may also include determining bonding structure, as this step can be informative although technically redundant since the bonding structure may be fully specified via the atomic coordinates. This may be done in any molecular modeling or computational chemistry software with the appropriate capabilities, such as HyperChem, Gaussian, GROMACS or NAMD.

Step (55-4) "Determine Reaction Reliability Requirements" involves performing an impact analysis of potential defects and the resultant establishment of reaction reliability requirements. Although the goal of mechanosynthesis is the production of atomically-precise products, unintended reactions can occur at frequencies which depend on factors including the chemical reactions being used, the tip design, the reaction trajectory, equipment capabilities and temperature. For each reaction one could analyze the most likely pathological side reactions that might occur and their impact upon the finished workpiece. For example, one could determine the impact of a feedstock atom failing to transfer, a feedstock atom bonding to a workpiece atom adjacent the intended position, or the workpiece undergoing an unintended rearrangement. The workpiece could be simulated with each potential defect, or more general heuristics or functional testing could be used to determine the likely impact of possible errors in the workpiece.

As an example of how a defect could be insignificant in one context but not in another, consider a simple part such as a structural beam: A small number of mistakes may not substantially affect the properties of the finished part, and may not affect the overall product, particularly if the part has been over-engineered to allow for some defects. In such a scenario, one might decide that some number of defects were tolerable and therefore require relatively low reaction reliability. On the other hand, if the workpiece being constructed were, for example, a single-molecule transistor that would not function correctly, or at all, if crucial atoms were misplaced, one might require a very low number (including 0) of defects.

One alternative to defect impact analysis is to require that each reaction be reliable enough that it is statistically unlikely that the final workpiece contains any errors. This is quite feasible, as seen from the reaction reliability calculations presented herein. Also, the ability to correct errors may have an impact on reaction reliability requirements. If errors can be fixed, one might decide to reduce reliability requirements and simply fix errors as they occur.

Figure 56:
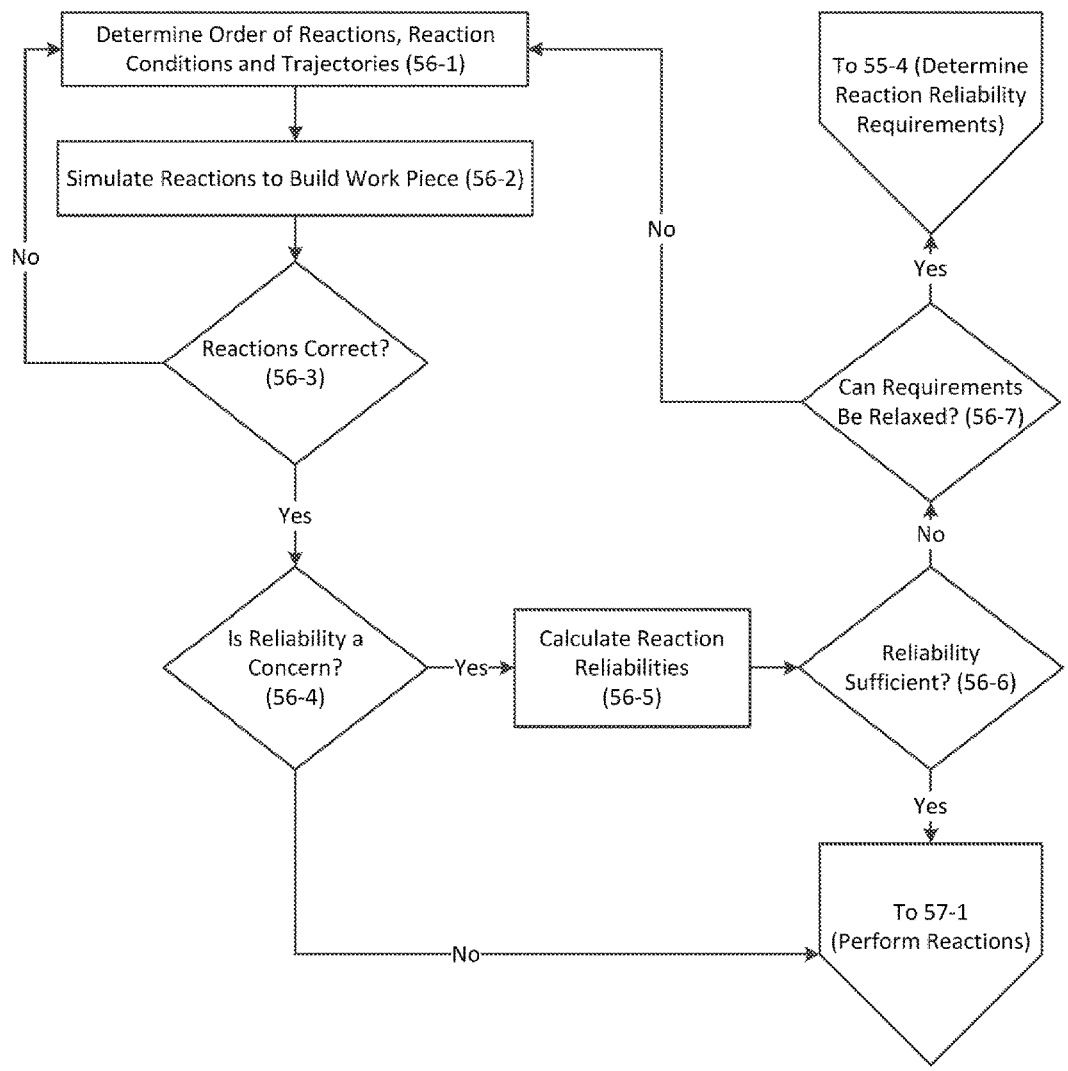
FIG. 56 is a flowchart of an exemplary process for designing reactions.

FIG. 56, which describes how a build sequence can be designed, begins with step (56-1) "Determine Order of Reactions, Reaction Conditions and Trajectories." Each atom, as specified in the atomic coordinates of the workpiece, generally (but not necessarily since, for example, one could use dimers or larger molecules as feedstock) requires that a particular reaction be performed on the workpiece to deposit that atom. Abstraction reactions may also be required, as may be reactions which alter the bonding structure of the workpiece without adding or subtracting any atoms.

There may be many different build sequences that would permit the construction of a particular workpiece. Steric constraints will be one determinant of the order in which atoms are added, as a three-dimensional workpiece requires adding atoms in an order which permits access by the necessary tools for later reactions. The stability of the intermediate structures should also be considered. For example, certain atoms, when left as radicals, might rearrange, forming undesired bonds with adjacent atoms. In addition to a logical order to the addition of atoms, other techniques can be employed to prevent undesired rearrangement. For example, terminating atoms can be added to radical sites to temporarily satisfy empty valances, or temperature can be reduced.

When a presumptive build order has been established, the build sequence may be simulated to determine if it works correctly (56-2). The same simulations can test reaction parameters including which tip to use, what temperature is required, and what trajectory a tip will follow. As has been previously noted, lower temperatures will favor accuracy, and frequently the coaxial trajectory will enable successful reactions.

Note that, given that rearrangement and abstraction reactions may be required in a build sequence, workpieces may require more reactions than the number of atoms in the finished workpiece. And, even if this were not the case, workpieces with many atoms will generally require many reactions. If the reactions are being implemented manually, this leads to a substantial requirement for labor. Automating the reaction steps may therefore be desirable. CAD programs can be used to specify AFM trajectories (Chen, "CAD-guided automated nanoassembly using atomic force microscopy-based nonrobotics," IEEE Transactions on Automation Science and Engineering, 3, 2006; Johannes, "Automated CAD/CAM-based nanolithography using a custom atomic force microscope," IEEE Transactions on Automation Science and Engineering, 3, 2006), atomic force microscopes that are programmable are commercially available, and programming languages or environments (e.g., LabVIEW) to control scientific equipment are well known (Berger et al., "A versatile LabVIEW and field-programmable gate array-based scanning probe microscope for in operando electronic device characterization," Review of Scientific Instruments 85, 123702 (2014)).

Based on the outcome of the simulations, a decision is reached as to whether the reactions as specified are correct (56-3). If not, the sequence is revised. If so, the process proceeds to (56-4) where a decision is made as to whether any of the calculated reactions may pose reliability concerns, for example, based on rearrangements or incorrect reactions that were seen during simulation in (56-2).

In (56-5) the reaction reliabilities can be calculated (for example, by energy barrier calculations or Monte Carlo simulations). (56-6) is a determination as to whether the proposed reaction reliabilities meet production quality needs, and, if the answer to (56-6) is no, the process proceeds to (56-7) where requirements are reviewed to see if the build sequence restrictions can be relaxed since they were not met. From (56-7) if the answer is yes, a new iteration is started at (55-4) to determine revised reaction reliability requirements. If the answer to (56-7) is no, alternate reactions, reaction order, reaction trajectories, or reaction conditions can be simulated (56-1) to find a revised build sequence that meets the reaction reliability requirements. If the answer to (56-6) is yes, the process continues in FIG. 57, step (57-1).

Figure 57:
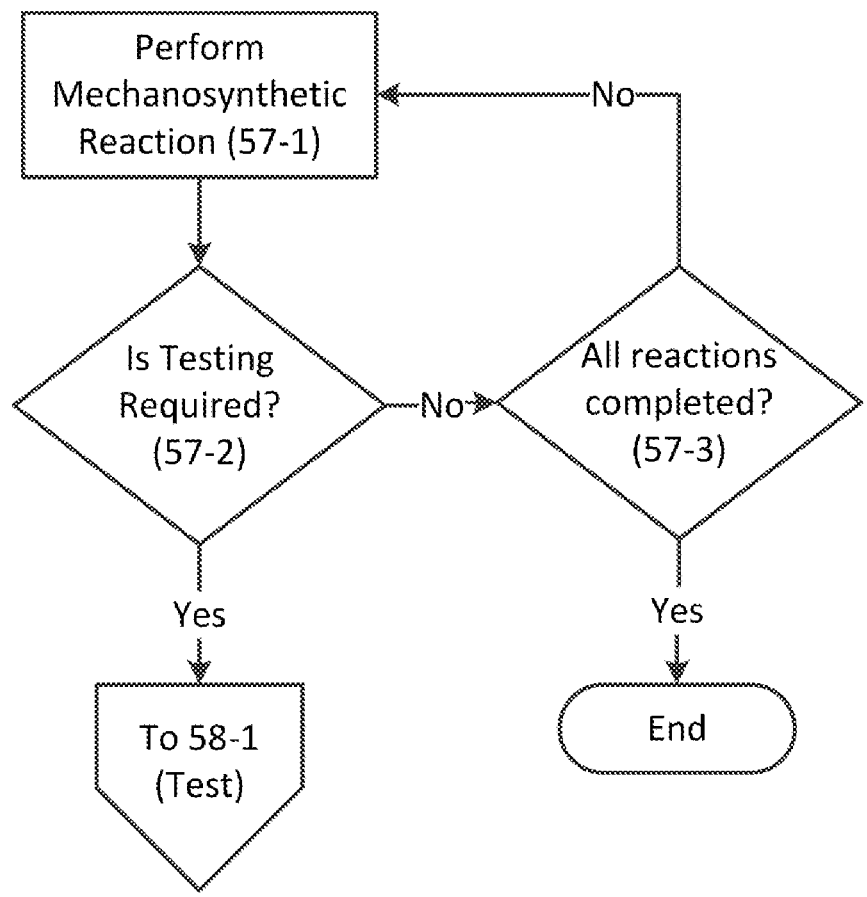
FIG. 57 is a flowchart of an exemplary process for performing reactions.

FIG. 57 describes a process for carrying out mechanosynthetic reactions per a build sequence. Starting at (57-1) "Perform Mechanosynthetic Reactions," the reactions determined in the build sequence are carried out using SPM/AFM-like equipment, or other suitable equipment. This step involves, whether manually or in a computer-controlled manner, using a positionally-controlled tip to perform each mechanosynthetic reaction in the build sequence. This means picking up a feedstock atom from a presentation surface (or potentially a gaseous or liquid source of feedstock) and bonding it to the workpiece, or removing an atom from the workpiece, or changing the bonding structure of the workpiece without adding or removing an atom. This step would also encompass other reactions, including reactions not involving the workpiece, such as tip refresh or pre-reaction feedstock manipulation as may be necessary.

Step (57-2) is a decision point. If the answer is "no," testing is not required (for example, such as when the reactions being used are reliable enough that testing is superfluous), the process proceeds to (57-3). The action taken from (57-3) depends on whether all reactions in the build sequence have been completed. If no, reactions are repeated until the answer is yes, at which point the workpiece is complete. Back at (57-2), if the answer were "yes," testing is required, the process continues in FIG. 58, starting with step (58-1).

Figure 58:
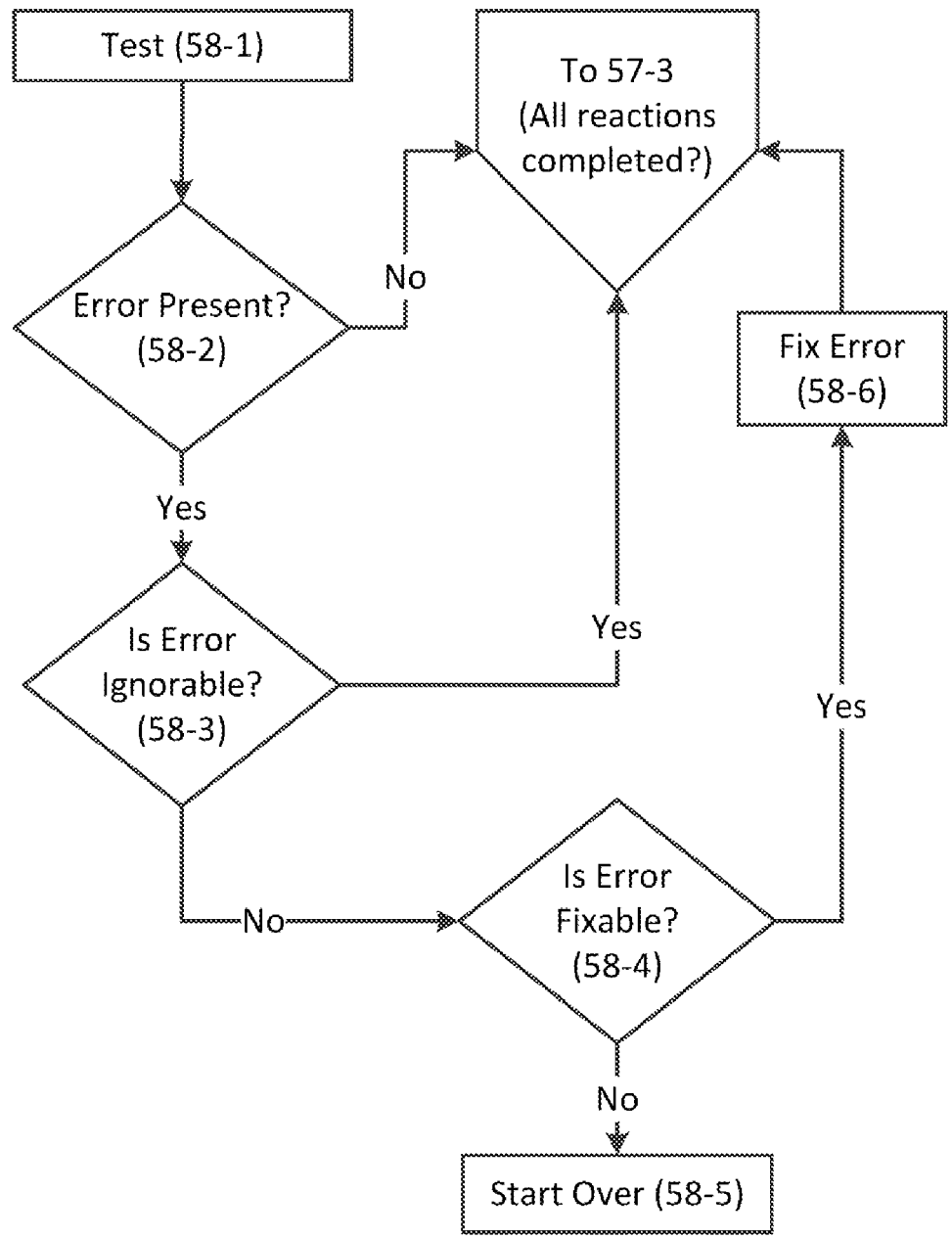
FIG. 58 is a flowchart of an exemplary process for testing reaction outcomes.

In FIG. 58, testing may done by, for example, scanning the surface of a workpiece using AFM or SPM-like techniques and checking to see that the expected structure is present. If no errors are found in (58-2), the process continues at (57-3). If an error is present at (58-2), a decision must be made in (58-3) as to whether the error is ignorable (e.g., not an error that would prevent the workpiece from functioning). If it is ignorable, the process again continues with (57-3), although the build sequence may require adjustment if key atoms were moved as a result of the error (not depicted). If the error is not ignorable, it must be determined if the error can be fixed (58-4). This is largely a question of whether the tools and processes exist to fix the error.

Note that errors could be fixed in various ways, such as directly reversing the last reaction if possible, or using abstraction tips to remove the local area of the workpiece entirely, paring the workpiece back to a point where the edges can be left in a correct and stable configuration. The build sequence would then be altered to fill back in the removed area, before proceeding on with the rest of the sequence.

If the error can be fixed, this is done in (58-6) and the process continues with (57-3). If the error cannot be fixed, given that it was previously determined to be a crucial error, the build sequence must be started over (58-5).

The embodiment of the process shown in FIG. 58 assumes the ability to detect and fix errors (58-6). This is not necessarily the case, and this flow chart represents only one possible process of implementing mechanosynthesis. For example, it is possible to desire testing without the ability to fix errors, or at least not all errors, if only to know that the workpiece must be discarded and the process started anew, as in (58-5). It is also possible to forgo error checking completely, and this is a reasonable solution especially for high-reliability reactions. Product requirements and process capabilities, among other considerations, will determine which steps are actually used, and in what order.

A variation on the error correction described above is the use of "conditional" build sequences. Some reactions might be known to be error-prone, having one or more pathological outcomes which cannot be prevented reliably. In this case, the creation of a branching, or conditional, build sequence can be useful. A conditional build sequence has multiple paths, or sub-sequences, within it. The exact path chosen will be determined by which structures result from the previous reactions. For example, assume that a build sequence reaches a reaction which is likely to have one of three outcomes. The exact outcome cannot be controlled, but it can be accommodated by a build sequence which contains logic such as "If the product of reaction X is A, then do this. If the product of reaction X is B, then do something else. If the product of reaction X is C, then follow yet another path."

Exemplary Build Sequences

Now that the process of designing a build sequence has been described, several exemplary build sequences, in addition to the half-Si-Rad build sequence already described, are presented. The following sequences can be used to create diamond (or with modification, diamondoid) structures. Reactions are logically grouped into sets of sequences which provide the ability to initiate, extend, and terminate, rows in a diamond structure. In these particular sequences, the assumed starting surface is the 110 face of diamond, although this is exemplary only, and other faces can be built upon, and other surfaces used (e.g., diamond can also be built on Si, given the minimal lattice spacing mismatch).

These build sequences were computed using the representative density functional method with the B3LYP/6-311G** basis set, which typically provides a good tradeoff between accuracy and computational expense. Higher reaction accuracies could be obtained using more computationally-demanding techniques such as coupled clusters. (Lee, Scuseria et al., "Achieving Chemical Accuracy with Coupled-Cluster Theory," Quantum Mechanical Electronic Structure Calculations with Chemical Accuracy, Kluwer Academic Publisher, 1995) 4 degrees Kelvin was assumed for this sequence (readily accessible with liquid helium) although the reactions would likely prove reliable at higher temperatures.

Reactions

The reactions in Table 2 are grouped into one of three functions: Row Initiation, Row Extension, or Row Termination. For example, to start a new row of diamond on a build surface, one would use the Row Initiation reactions, #1 to #11. To then extend that row, Row Extension reactions #12 to #17 would be used (as many times as necessary to achieve the desired length). To terminate the row, Row Termination reactions #18 to #22 would be used.

Each set of reactions can be repeated as many times as necessary, at different locations as appropriate, to build workpieces with varied geometry. This is conceptually similar to how a 3D printer lays down lines or blobs of material which, in aggregate, build a desired shape. This analogy only goes so far however, because "3D printing" using mechanosynthesis must take into account the varying chemical nature of different sites on a workpiece. For example, as the different sub-sequences for building diamond show, placing the first carbon in a row is not the same as placing a middle carbon, or the carbon at the far end.

The tips used in these build sequences are described in detail elsewhere herein. They are: the Abstraction tip, the HDonation tip, the Germanium Radical tip (GeRad), and the MeDonation tip. Additionally, while the descriptions should make obvious the sequence of events, molecular models depicting the products and reactants of the reactions described below can be found in US Patent Application 20160167970. Similar reactions and build sequences, along with a pyramidal exemplary workpiece, can be found in PCT Patent Application WO2014/133529.

TABLE 2

Exemplary Build Sequence Reactions

| # | Description | Tip |
|---|---|---|
| | Row Initiation Reaction Sequence | |
| 1 | First step for row initiation, via abstracting the hydrogen from the outer edge carbon. | Abstraction |
| 2 | Second step for row initiation, via donating the radical methyl group to the radical outer edge carbon. | MeDonation |
| 3 | Third step for row initiation, via donating a hydrogen to the radical outer edge methyl group. | HDonation |
| 4 | Fourth step for row initiation, via abstracting the hydrogen from the surface carbon adjacent to the outer edge methyl group. | Abstraction |
| 5 | Fifth step for row initiation, via donating a radical methyl group to the radical surface carbon adjacent to the outer edge methyl group. | MeDonation |
| 6 | Sixth step for row initiation, via abstracting a hydrogen from the outer edge methyl group, allowing radical-radical coupling between the carbon site of the outer edge methyl group and the adjacent radical methyl group to form a 6-member ring. | Abstraction |
| 7 | Seventh step for row initiation, via abstracting a hydrogen from a secondary carbon within a 6-member ring. | Abstraction |
| 8 | Eighth step for row initiation, via abstracting a hydrogen from a secondary carbon adjacent to a radical carbon both within a 6-member ring, allowing radical-radical coupling between the two adjacent secondary radical carbons forming a C=C double bond. | Abstraction |

TABLE 2-continued

Exemplary Build Sequence Reactions

| # | Description | Tip |
|---|---|---|
| 9 | Ninth step for row extension, via abstracting a hydrogen from the surface carbon adjacent to the 6-member ring. | Abstraction |
| 10 | Tenth step for row extension, via donating a radical methyl group. On approach of the tip to the surface, the radical methyl group breaks into the C=C double bond of the 6-member ring, allowing for subsequent radical-radical coupling of the radical surface carbon with the radical methyl carbon on retraction of the tool from the surface. | MeDonation |
| 11 | Final step for row extension, via donating a hydrogen to the radical secondary carbon. | HDonation |
| | Row Extension Reaction Sequence | |
| 12 | First step for row extension, via abstracting a hydrogen from the surface carbon adjacent to the cage. | Abstraction |
| 13 | Second step for row extension, via abstracting a hydrogen from the secondary carbon within the cage adjacent to the surface radical carbon, allowing for radical-radical coupling creating a strained tertiary carbon site. | Abstraction |
| 14 | Third step for the row extension, via abstracting a hydrogen from the strained tertiary carbon. | Abstraction |
| 15 | Fourth step for row extension, via donating a radical methyl group to the strained radical tertiary carbon. On retraction of the tip from the surface, the bond between the strained tertiary carbon and the surface carbon breaks with preference to form an unstrained C=C double bond. | MeDonation |
| 16 | Fifth step for row extension, via approaching the secondary carbon of the C=C double bond with tip, allowing the radical surface carbon to break into the C=C double bond thereby forming a C—C single bond between the primary carbon and the surface carbon. | GeRad |
| 17 | Final step for the row extension, via saturating the radical tertiary carbon. | HDonation |
| | Row Termination Reaction Sequence | |
| 18 | First step for the row termination, via abstracting a hydrogen from a tertiary carbon. | Abstraction |
| 19 | Second step for row termination, via abstracting a hydrogen from the secondary carbon adjacent to the radical tertiary carbon, allowing radical-radical coupling to form a strained C=C double bond. | Abstraction |
| 20 | Third step for row termination, via donating a radical methyl group to the secondary carbon of the strained C=C double bond. On retraction of the tip from the surface, the position of the radical methyl group facilitates the migration of a hydrogen from the outer edge carbon thereby saturating the methyl group and leaving a radical outer edge carbon. | MeDonation |
| 21 | Fourth step for row termination, via donating a hydrogen to the radical tertiary carbon. | HDonation |
| 22 | Final step for row termination, via abstracting a hydrogen from the methyl group, allowing radical-radical coupling to occur between the radical methyl group and the radical outer edge carbon, closing the row. | Abstraction |

Differentiating Mechanosynthesis Products

It should be noted that, while a pyramidal workpiece is mentioned here, the reaction sequences provided can make many other shapes. In general, workpieces can be virtually any shape permitted by the chemistry of the workpiece, though some shapes and substitutions may require the design of additional reactions. While shapes such as pyramids, cuboids, cylinders, spheres, ellipsoids and other simple geometric shapes can obviously be made, they are perhaps not the most interesting or most useful examples of what can be built with mechanosynthesis. This is for a variety of reasons, including the fact that their simplicity limits their functionality (although different parts can be combined to address this issue), and because at least some of these shapes can be approximated, even if not in an atomically-precise manner, by other technologies. For example, it may be possible to grow some simple, approximate shapes using chemical vapor deposition.

What are perhaps more interesting cases are where the workpiece is not a simple shape, or any periodic shape derived directly from its crystal structure (which might permit its manufacture by CVD, self-assembly, or some other known process). We will refer to such workpieces as being "aperiodic", and aperiodic workpieces are interesting because as far as we know, mechanosynthesis is the only way to produce such workpieces. For example, consider an arbitrary shape such as the outline of a car (to use a familiar shape, if not a relevant scale). Even if CVD could be used to grow atomically-precise crystals, there is no way it could be used to achieve such an irregular shape. Also included in aperiodic workpieces would be workpieces that may largely be periodic, but which have aperiodic substitutions. For example, consider a diamond cube, perfect and regular in all respects except that nitrogen vacancies have been placed in specific locations. Again, this would be impossible to create via CVD, or any other technology of which we are aware besides mechanosynthesis, yet this could be a very useful workpiece for realizing a quantum computer. The vast majority of parts, whether mechanical or electronic, used in devices today, are aperiodic. Being aperiodic is the rule rather than the exception, and while such parts are easily manufactured at the macro-scale using subtractive manufacturing (e.g., machining) and other techniques, it is very difficult to manufacture such parts with atomic precision. In most cases we would say that it is impossible without mechanosynthesis.

Another way to view the difference between mechanosynthesis products and other natural or synthetic products is to compare some other aspects of their makeup aside from periodic versus a periodic. Specifically, it is informative to consider stiffness, bonding structure, size, and complexity (which can be related to, but is not the same as periodicity, or lack thereof).

Large numbers of natural and synthetic chemical structures, and synthesis pathways, are known outside of mechanosynthesis. And, given these known structures and synthesis pathways, the manufacture of many more structures would be possible. Some of these structures are large (as molecules go), some are stiff and highly-bonded, some have strained bonds, some are atomically-precise, and some, by various measures, could be considered complex. However, no natural or synthetic structure prepared without the aid of mechanosynthesis, possesses all of these characteristics.

For example, DNA of essentially arbitrary length and sequence can be prepared using conventional techniques. And, given that DNA need not be simply a repetition of the same monomer, by some measures DNA sequences could have high complexity. However, DNA is essentially a floppy, one-dimensional polymer. Although DNA can fold into 3D structures, even then, DNA is not stiff or highly-bonded.

Large, three-dimensional polymers can be synthesized. For example, a dendritic polymer of 2×108 Daltons has been synthesized (Zhang, Wepf et al., "The Largest Synthetic Structure with Molecular Precision: Towards a Molecular Object," Angewandte Chemie International Edition, 3, WILEY-VCH Verlag, 2011). However, the ability to precisely control the composition of such polymers is lacking, and they tend to be relatively simple polymeric sequences which have been joined in a manner that allows them to assume a three-dimensional shape. The dendritic polymer synthesized by (Zhang, Wepf et al., "The Largest Synthetic Structure with Molecular Precision: Towards a Molecular Object," Angewandte Chemie International Edition, 3, WILEY-VCH Verlag, 2011) is not stiff, highly-bonded, or complex, and subsequent work on error rates at various points in the molecule indicate that it is not atomically-precise.

Structures consisting of multiple adamantane units in random configurations have been purified from petroleum. These structures are stiff and highly-bonded. Additionally, various chemical processes are known to make modified or functionalized adamantane (Szinai, "ADAMANTANE COMPOUNDS," U.S. Pat. No. 3,859,352, United States, Eli Lilly and Company (Indianapolis, Ind.), 1975; Baxter, "Adamantane derivatives," U.S. Pat. No. 6,242,470, United States, AstraZeneca AB (Sodertalje, SE), 2001). However, the adamantane aggregates obtained from natural sources are connected randomly, and so the chances of finding any particular arrangement of adamantanes as the size of the molecule grows becomes vanishingly small. In practicality, these molecules are neither large nor atomically-precise. The functionalized adamantanes used in the pharmaceutical industry are atomically-precise, but they are not large or highly-bonded (since such molecules tend to be, for example, a single adamantane connected to a long, flexible side chain).

Diamond, whether natural or synthetic (e.g., grown via chemical vapor deposition) is neither complex, being (with the exception of errors) a uniformly repeated three-dimensional polymer of adamantane, nor atomically-precise, as even the most perfect such diamond has flaws at the atomic level.

With respect to strained bonds, the creation of individual strained bonds is routine in chemistry, and molecules like cyclopropane and cubane exemplify the structures that can be created with strained bonds. Larger structures containing many strained bonds also exist, e.g., Fullerenes of various configurations. While the specific mechanisms of formation are very different, there is a commonality between the synthesis of cyclopropane, cubane, Fullerenes, and other strained molecules in that there are energetically-feasible sequential reaction pathways leading from the initial reactants to the final product.

However, there are classes of strained structures for which this is not true; there is no practical pathway from the component atoms or molecules to the final product using only conventional chemistry. To conceptually illustrate this principle, consider a stiff, rod-shaped molecule. Now, bend the rod into a circle and connect the ends. A hoop-shaped molecule is formed. While hoop-shaped molecules abound, including all the cycloalkanes, and the many other cyclopolymers, the formation of such structures rely upon some fairly restrictive requirements. The main requirement for the formation of these strained structures is that the two ends can be brought close enough together so that they can be bonded together, changing the molecule from a linear structure into a circular structure. The two ends of the linear molecule can be closely approximated in a variety of ways. For example, the molecule can be very small to begin with, so that even if the molecule is straight, the two ends are both within reach of a single reaction. Or, the molecule can be flexible enough that it can bend into the necessary configuration. Or, the linear molecule could have an inherent curve to it, making it already a partial hoop and thereby leaving only a small gap to bridge.

But, consider a class of molecules that do not meet these requirements. A long rod, if stiff enough, even if somewhat curved, with a substantial gap between its ends, cannot be made into a hoop through conventional chemistry techniques. Similarly, a stiff two-dimensional molecule (e.g., a plane of diamond just one or two adamantane layers thick) will be unable to curl into a tube structure, both because of its stiffness, and possibly because multiple bonds would have to simultaneously form to hold the new tubular structure in place—a statistically unlikely event.

A stiff, long, potentially wide, structure with two sides which are, atomically speaking, far apart, but which need to be brought together to then undergo a bonding reaction to form a stable hoop or cylinder may sound like a very contrived class of structures. It is not. For example, it is exemplary of many of the bearing designs which have been proposed for nano-devices, where an axle revolves inside a stiff cylindrical ring or tube. Mechanosynthesis can form such structures in a variety of ways, such as by using force to approximate the necessary ends, or by building a temporary jig around the structure that forces intermediate structures into the necessary shape (and which can then be removed once the desired structure is complete).

These are only examples. Comments similar to those about DNA and dendritic polymers apply to other polymers as well, comments similar to those about adamantane apply to the existence or synthesis of other structures, comments similar to those made about diamond apply to other crystals, and certainly rod or plane-shaped structures that need to be folded into hoops or cylinders are not the only example of how positional control allows the formation of structures which could not be made via conventional chemistry due to geometric issues.

Another problem with traditional chemical synthesis methods, geometry issues like those described above aside, is that there is no way to differentiate multiple sites which have similar or identical chemical properties, and yet the end product requires that they be treated differently. Linear polymer synthesis (e.g., DNA synthesis) is an exception, since it is possible to work only at one or a few specific locations (e.g., the ends) of a growing one-dimensional polymer, but these polymers are not stiff, or amenable to the formation of precise, highly-bonded three-dimensional structures.

Once molecules become two or three dimensional, the problem of chemically-equivalent sites at different locations appears. For example, consider a perfectly flat plane of diamond, onto which a structure is to be built. Reactions are known which can add additional carbon (or other) atoms to diamond; this is the basis for CVD-based growth of diamond. However, with the exception of the edges and corners of the plane, which have different bonding structures by virtue of not having the same number of neighboring carbon atoms as the atoms away from the edge, all the sites on the surface of the plane are essentially chemically equivalent. There is no way that CVD, or any non-positional technique can, for example, start adding new atoms to the plane at arbitrary, atomically-precise coordinates.

This concept of multiple chemically-similar or chemically-identical sites is the reason that three-dimensional dendritic polymers have a simple, repetitious structure: Whatever reaction happens to one branch tends to happen to the equivalent sites on all branches. Beyond dendritic polymers, this general concept is one of the main reasons that synthetic chemistry cannot create arbitrarily large and complex structures.

Certainly mechanosynthesis could be used to make products including DNA and other polymers, small molecules, or repetitious structures of low complexity. In fact, such products would be superior in some ways. For example, products of 100% purity could be created, potentially improving the properties of the product, as well as eliminating waste, and the need for purification steps.

However, when speaking of the possible products of mechanosynthesis, these are not the most important cases since such products, even if inefficiently or imperfectly, can already be created. The more important cases are those structures which cannot reasonably be created or obtained by other means. For the aforementioned reasons, these tend to be structures that are atomically precise, large, highly bonded, and complex. Such structures may occur with or without strain; the presence of at least some kinds of strain makes it even more unlikely that any method other than positionally-controlled chemistry can create such a structure.

Reliability

Reliability is an important consideration in the design of build sequences for multi-atom workpieces. Reaction reliability can be achieved in a variety of ways, including use of reactions with energy barriers sufficient to prevent spontaneous reactions at a given temperature, reactions designed to avoid pathological side reactions (for example, by approaching a workpiece using a trajectory that favors only the desired reaction, or by ordering a build sequence to avoid leaving unsatisfied valences in self-reactive positions), or the introduction of a testing step during mechanosynthesis. These topics are discussed in more detail below.

In some cases, primarily with respect to hydrogen due to its low atomic mass, tunneling can contribute to reaction error. These errors can be reduced with slight modifications in build sequences to avoid problematic situations. Also, deuterium could be used in place of standard hydrogen. Deuterium's different mass and Van der Waal's radius also has effects on reaction rates (the kinetic isotope effect), vibrational frequencies, torsional coupling and other properties. All of these effects may be exploited by choosing to use hydrogen or deuterium on a case by case basis. Note that in general, any isotope of an element could be used where its properties are advantageous, and the ability to positionally control isotopes of an element may useful, just as the positional control of different elements is useful.

Reaction Barriers and Temperature

Note that equipment capabilities could have an effect on reaction reliability. For example, the error in a positional means is unlikely to be zero. However, it is well within the limits of conventional atomic microscopy technology to attain high enough positional accuracy that it essentially becomes irrelevant. With equipment that can position a tip with a precision of, e.g., <20 pm, temperature becomes the dominating variable in reaction reliability. As the positional means become less accurate, reaction reliability suffers regardless of temperature, and for example, positional errors of 50 pm or more will substantially reduce the reliability of many mechanosynthetic reactions. Those skilled in the art will understand how to incorporate such equipment limitations into reaction reliability calculations, if necessary. For exemplary purposes, only temperature is considered in the following example of calculating reaction reliability.

One of the advantages of mechanosynthesis is that it facilitates specific, desired reactions by using directed mechanical force to overcome reaction barriers. In conventional chemistry, reaction barriers or energy deltas are often overcome by thermal energy. However, thermal energy is nonspecific and facilitates desired and undesired reactions alike. Reducing temperature decreases the thermal energy available to cause non-specific reactions. This reduces the likelihood of pathological side reactions while directed mechanical force, even at low temperatures, still facilitates desired reactions.

The Arrhenius equation and other principles of thermodynamics and computational chemistry may be used in conjunction with data on net energy differences and energy barriers to determine the reliability of a given reaction at a given temperature. For example, the following Mathematica v8 code may be used to determine reaction reliability at a given temperature when considering the net energy difference between two structures (e.g., the before and after workpiece structures):

Code Listing 1:
( calculate reliability of a reaction at a given temperature )
( Define Constants and Unit Conversions )
(** Boltzmann constant=1.38*10^-23 J/K **)
  boltzmann=1.381*10^-23;
( convert eV to Joules )
  jouleBarrier=barrier*1.6*10^-19;
( inputs for specific reaction )
  ( reaction barrier in eV )
  barrier=Abs[-0.6418];
  ( temp in Kelvin )
  temperature=300;
( Calculate Probability of Failure )
  probability=NumberForm[Exp[-jouleBarrier/
    (boltzmann*temperature)], 4]

Reliability in Build Sequences

The reliability of reactions across a build sequence can provide one way of assessing the statistical error rate. And, depending on which, or how many, errors are considered significant enough to compromise workpiece function, these data can then be used to assess workpiece yield (or performance, in a scenario where workpieces do not simply pass/fail a quality check and the effect of certain errors on workpiece function are known) in a manufacturing setting. This is most easily explained by example.

Consider a workpiece which requires 10^6 reactions to create. For the sake of simplicity, assume that each of these reactions are identical in their energy barrier to a pathological reaction (an error), and that the barrier is 0.2 eV. Another assumption is that simulations, practical experience, or other information provide guidelines as to how many errors, on average, may be present before a workpiece is deemed defective. Arbitrarily, since this would vary with the workpiece design, a limit of 10 errors is used for this example. Which is to say, a workpiece having between 0 and 10 errors is acceptable, while a workpiece having over 10 errors will be rejected as defective. Finally, (again, arbitrarily to demonstrate the logic, since this number will vary depending on the business and technical requirements) a yield of at least 90% is required.

Since an error is presumed to be a rare event, error occurrence is modeled as a Poisson distribution. The problem then becomes one of determining 1, the number of expected events, where the Cumulative Distribution Function is equal to or greater than 0.90 (a 90% yield) when the number of events is 10 (the maximum number of tolerable errors). In this case, 1 is 7. Meaning, if one expects, on average, that 7 errors will occur during the build sequence, then 90% of the time, no more than 10 events will occur. So, the expected number of errors must be <=7. Since the hypothetical workpiece requires 10^6 reactions to build, the threshold for mistakes is 7/10^6. Using the equations herein to solve for the maximum allowable temperature to attain this accuracy given a 0.2 eV barrier, the answer is about 195 degrees Kelvin. Obviously this number can change depending on actual reaction barriers, manufacturing requirements, equipment capabilities, and other factors.

Note that these calculations assume that temperature is the sole factor limiting reliability. As previously noted, there may be other sources of error, caused by factors such as positional uncertainty in the equipment, or Hydrogen tunneling, and these could be factored in when assessing an actual manufacturing process. Also, note the assumption that errors are statistically independent. Error independence is unlikely in some scenarios, since a missing or mis-bonded atom may cause subsequent problems when placing neighboring atoms. However, this is not necessarily the case, and regardless, the issue can be made irrelevant by requiring an error rate approaching 0%.

Temperature and reaction barriers aside, considering the statistics of the case where zero errors is the requirement provides a way to compare the literature processes to the reliability requirements needed for the creation of more complex workpieces. The literature often describes experiments involving between one and about twelve reactions. The literature does not report error rates, but theoretically, how reliable must the reactions be to perform, for example, twelve reactions with no errors? A simple calculation (Reliability #Reactions=Yield) shows that 90% reliability for each reaction would give a 28% yield. That may be an acceptable, or even excellent, yield for a laboratory process, but a fairly poor yield for an industrial manufacturing process, and that is with only 12 reactions.

If the workpiece requires 20 reactions, a 90% reliability for each reaction gives a yield of 12%. At 50 reactions, 90% reliability provides a yield of only 0.5%. By 100 reactions, 90% reliability is no longer reasonable as an error-free workpiece would almost never be created. For 100 reactions, the reliability needs to be more in the 95-99% range. And, for 1,000 reactions or more, assuming that a yield of more than a few percent is desired, the reliability needs to approach 100%.

Note that some reactions will be abstraction or rearrangement reactions, while some will be addition reactions which may add more than one atom at a time. On average, the number of reactions probably exceeds the number of atoms in a given workpiece, but the order of magnitude will be the same, so for ease of discussion we will assume that a workpiece containing 20 atoms takes about 20 reactions, a workpiece containing 50 atoms takes about 50 reactions, a workpiece containing 100 atoms takes about 100 reactions, and a workpiece containing 1000 atoms takes about 1000 reactions, and so on.

Clearly, error rates that are acceptable for workpieces requiring trivial numbers of reactions are unsatisfactory for building more complex workpieces. Of course, this statement comes with a number of assumptions, such as no error correction processes, and little tolerance for errors in the finished workpiece. But, in general, this illustrates the need for rationally-designed build sequences, based on reactions of known reliability, that permit reliability far in excess of that evidenced in the literature (but well within the capabilities of the reactions reported herein).

Of course, some useful build sequences are quite short. For example, depending on whether the starting point is a dehydrogenated Si surface or a brominated Si surface, the half-Si-Rad build sequence described herein is only 11 to 15 steps long. Similarly, initiating a new row on a diamond surface takes 11 reactions, extending the row takes 5 steps, and terminating a row takes 6 steps (ignoring that such steps will often need to be repeated—while this would frequently be the case, it cannot be said to always be the case). Clearly, some build sequences may be between 5 and 10, or between 10 and 20, steps long and still accomplish something of value. In such circumstances, reliability requirements for the individual reactions might be lower and still result in success some reasonable percentage of the time, as opposed to build sequences which have, e.g., 20 to 50, 50 to 100, 100 to 1,000, or more, steps.

What is claimed is:

1. A method of fabricating a specified atomically-precise product, comprising:
performing an ordered build sequence of mechanosynthetic reactions to apply feedstock to a workpiece,
said build sequence comprising mechanosynthetic reactions having a calculated degree of reliability at a given temperature and with realistic equipment limitations, including the capability of sub-angstrom positional accuracy, and the entire build sequence having been determined capable of creating the specified product with a desired degree of reliability based upon the calculated reliabilities of the individual reactions in the build sequence, to create a workpiece.

2. The method of claim 1 wherein said workpiece is three-dimensional.

3. The method of claim 2 wherein said workpiece is comprises diamondoid.

4. The method of claim 3 wherein said workpiece comprises diamond.

5. A system for implementing a build sequence to fabricate a specified atomically-precise product, the system comprising:
a mechanosynthetic tip;
a positional control device connected to said mechanosynthetic tip to move said mechanosynthetic tip to transfer feedstock onto a workpiece and having the capability of sub-angstrom positional accuracy;
a computer system in communication with said positional control device; and
build sequence data including an ordered sequence of mechanosynthetic reactions that have a calculated degree of reliability at a given temperature and with the limitations of said positional control device taken into account, and the entire ordered sequence having been determined capable of creating the specified product with a desired degree of reliability based upon the calculated reliabilities of the individual reactions in the ordered sequence, said build sequence data being stored on said computer system to allow said computer system to operate said positional control device to perform said sequence of mechanosynthetic reactions.

6. The system of claim 5 wherein said build sequence represents reactions to build a three-dimensional workpiece.

7. The system of claim 6 wherein said three-dimensional workpiece comprises diamondoid.

8. The system of claim 7 wherein said three-dimensional workpiece comprises diamond.

9. A device for sequencing a series of mechanosynthetic reactions to be performed by a positional device, the device comprising:
a data storage device; and
build sequence data, stored upon said data storage device, said build sequence data including an ordered sequence of mechanosynthetic reactions having a calculated degree of reliability at a given temperature and with realistic equipment capabilities, including the capability for sub-angstrom positional control, taken into account, and the entire ordered sequence having been determined capable of creating a specified product with a desired degree of reliability based upon the calculated reliabilities of the individual reactions in said ordered sequence.

10. The device of claim 9 wherein said build sequence data specifies reactions for building a three-dimensional workpiece.

11. The device of claim 10 wherein said three-dimensional workpiece comprises diamondoid.

12. The device of claim 11 wherein said three-dimensional workpiece comprises diamond.

13. A system for implementing a build sequence to fabricate a specified atomically-precise product, the system comprising:
at least one mechanosynthetic tip; and
at least one positional control device connected to said mechanosynthetic tip to move said mechanosynthetic tip to transfer feedstock onto a workpiece, and having the capability of sub-angstrom positional accuracy,
said at least one positional control device being operated according to an ordered sequence of mechanosynthetic reactions that have a calculated degree of reliability at a given temperature and with the limitations of said positional control device taken into account, and the entire ordered sequence having been determined capable of creating the specified product with a desired degree of reliability based upon the calculated reliabilities of the individual reactions in the ordered sequence.

14. The system of claim 13 wherein the specified atomically-precise product includes a three-dimensional workpiece.

15. The system of claim 14 wherein said three-dimensional workpiece comprises diamondoid.

16. The system of claim 15 wherein said three-dimensional workpiece comprises diamond.

* * * * *